(12) United States Patent
Bandyopadhyay et al.

(10) Patent No.: US 8,965,688 B2
(45) Date of Patent: Feb. 24, 2015

(54) SYSTEM AND METHOD FOR LOCATING, TRACKING, AND/OR MONITORING THE STATUS OF PERSONNEL AND/OR ASSETS BOTH INDOORS AND OUTDOORS

(75) Inventors: Amrit Bandyopadhyay, Washington, DC (US); Daniel Hakim, Silver Spring, MD (US); Benjamin E. Funk, Hanover, MD (US); Eric Asher Kohn, Washington, DC (US); Carole A. Teolis, Glenn Dale, MD (US); Gilmer Blankenship, Washington, DC (US)

(73) Assignee: TRX Systems, Inc., Greenbelt, MD (US)

( * ) Notice: Subject to any disclaimer, the term of this patent is extended or adjusted under 35 U.S.C. 154(b) by 218 days.

(21) Appl. No.: 13/616,370

(22) Filed: Sep. 14, 2012

(65) Prior Publication Data

US 2013/0166202 A1 Jun. 27, 2013

Related U.S. Application Data

(63) Continuation of application No. 12/187,067, filed on Aug. 6, 2008.

(60) Provisional application No. 60/954,112, filed on Aug. 6, 2007, provisional application No. 61/049,020, filed on Apr. 30, 2008.

(51) Int. Cl.
*G01C 21/00* (2006.01)
*G01C 21/16* (2006.01)
(Continued)

(52) U.S. Cl.
CPC .............. *G01C 21/165* (2013.01); *G01C 17/38* (2013.01); *G01C 21/206* (2013.01);
(Continued)

(58) Field of Classification Search
USPC ................... 701/434; 340/539.11, 521, 573.1
See application file for complete search history.

(56) References Cited

U.S. PATENT DOCUMENTS

| | | | |
|---|---|---|---|
| 5,552,772 | A | 9/1996 | Janky et al. |
| 5,583,776 | A | 12/1996 | Levi et al. |

(Continued)

FOREIGN PATENT DOCUMENTS

| | | | |
|---|---|---|---|
| EP | 2179600 A1 | 4/2010 | |
| WO | WO 2002/056274 A1 | 7/2002 | |
| WO | WO 2006/017266 A2 | 2/2006 | |
| WO | WO 2008/108788 A2 | 9/2008 | |
| WO | WO 2009/021068 A1 | 2/2009 | |

OTHER PUBLICATIONS

U.S. Appl. No. 60/954,112, filed Aug. 6, 2007, Bandyopadhyay et al.

(Continued)

*Primary Examiner* — Bhavesh V Amin
(74) *Attorney, Agent, or Firm* — Baker & Hostetler LLP

(57) ABSTRACT

A system and method for locating, tracking, and/or monitoring the status of personnel and/or assets (collectively "trackees"), both indoors and outdoors, is provided. Tracking data obtained from any number of sources utilizing any number of tracking methods may be provided as input to a mapping application. The mapping application generates position estimates for trackees using a suite of mapping tools to make corrections to the tracking data. The mapping application further uses information from building data, when available, to enhance position estimates. Indoor tracking methods including sensor fusion methods, map matching methods, and map building methods may be implemented compute a more accurate tracking estimate for trackees. Outdoor tracking methods may be implemented to enhance outdoor tracking data by combining tracking estimates such as inertial tracks with magnetic and/or compass data if and when available, and with GPS, if and when available.

31 Claims, 33 Drawing Sheets

(51) Int. Cl.

| | | |
|---|---|---|
| *G01C 17/38* | (2006.01) | |
| *G01C 21/20* | (2006.01) | |
| *G01S 5/02* | (2010.01) | |
| *G01S 19/39* | (2010.01) | |
| *G01S 19/48* | (2010.01) | |
| *G01S 19/49* | (2010.01) | |
| *H04W 4/02* | (2009.01) | |
| *H04W 4/04* | (2009.01) | |
| *H04W 64/00* | (2009.01) | |

(52) U.S. Cl.
CPC ............. *G01S 5/0294* (2013.01); *G01S 19/39* (2013.01); *G01S 19/48* (2013.01); *G01S 19/49* (2013.01); *H04W 4/028* (2013.01); *H04W 4/043* (2013.01); *H04W 64/00* (2013.01)
USPC ............. 701/434; 701/1; 701/400; 701/482; 701/519

(56) References Cited

U.S. PATENT DOCUMENTS

| | | |
|---|---|---|
| 5,645,077 A | 7/1997 | Foxlin |
| 5,652,570 A | 7/1997 | Lepkofker |
| 5,742,509 A | 4/1998 | Goldberg et al. |
| 5,774,385 A | 6/1998 | Bristol |
| 5,899,963 A | 5/1999 | Hutchings |
| 5,956,660 A | 9/1999 | Neumann |
| 5,977,913 A | 11/1999 | Christ |
| 5,990,793 A | 11/1999 | Bieback |
| 6,031,454 A | 2/2000 | Lovejoy et al. |
| 6,061,021 A | 5/2000 | Zibell |
| 6,072,396 A | 6/2000 | Gaukel |
| 6,100,806 A | 8/2000 | Gaukel |
| 6,122,960 A | 9/2000 | Hutchings et al. |
| 6,181,253 B1 | 1/2001 | Eschenbach et al. |
| 6,240,367 B1 | 5/2001 | Lin |
| 6,362,778 B2 | 3/2002 | Neher |
| 6,366,855 B1 | 4/2002 | Reilly et al. |
| 6,415,223 B1 | 7/2002 | Lin et al. |
| 6,474,159 B1 | 11/2002 | Foxlin et al. |
| 6,496,779 B1 | 12/2002 | Hwang |
| 6,504,483 B1 | 1/2003 | Richards et al. |
| 6,512,455 B2 | 1/2003 | Finn et al. |
| 6,522,266 B1 | 2/2003 | Soehren et al. |
| 6,622,090 B2 | 9/2003 | Lin |
| 6,631,323 B2 | 10/2003 | Tucker et al. |
| 6,658,354 B2 | 12/2003 | Lin |
| 6,681,629 B2 | 1/2004 | Foxlin et al. |
| 6,721,769 B1 | 4/2004 | Rappaport et al. |
| 6,792,353 B2 | 9/2004 | Lin |
| 6,813,582 B2 | 11/2004 | Levi et al. |
| 6,826,477 B2 | 11/2004 | Ladetto et al. |
| 6,833,811 B2 | 12/2004 | Zeitfuss et al. |
| 6,847,892 B2 | 1/2005 | Zhou et al. |
| 6,850,844 B1 | 2/2005 | Walters et al. |
| 6,898,559 B2 | 5/2005 | Saitta |
| 6,900,732 B2 | 5/2005 | Richards |
| 6,922,632 B2 | 7/2005 | Foxlin |
| 6,944,542 B1 | 9/2005 | Eschenbach |
| 6,995,665 B2 | 2/2006 | Appelt et al. |
| 7,000,469 B2 | 2/2006 | Foxlin et al. |
| 7,015,831 B2 | 3/2006 | Karlsson et al. |
| 7,034,678 B2 | 4/2006 | Burkley et al. |
| 7,091,851 B2 | 8/2006 | Mason et al. |
| 7,091,852 B2 | 8/2006 | Mason et al. |
| 7,103,471 B2 | 9/2006 | Levi et al. |
| 7,106,189 B2 | 9/2006 | Burneske et al. |
| 7,135,992 B2 | 11/2006 | Karlsson et al. |
| 7,143,130 B2 | 11/2006 | Lin |
| 7,145,478 B2 | 12/2006 | Goncalves et al. |
| 7,161,504 B2 | 1/2007 | Linn |
| 7,162,338 B2 | 1/2007 | Goncalves et al. |
| 7,177,737 B2 | 2/2007 | Karlsson et al. |
| 7,199,754 B2 | 4/2007 | Krumm et al. |
| 7,203,497 B2 | 4/2007 | Belcea |
| 7,236,880 B2 | 6/2007 | Fager et al. |
| 7,239,277 B2 | 7/2007 | Fullerton et al. |
| 7,239,953 B2 | 7/2007 | Braunberger et al. |
| 7,245,215 B2 | 7/2007 | Gollu et al. |
| 7,245,216 B2 | 7/2007 | Burkley et al. |
| 7,250,907 B2 | 7/2007 | Krumm et al. |
| 7,263,379 B1 | 8/2007 | Parkulo et al. |
| 7,272,467 B2 | 9/2007 | Goncalves et al. |
| 7,295,119 B2 | 11/2007 | Rappaport et al. |
| 7,301,648 B2 | 11/2007 | Foxlin |
| 7,302,359 B2 | 11/2007 | McKitterick |
| 7,305,303 B2 | 12/2007 | Soehren et al. |
| 7,377,835 B2 | 5/2008 | Parkulo et al. |
| 7,379,015 B2 | 5/2008 | Workman |
| 7,389,207 B2 | 6/2008 | Saitta |
| 7,400,246 B2 | 7/2008 | Breeding |
| 7,403,853 B1 | 7/2008 | Janky et al. |
| 7,405,658 B2 | 7/2008 | Richards |
| 7,421,340 B2 | 9/2008 | Ladetto et al. |
| 7,423,580 B2 | 9/2008 | Markhovsky et al. |
| 7,516,039 B2 | 4/2009 | McKitterick |
| 7,538,715 B2 | 5/2009 | Langford et al. |
| 7,573,403 B2 | 8/2009 | Goncalves et al. |
| 7,587,274 B2 | 9/2009 | Kaldewey et al. |
| 7,646,336 B2 | 1/2010 | Tan et al. |
| 7,672,781 B2 | 3/2010 | Churchill et al. |
| 7,679,532 B2 | 3/2010 | Karlsson et al. |
| 7,689,321 B2 | 3/2010 | Karlsson |
| 7,701,347 B2 | 4/2010 | Richards |
| 7,725,253 B2 | 5/2010 | Foxlin |
| 7,747,409 B2 | 6/2010 | Ladetto et al. |
| 8,296,058 B2 | 10/2012 | Koskan et al. |
| 8,423,042 B2 | 4/2013 | Markhovsky et al. |
| 8,731,817 B2 | 5/2014 | Ballew et al. |
| 2002/0010694 A1 | 1/2002 | Navab et al. |
| 2002/0193091 A1 | 12/2002 | Zmarthie |
| 2003/0045998 A1 | 3/2003 | Medl |
| 2003/0135324 A1 | 7/2003 | Navab |
| 2003/0158635 A1 | 8/2003 | Pillar et al. |
| 2003/0158664 A1 | 8/2003 | Swope et al. |
| 2003/0191582 A1 | 10/2003 | Terada |
| 2003/0214410 A1 | 11/2003 | Johnson et al. |
| 2004/0021569 A1 | 2/2004 | Lepkofker et al. |
| 2005/0033515 A1 | 2/2005 | Bozzone |
| 2005/0060088 A1 | 3/2005 | Helal et al. |
| 2005/0234679 A1 | 10/2005 | Karlsson |
| 2005/0250440 A1 | 11/2005 | Zhou et al. |
| 2006/0002590 A1 | 1/2006 | Borak |
| 2006/0023681 A1 | 2/2006 | A'Rafat |
| 2006/0125644 A1 | 6/2006 | Sharp |
| 2006/0287824 A1 | 12/2006 | Lin |
| 2007/0001904 A1 | 1/2007 | Mendelson |
| 2007/0032748 A1 | 2/2007 | McNeil et al. |
| 2007/0050129 A1 | 3/2007 | Sailmre |
| 2007/0093962 A1 | 4/2007 | Swope et al. |
| 2007/0139200 A1 | 6/2007 | Yushkov et al. |
| 2007/0168126 A1 | 7/2007 | Wence et al. |
| 2007/0168127 A1 | 7/2007 | Zaruba et al. |
| 2007/0271011 A1 | 11/2007 | Lee et al. |
| 2007/0271037 A1 | 11/2007 | Overstreet et al. |
| 2007/0282565 A1 | 12/2007 | Bye et al. |
| 2008/0004796 A1 | 1/2008 | Schott et al. |
| 2008/0036594 A1 | 2/2008 | Kates |
| 2008/0077326 A1 | 3/2008 | Funk et al. |
| 2008/0186161 A1 | 8/2008 | Fussner et al. |
| 2009/0043504 A1 | 2/2009 | Bandyopadhyay et al. |
| 2009/0216438 A1 | 8/2009 | Shafer |
| 2012/0130632 A1 | 5/2012 | Bandyopadhyay et al. |
| 2013/0166195 A1 | 6/2013 | Bandyopadhyay et al. |
| 2013/0166198 A1 | 6/2013 | Funk et al. |

OTHER PUBLICATIONS

U.S. Appl. No. 61/049,020, filed Apr. 30, 2008, Bandyopadhyay et al.
U.S. Appl. No. 13/616,350, filed Sep. 14, 2012, Bandyopadhyay et al.
AGNC Coremicro® AHRS/INS Unit Specification, GSA Contract No. GS-24F-0014K, ©1986-2006 American GNC Corporation, 1 page.

(56) References Cited

OTHER PUBLICATIONS

Atair Aerospace Circinus Overview, GPS-Integrated IMU, http://www.atairaerosoace.com/circinus/, ©2008 Atair Aerospace, Inc., 4 pages.
Australian Patent Application No. 2007348326—Examiners Report dated Oct. 8, 2010, 2 pages.
Bailey, Tim, et al., "Simultaneous Localization and Mapping (SLAM): Part II", Tutorial, IEEE Robotics & Automation Magazine, Sep. 2006, pp. 108-117.
Bennewitz, Maren, et al., "Adapting Navigation Strategies Using Motions Patterns of People", Proceedings of the 2003 IEEE International Conference on Robotics & Automation, Taipei, Taiwan, Sep. 14-19, 2003, pp. 2000-2005.
Brown, Alison K., et at., "Performance Test Results of an Integrated GPS/MEMS Inertial Navigation Package", Proceedings of ION GNSS 2004, Long Beach, California, Sep. 2004, 8 pages.
Cross, Paul, et al., "Intelligent Navigation, Inertial Integration, Double Assistance for GPS", GPS World, May 1, 2002, 7 pages.
Cyganski, David, et al., "Performance Limitations of a Precision Indoor Positioning System Using a Multi-Carrier Approach", ION NTM 2005, San Diego, California, Jan. 24-26, 2005, 1093-1100.
Desouza, Guiherme, et al., Vision for Mobile Robot Navigation: A Survey, IEEE Transactions on Pattern Analysis and Machine Intelligence, Feb. 2002, 24(2), 237-267.
Diebel, J., et al., "Simultaneous Localization and Mapping with Active Stereo Vision", Proceedings of 2004 IEEE/RSJ International Conference on Intelligent Robots and Systems, Sendai, Japan, Sep. 28-Oct. 2, 2004, pp. 3436-3443.
Doucet, Arnaud, et al., "Monte Carlo Methods for Signal Processing: A Review in the Statistical Signal Processing Context", IEEE Sional Processino Magazine, Nov. 2005, pp. 152-170.
Durrant-Whyte, Hugh, "Uncertain Geometry in Robotics", IEEE Journal of Robotics and Automation, Feb. 1988, 4(1), pp. 23-31.
Durrant-Whyte, Hugh, et al., "Simultaneous Localization and Mapping: Part 1", Tutorial, IEEE Robotics & Automation Magazine, Jun. 2006, pp. 99-108.
European Patent Application No. 08797306.1—Supplementary European Search Report dated Aug. 28, 2012, 8 pages.
European Patent Application No. 08797306.1—European Search Opinion and Supplemental European Search Report dated Sep. 5, 2012, 9 pages.
Foxlin, Eric, "Intertial Head-Tracker Sensor Fusion by a Complementary Separate-Bias Kalman Filter", Proceedinas of VRAIS '96, © 1996 IEEE, 185-194.
Foxlin, Eric, "Pedestrian Tracking with Shoe-Mounted Inertial Sensors", Moving Mixed Reality into the Real World, published by the IEEE Computer Society, Nov./Dec. 2005, 38-46.
Godha, S., et at., "Integrated GPS/INS System for Pedestrian Navigation in a Signal Degraded Environment", ION GNSS 2006, Fort Worth, Texas, Sep. 26-29, 2006, 14 pages.
Group 1 Solutions, Inc. Press Release, "Remote AccessTM Showcased at Fire Rescue International Advanced Technology Center", Sep. 15, 2006, 1 page.
Honeywell HG1900 MEMS IMU (Inertial Measurement Unit), "Next-Generation Inertial Measurement Unit Provides Sophisticated Guidance for Tactical Military Applications," Honeywell, © 2004, Mar. 2005, 2-page brochure.
International Patent Application No. PCT/US07/13039—International Search Report and Written Opinion mailed Sep. 10, 2008, 8 pages.
International Patent Application No. PCT/US08/72378—International Preliminary Report on Patentability mailed Feb. 9, 2010, 5 pages.
International Patent Application No. PCT/US08/72378—International Search Report and Written Opinion mailed Nov. 3, 2008, 8 pages.
Jensfelt, P., et al., "A Framework for Vision Based Bearing Only 3D SLAM", Proceedings of the 2006 IEE International Conference on Robotics and Automation, Orlando, Florida, May 2006, pp. 1944-1950.
Langelaan, Jack, eta/., "Passive GPS-Free Navigation for Small UAVs", IEEEAC Paper No. 1132, © 2005 IEEE, 9 pages.
Lee, Dr. Young C., eta/., "A Performance Analysis of a Tightly Coupled GPS/Inertial System for Two Integrity Monitoring Methods", ©1999, The MITRE Corporation, Center for Advanced Aviation System Development (CAASD), Mclean, Virginia, 14 pages.
Life-Line Wireless Environment & Safety Monitoring System, ©2006, Safe Environment Engineering, http://www.safeenv.com, one page.
MEMSense µIMU Micro Inertial Measurement Unit, Series Documentation, Document DN00009, Revision 2.8, Nov. 2007, 12 pages.
MEMSense nIMU Nano Inertial Measurement Unit, Series Documentation, Document DN00010, Version 2.9, Nov. 2007, 15 pages.
Miller, Leonard E., "Indoor Navigation for First Responders: A Feasibility Study", Wireless Communication Technologies Group, Advanced Networking Technologies Division, Information Technology Laboratory, National Institute of Standards and Technology, Feb. 10, 2006, 56 pages.
Montemerlo, Michael, et al., "Conditional Particle Filters for Simultaneous Mobile Robot Localization and People-Tracking", Proceedings of the 2002 IEEE International Conference on Robotics & Automation, Washington, D.C., May 2002, 7 pages.
Park, Sang-Cheol, et al., "Fast Distance Computation with a Stereo Head-Eye System", BMCV 2000, LNCS 1811, ©2000, pp. 434-443.
Se, Stephen, et al., "Vision-Based Global Localization and Mapping for Mobile Robots", IEEE Transactions on Robotics, 21(3), Jun. 2005, 364-375.
Singapore Patent Application No. 200808868-4—Search Report performed by the Australian Patent Office dated Oct. 29, 2009, 4 pages.
Singapore Patent Application No. 200808868-4—Second Written Opinion performed by the Australian Patent Office dated Jul. 5, 2010, 8 pages.
Singapore Patent Application No. 200808868-4—Written Opinion performed by the Australian Patent Office dated Oct. 29, 2009, 6 pages.
Smith, Randall, et al., "Estimating Uncertain Spatial Relationships in Robotics", SRI International, [no date]. 26 pages.
U.S. Appl. No. 11/756,412—U.S. Final Office Action dated Feb. 4, 2011, 38 pages.
U.S. Appl. No. 11/756,412—U.S. Non-Final Office Action dated Jun. 21, 2010, 22 pages.
U.S. Appl. No. 11/756,412—U.S. Non-Final Office Action dated Oct. 26, 2009, 8 pages.
U.S. Appl. No. 11/756,412—U.S. Notice of Allowance dated Aug. 29, 2012, 21 pages.
U.S. Appl. No. 12/187,067—U.S. Final Office Action dated Aug. 22, 2012, 11 pages.
U.S. Appl. No. 12/187,067—U.S. Non-Final Office Action dated Dec. 9, 2010, 5 pages.
Yi, Sooyeong, et al., "An Omnidirectional Stereo Vision System Using a Single Camera",© 2006, IEEE, 6 pages.

SYSTEM AND METHOD FOR LOCATING, TRACKING, AND/OR MONITORING THE STATUS OF PERSONNEL AND/OR ASSETS BOTH INDOORS AND OUTDOORS

CROSS-REFERENCE TO RELATED APPLICATIONS

This application is a continuation of U.S. patent application Ser. No. 12/187,067, filed Aug. 6, 2008 (status: pending), which claims priority to U.S. Provisional Patent Application Ser. No. 60/954,112, filed Aug. 6, 2007, and U.S. Provisional Patent Application Ser. No. 61/049,020, filed Apr. 30, 2008, each of which is hereby incorporated herein by reference in its entirety.

STATEMENT REGARDING FEDERALLY SPONSORED RESEARCH OR DEVELOPMENT

This invention was made with U.S. Government support under Contract No. IIP-0750498, awarded by the National Science Foundation; and Contract No. SBIR-HM1582-08-C-0007, awarded by the National Geospatial-Intelligence Agency. The U.S. Government has certain rights in this invention.

FIELD OF THE INVENTION

The invention relates generally to a system and method for locating, tracking, and/or monitoring the status of personnel and/or assets, both indoors and outdoors.

BACKGROUND OF THE INVENTION

Systems that locate, track, and monitor the status of personnel and/or assets generally utilize or incorporate known technology including, for example, Global Positioning System (GPS) technology, inertial and non-inertial sensor devices, and signal analysis methods. A variety of factors, however, can negatively impact the accuracy of such systems.

For example, although GPS has proved to be a useful navigation and tracking tool for outdoor tracking applications, a number of limitations exist when applying GPS to indoor navigation and tracking GPS relies primarily on a line of sight signal acquisition. In indoor environments and in close proximity of most complex buildings, however, the line of sight of GPS satellites may be substantially obscured and GPS signals may be highly attenuated. As a result, GPS signals are typically several orders of magnitude weaker in indoor environments than outdoors. With such weakened signals, GPS receivers have difficulty receiving GPS signals and calculating accurate position information.

As another example, inertial tracking systems typically use readings from sensors such as gyroscopes and accelerometers to estimate the relative path of personnel and/or assets. Inertial systems, however, may accumulate large errors over time due to factors such as drift in sensor offsets, sensitivity, and measurement limitations of the sensors, as well as limitations of the location determining methods (e.g., algorithms) implemented by such systems. Additionally, the size and cost requirements to track personnel and/or smaller assets may necessitate the use of less expensive and robust inertial sensors, potentially increasing drift in the system. While some man-made assets such as cars and robots use known motion models to aid in their tracking, the apparent lack of a comprehensive model that captures and describes the complexity of human locomotion can further add to inertial errors while tracking personnel.

Signal analysis methods that use signals of the same (or different) frequencies from different reference points to compute the location of personnel and/or assets may be unfeasible due to the need to install a number of reference devices at a particular tracking location (or scene), and may further have large instantaneous errors, and outliers, due to the multi-path effects of signals traveling through various building materials.

As yet another example, while the use of magnetic field sensors and compasses may provide an accurate detection of a heading angle in the absence of magnetic interference, data acquired from these devices may often be inaccurate in buildings due to interference from the building structure, electric lines, and other local magnetic sources. As such, valid compass angles, though available at some building locations, often cannot be depended on at each point in time over a data collection time interval.

These and other drawbacks exist with known tracking systems.

SUMMARY OF THE INVENTION

The invention addressing these and other drawbacks relates to a system and method for locating, tracking, and/or monitoring the status of personnel and/or assets, both indoors and outdoors. "Personnel," as used herein, may refer broadly (and without limitation) to living entities (e.g., people, animals, etc.), while "assets" may refer broadly (and without limitation) to objects including, for example, those being moved or controlled by personnel as well as autonomous objects such as robots. A person (or other example of personnel) and an asset may also each be referred to herein more broadly as a "trackee" or a "target," or using another similar descriptor.

The invention may be adapted to locate, track, and/or monitor the status of personnel and/or assets in various indoor and outdoor locations or environments, in any number of various scenarios or applications, without limitation. For example, the features and functionality of the invention as described herein may be used to locate, track, and/or monitor the status of emergency personnel or first responders (e.g., fire-fighters, police, emergency services technicians, etc.) during an emergency incident (e.g., a building fire), people having VIP status (e.g., heads of state, dignitaries, celebrities, etc.) at a particular event, individuals (or assets) on University and/or corporate campuses, senior citizens at an assisted living center, and military and para-military personnel and/or law enforcement officials in various environments during any number of scenarios. The invention may be configured for additional applications as well. Accordingly, it should be understood that any descriptions provided herein of particular personnel and/or assets in particular locations or environments (e.g., firefighters or first responders fighting a building fire from locations both inside and outside of a building) are exemplary in nature only, and should not be viewed as limiting.

In one implementation of the invention, one or more persons (or other personnel) and/or assets to be monitored at a particular location or environment may be outfitted with a tracking system. The tracking system may comprise, for example, an Inertial Navigation Unit (INU), a Communications Sensor Module (CSM), and/or other sensors or devices that may acquire physiological data from a user, environmental data from the location or environment, or other information.

The INU may comprise a small device that may be worn by a user, and may include inertial navigation sensors and signal processing components to determine the location, motion and orientation of the user. The CSM may comprise a small device carried by the user and may be in wired or wireless communication with the INU (and/or other physiological and environmental sensors or devices) to receive sensor data. In one implementation, for instance, the INU may communicate with the CSM using a Bluetooth, Zigbee, or other wireless transceiver obviating the need for wires. The INU and CSM may establish a wireless personal area network (WPAN) on each trackee, allowing for the addition of other distributed wireless sensors on the trackee as needed.

In one implementation, the CSM may aggregate data from the various sensors that comprise the tracking system "onboard" the trackee. The CSM may, for example, compile sensor data into a report which may be transmitted to a computer of a user that is monitoring the trackees (e.g., an incident commander at an emergency scene). Reports may be transmitted in a predetermined format to the computer at predetermined intervals, on request, or at other times.

The computer may comprise a general purpose computer programmed with a mapping software application (and/or other software) that enables the various features and functions of the invention, as described in greater detail herein. The computer may comprise a portable (e.g., laptop) computer which may, for example, serve as a "base station" or "command center" providing for the monitoring and management of personnel and assets (and information associated therewith) at a particular location or environment. The computer may also comprise a cell phone, smart phone, PDA, pocket PC, or other device, and may be included within the WPAN described above. The computer may also be incorporated into one or more of the components (e.g., the INU) of a tracking system.

According to an aspect of the invention, the mapping application may enable position estimates of personnel and/or assets (including, but not limited to, estimates based on INU, GPS, or fused sensor data) to be displayed (e.g., overlayed) on maps (or other displays) of various kinds Position estimates may also be referred to herein, for example, as "location estimates" or "tracking estimates." A "track" or "path" or "trajectory" may comprise a collection of position estimates. Identification and status information of personnel and/or assets as determined by one or more sensors of a tracking system may also be displayed.

To enable the foregoing (and other) functionality, the mapping application may receive building data, tracking data, and/or other data as input.

Information about specific buildings (or building data) may be an extremely valuable tool. It may, for example, help in situational awareness for emergency services, for navigation and mission planning, for viewing navigation and tracking data, and for improving the location estimates in the tracking data obtained from one or more tracking systems. Most buildings are characterized by common features such as long edges along the building's orientation, hallways, and possibly multiple floors (with stairwells, elevators, and escalators being the primary methods to change floors). In addition, buildings may be characterized, for example, by construction type, and layout type. The knowledge of building data may be used to improve the accuracy of both outdoor and, in particular, indoor tracking data by matching the tracking data to known building features. By combining information that may observed from aerial imagery, site surveying, user contribution, or various other sources, a comprehensive database of building data may be created for use in several applications.

Tracking data may be obtained from any number of sources utilizing any number of tracking methods (e.g., inertial navigation and signal-based methods). In one implementation, the tracking data may comprise data acquired in real-time (e.g., one or more tracking points may be provided with every new update) while personnel and/or assets are outfitted with tracking systems and are being monitored. Alternatively, the tracking data may comprise previously-acquired data that may be provided to the mapping application for post-processing. Tracking data provided as input to the mapping application may be used to generate a position (or location) estimate for one or more trackees. This position estimate may be improved via techniques customized for different types of tracking data. Additional information may also be provided to the mapping application to increase the accuracy of the position estimate.

According to an aspect of the invention, the mapping application may generate more accurate position estimates for trackees using a suite of mapping tools to make corrections to the tracking data. Additionally, the mapping application may further use information from building data, when available, to enhance the position estimates. As disclosed in detail herein, various mapping methods employed by the mapping application may be broadly differentiated as indoor tracking methods or outdoor tracking methods. Some methods, however, may be used for both indoor and outdoor tracking.

According to an aspect of the invention, indoor tracking methods may be utilized to take tracking data from one or more trackees and compute a more accurate tracking estimate for each trackee. Examples of indoor tracking methods may include sensor fusion methods, map matching methods, and map building methods.

When the tracking data comprises tracking estimates, and/or tracking information from multiple sources or techniques (e.g., inertial tracking estimates and compass data, or inertial tracking estimates and signal-based tracking estimates), the mapping application may fuse the data into a single tracking estimate which can be more accurate than the individual estimates. This process is referred to herein as sensor fusion. Sensor fusion methods may also account for logical limitations imposed by the structure of a building.

Map matching methods may include methods that correlate the tracking data to known features in the building. For example, building data and tracking data may be received as inputs, and building features and characteristics may be utilized to improve the accuracy of the provided tracking data. In particular, the trajectory of personnel and/or assets in a building may be limited and characterized by features in the building such as hallways, stairwells, elevators, etc. While tracking personnel and/or assets in buildings, the tracking data input may be matched to known features in the building to increase the position accuracy and reduce and/or remove the errors inherent in the methods used to obtain the tracking data.

In the absence of building data, map building methods may be implemented to generate features and/or landmarks of a building using sections of tracking data, and then use these features to match and correct other sections of tracking data. Map building may include generation and matching functionalities as well as the functionality of sensor fusion methods.

In the presence of poor quality floor plans or partial floor plans of a building, the mapping application may simultaneously implement map matching and map building methods, thus matching tracking data to existing features, and generating features that are not known.

According to an aspect of the invention, when tracking personnel and/or assets outdoors, it may be useful to utilize GPS data along with inertial tracking data. As such, in one implementation, the mapping application may enhance outdoor tracking data by combining tracking estimates such as inertial tracks with magnetic and/or compass data if and when available, and with GPS, if and when available. Additionally, it may further enhance an outdoor tracking estimate if building outlines are available using correction methods such as methods that prevent tracks from overlapping building outlines.

In one implementation, an inertial-GPS fusion algorithm (referred to herein as the "IGX Algorithm") may fuse separate inertial and GPS data for a tracking path into a single path estimate. Since accurate GPS data is, for the most part, generally only available outdoors, the IGX Algorithm primarily functions as an outdoor algorithm, although it can continue tracking outdoors or indoors in the absence of GPS.

Various other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF THE INVENTION

The invention described herein is directed to a system and method for locating, tracking, and/or monitoring the status of personnel and/or assets, both indoors and outdoors.

As a general overview, an exemplary system architecture will first be provided, followed by a discussion of the various types of input that may be provided to the mapping software application disclosed herein. In some instances, the mapping software application may be referred to interchangeably herein as "mapping software" or "mapping technology." An overview of the features and functionality enabled by the mapping software application will then be described, followed by a discussion of various mapping techniques and tools. A description of various indoor tracking methods and outdoor tracking methods will also be provided.

I. Exemplary System Architecture

Figure 1:
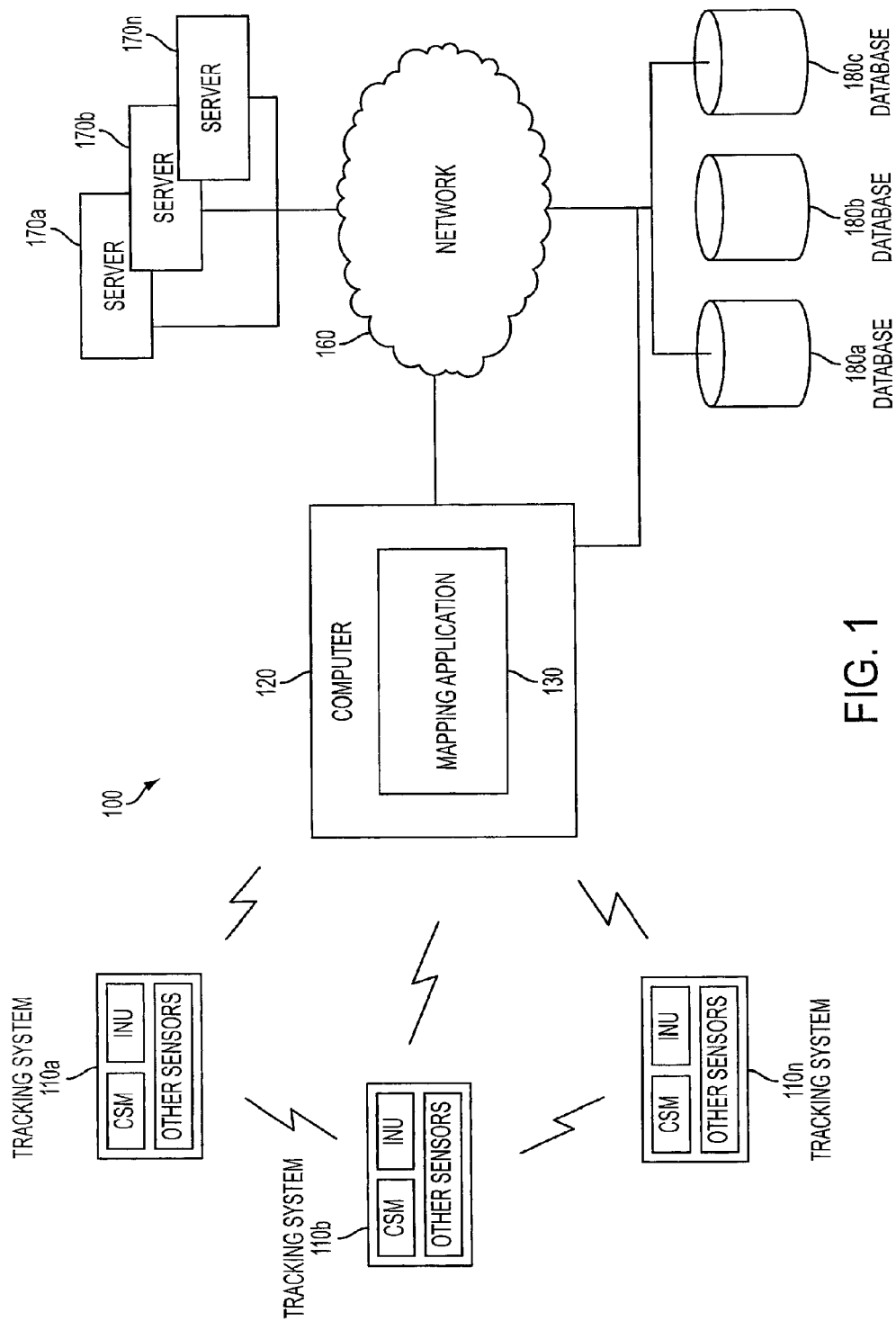
FIG. 1 depicts an exemplary system architecture, according to an aspect of the invention.

FIG. 1 depicts an exemplary system architecture 100, according to an aspect of the invention. In one implementation, one or more tracking systems (110a, 110b, . . . 110n) may be provided for one or more persons (or other personnel) and/or assets to be monitored at a particular location or environment. Each tracking system may comprise, for example, an Inertial Navigation Unit (INU), a Communications Sensor Module (CSM), and/or other sensors or devices that may acquire physiological data (e.g., heart rate, respiration rate, etc.) from a user, environmental information (e.g., temperature, atmospheric pressure, background radiation, etc.), or other information.

Figure 2:
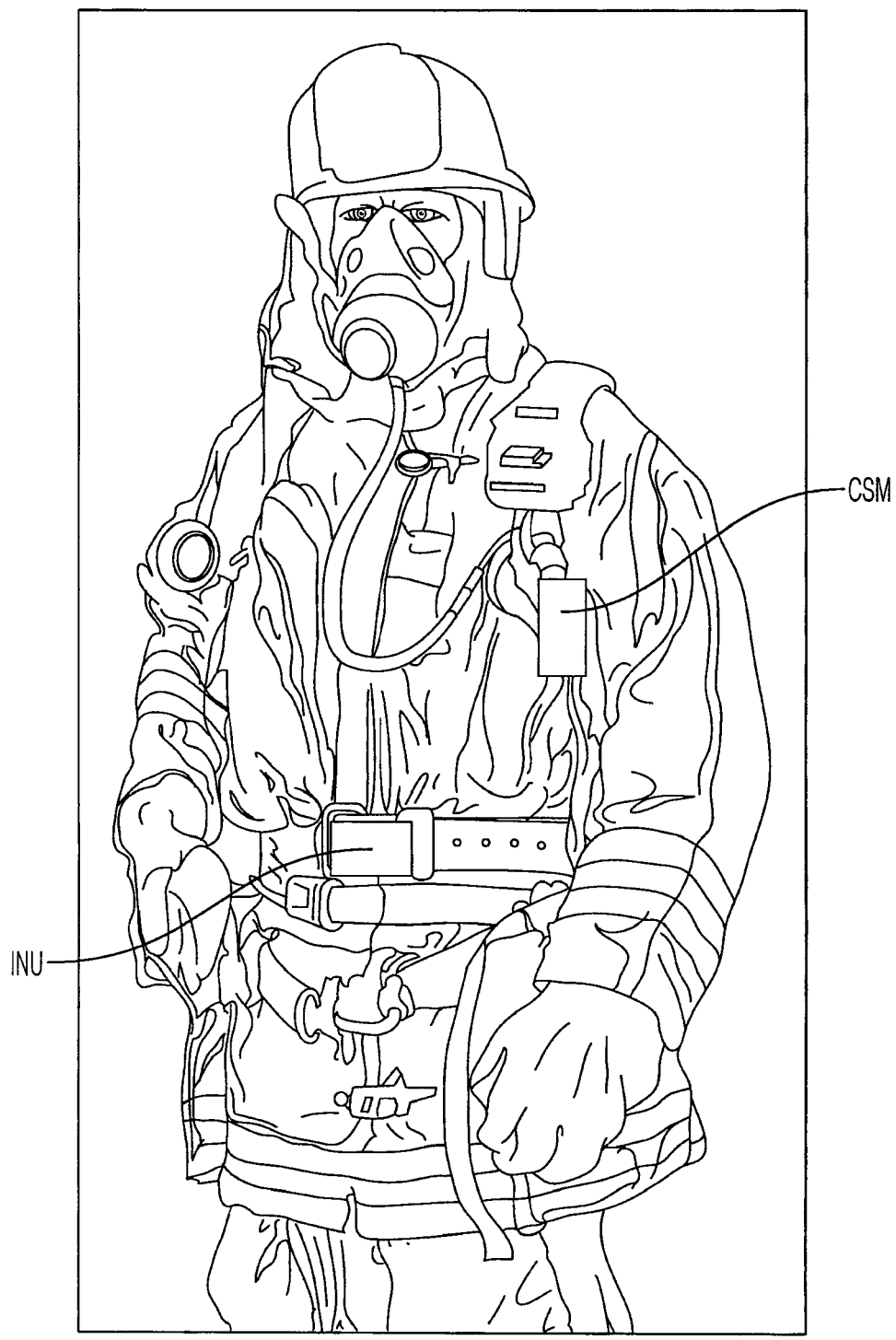
FIG. 2 is an exemplary illustration of firefighter outfitted with components of a tracking system, according to an aspect of the invention.

The INU may comprise a small device that may be worn by a user, and may include inertial navigation sensors and signal processing components to determine the location, motion and orientation of the user. The CSM may comprise a small device carried by the user and may be in wired or wireless communication with the INU (and/or other physiological and environmental sensors or devices) to receive sensor data. In one implementation, for instance, the INU may communicate with the CSM using a Bluetooth, Zigbee, or other wireless transceiver obviating the need for wires. The INU and CSM may establish a wireless personal area network (WPAN) on each trackee, allowing for the addition of other distributed wireless sensors on the trackee as needed. FIG. 2 is an exemplary illustration of a firefighter outfitted with an INU and a CSM.

In one implementation, the CSM may include a radio transceiver for communicating the data wirelessly to one or more computing devices such as, for example, a computer 120 which may serve as a "base station" or "command center" at the particular location or environment. The INU, CSM, and/or other components comprising a given tracking system may each be powered (individually or collectively) by one or more batteries (or other power source(s)). In one implementation, the INU, CSM, and/or other physiological (or other) sensors or devices may be integrated into a single device.

Inertial Navigation Unit (INU)

According to an aspect of the invention, the INU may use inertial sensors and magnetic or electro-magnetic field sensors to generate data that can be used to determine location, motion and orientation of a trackee. This may be accomplished by combining a variety of motion sensing components with a microprocessor or microcontroller which provides both I/O support for the peripheral sensors and computational capabilities for signal processing functions.

In one implementation, motion detecting microelectronic sensors can be utilized, which may include Micro-Electrical-Mechanical System (MEMS) technology. The INU can include a combination of digital or analog accelerometers, gyroscopes, and magnetic field sensors. In one configuration, for example, the INU may include a MEMS three-axis accelerometer, a one and two axis MEMS gyroscope, and a MEMS 3-axis magnetic field sensor. Other configurations may be implemented.

In one implementation, one or more tracking algorithms may be implemented on an INU by way of a signal processing microcontroller. The one or more programmed tracking algorithms running on the microcontroller of the INU may receive sensor data as input, and output x, y, and z location coordinates of the personnel or asset being tracked relative to its environment. "Location estimates," "position estimates," and "tracking estimates" may be used interchangeably herein.

Communications and Sensor Module (CSM)

According to an aspect of the invention, the CSM may perform the task of data aggregation from the various sensors "on-board" the trackee. The CSM may, for example, compile sensor data into a report which may be transmitted to computer 120 in a predetermined format either at predetermined intervals, on request, or at another time. The CSM may also include a panic button (or control) to enable a trackee to communicate distress to computer 120, along with one or more general purpose controls (or buttons) whose status may be communicated to computer 120 for processing.

In one implementation, performing signal processing of the sensor data at the INU obviates the need to stream data to computer 120. In operation, only a relatively small amount of data may be sent by the INU to the CSM, and by the CSM to computer 120. Reducing the amount of data sent to computer 120 may reduce the probability of wireless transmission errors, and extend the range of communication between the CSM and computer 120 to greater distances such as, for example, several miles. In addition, this feature also provides for reliable communication of data from deep within the confines of multi-story buildings and structures of the type that are found in urban and university campus environments.

In an alternative implementation, signal processing of the sensor data may occur after the sensor data is received at computer 120.

Computer 120

Computer 120 may comprise a general purpose computer programmed with a mapping software application 130 (and/or other software) that enables the various features and functions of the invention, as described in greater detail below.

Those having skill in the art will recognize that computer 120 may comprise a processor, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data which may be manipulated by the processor. The storage devices may comprise floppy disks, hard disks, optical disks, tapes, or other storage devices for storing computer-executable instructions and/or data. One or more applications, including mapping software application 130, may be loaded into memory and run on an operating system of computer 120. Mapping application 130 may comprise software module(s) which may enable the features and functionality and implement the various methods (or algorithms) described in detail herein. Further, as noted above, mapping application 130 may be referred to interchangeably herein as "mapping software" or "mapping technology." In some implementations, an Application Program Interface (API) may be provided to, for example, enable third-party developers to create complimentary applications, and/or to enable content exchange.

In one exemplary implementation, computer 120 may comprise a portable (e.g., laptop) computer which may serve as a "base station" or "command center" providing for the monitoring and management of personnel and assets (and information associated therewith) at a particular location or environment. Computer 120 may also comprise a cell phone, smart phone, PDA, pocket PC, or other device, and may be included within the WPAN described above. Computer 120 may also be incorporated into one or more of the components (e.g., the INU) of a tracking system. In one implementation, computer 120 may be connected to a radio transceiver to enable a supervisory user, an administrator, or other user to receive data from personnel and assets via the CSMs of their respective tracking systems, and to transmit individual or broadcast messages to personnel (and assets) such as warnings (e.g., to evacuate an area). According to one implementation, data may be received via a wireless network at computer 120 using any of a variety of network protocols including, for example, TDMA, CDMA or other self-forming mesh communication network protocols.

Mapping application 130 may provide a Graphical User Interface (GUI) (or other interface) for, among other things, providing graphical displays of position (or tracking) estimates of personnel and/or assets (including, but not limited to, estimates based on INU, GPS, or fused sensor data) on maps (or other displays) of various kinds including those generated based on collected trajectory data. The GUI may further display identification and status information of personnel and/or assets as determined by sensors connected to the CSM, including the INU. In this regard, a user of computer 120 (e.g., an incident commander at an emergency scene) can monitor, among other things, the location and status information of personnel and/or assets that have been outfitted with a tracking system. As such, in one exemplary application of the invention, a First Responder Safety Communications Network is created that links all emergency personnel and/or assets outfitted with tracking systems with one or more Incident Commanders.

According to an aspect of the invention, and as described in greater detail below, image processing and artificial intelligence based mapping may be used to correlate the INU information (and/or other sensor data), for example, to maps of a given building or location. In one implementation of the invention, for example, position estimates of a trackee may be displayed by overlaying the position estimates on to one or more images (or other displays) depicting a trackee's current general location or environment. Examples of images (or other displays) may include images of a building outline, a building floor plan, an overhead image of one more buildings or structures (e.g., a corporate or university campus), or of other locations or environments, without limitation.

A user may select to view, for example, a trackee's current position estimate (displayed in real-time), some or all of a trackee's path (or trajectory) as it is generated in real-time (e.g., by displaying some or all of the position estimates generated for the trackee based on tracking data acquired for the trackee during a current tracking session), various position estimates that have been generated (during later processing) based on previously acquired tracking data for a trackee, and/or previous paths (or segments thereof) of a trackee based on previously acquired tracking data for a trackee.

In those instances when an image (or other display) of a trackee's current location or environment may be unavailable, position estimates may be displayed on a map as it is being created using map building methods described in detail herein.

In one implementation, if multiple trackees are being monitored, the position estimates (and/or tracks) of each trackee may be identified by a unique visual indicator (e.g., color, shape, etc.) to facilitate the process of differentiating one trackee from another. In some implementations, a trackee's associated visual indicator may differ depending on whether the trackee is indoors or outdoors. For example, a trackee may be depicted on a display as a blue circle while indoors, and a blue square while outdoors. Other variations may be implemented.

Map information (including, for example, floor plans and other building data or location data) may be obtained from a variety of sources without limitation, or else generated as described herein. In one implementation, computer 120 may access an Internet web site, an intranet site, or other site or application hosted by one or more servers (170a, 170b, . . . 170n) or other computers over a network 160 (via a wired or wireless communications link) to obtain map information. Map information may be obtained, for example, from Microsoft® Virtual Earth™ Google™ Earth, Geographic Information Systems (GIS) maps, or from other sources.

Network 160 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), or other network.

Map information, personnel information (e.g., name, age, height, weight, hair color, eye color, etc. of a person) asset information, and/or other information may be stored locally on computer 120, or in one or more databases (180a, 180b, . . . 180n) or other storage devices operatively connected to computer 120. Similarly, information collected from one or more tracking systems (110a, 110b, . . . 110n) such as, for example, INU data, physiological data (e.g., heart rate, respiration rate, etc.) from a user, environmental information (e.g., temperature, atmospheric pressure, background radiation, etc.), or other status, situational, or other information may likewise be stored locally on computer 120, or in one or more databases (180a, 180b, . . . 180n) or other storage devices operatively connected to computer 120.

It should be recognized that any database generally referenced in the Specification (e.g., a building database) may comprise one or more of databases (180a, 180b, . . . 180n) or other storage devices. Additionally, any data or information described as being stored in a database may also be stored locally on computer 120.

The invention, as described herein, may utilize and integrate different methodologies and system components to determine the location of tracked personnel and/or assets. Data may be fused electronically, using hardware and software, to minimize tracking error from any single data set or sensor. The system and method of the invention may integrate Inertial Navigation, including micro-electrical-mechanical systems (MEMS), Global Positioning Systems (GPS) when available, and signal processing and control algorithms incorporated in hardware and software to process (e.g., integrate) sensor data and determine, among other things, the location, motion, and orientation of personnel and/or assets inside complex structures (or at other locations or environments).

The foregoing description of the various components comprising system architecture 100 is exemplary only, and should not be viewed as limiting. The invention described herein may work with various system configurations. Accordingly, more or less of the aforementioned system components may be used and/or combined in various implementations. Moreover, additional description of the CSM, INU, and of other components of system 100 may be found in United States Patent Application Publication No. 2008/0077326 A1 to Funk et al., published Mar. 27, 2008, and entitled "METHOD AND SYSTEM FOR LOCATING AND MONITORING FIRST RESPONDERS" (U.S. application Ser. No. 11/756,412, filed May 31, 2007), which is hereby incorporated by reference herein in its entirety.

Having provided a non-limiting overview of exemplary system architecture 100, the various features and functions enabled by mapping application 130 (vis-à-vis various other system components) will now be explained. According to an aspect of the invention, users may access one or more of the features and functionality of mapping application 130 via the aforementioned GUI. Various views (or "screen shots" or "displays") that a user may encounter while using mapping application 130 are illustrated in one or more of the accompanying drawing figures, which are exemplary in nature. These views should therefore not be viewed as limiting. Additionally, user input may occur via any input device associated with computer 120 including, but not limited to, a keyboard, computer mouse, light stylus instrument, a finger in a touch-screen implementation, or other device. While user inputs may be referred to herein as occurring via "clicking," for example, such descriptions are exemplary in nature and should not be viewed as limiting.

II. Mapping Application Inputs

According to an aspect of the invention, building data, tracking data, and/or other data may be provided as input to mapping application 130.

A. Building Data

Information about specific buildings (or building data) organized in a building database (or other storage mechanism) can be an extremely valuable tool. Among other things, it can help in situational awareness for emergency services, for navigation and mission planning, for viewing navigation and tracking data, and for improving the location estimates in the tracking data obtained from one or more tracking systems (110a, 110b, . . . 100n). Most buildings are characterized by common features such as long edges along the building's orientation, hallways, and possibly multiple floors (with stairwells, elevators, and escalators being the primary methods to change floors). In addition, buildings may be characterized, for example, by construction type, and layout type.

The knowledge of building data may be used to improve the accuracy of both outdoor and, in particular, indoor tracking data by matching the tracking data to known building features. Several resources may provide aerial imagery comprising the location and images of buildings. In addition, there is Geographic Information Systems (GIS) mapping which includes building footprints in a layer. These resources may be directly used to extract building data. By combining information that can be observed from aerial imagery, GIS layers, site surveying, and user contribution, a comprehensive database of building data may be created for use in several applications.

In one implementation, mapping application 130 may enable users to, among other things, mark and register building data using various tools of the GUI.

Marking and Registering Building Data from Aerial Imagery.

Aerial images of buildings taken from different angles may be used to record building data, using the aforementioned GUI, to mark features. The GUI may enable a user to, among other things, "create" a new building in the building database by marking (or registering) its information, or "edit" an existing building by changing features, or adding new information.

Building Images.

Figure 3:
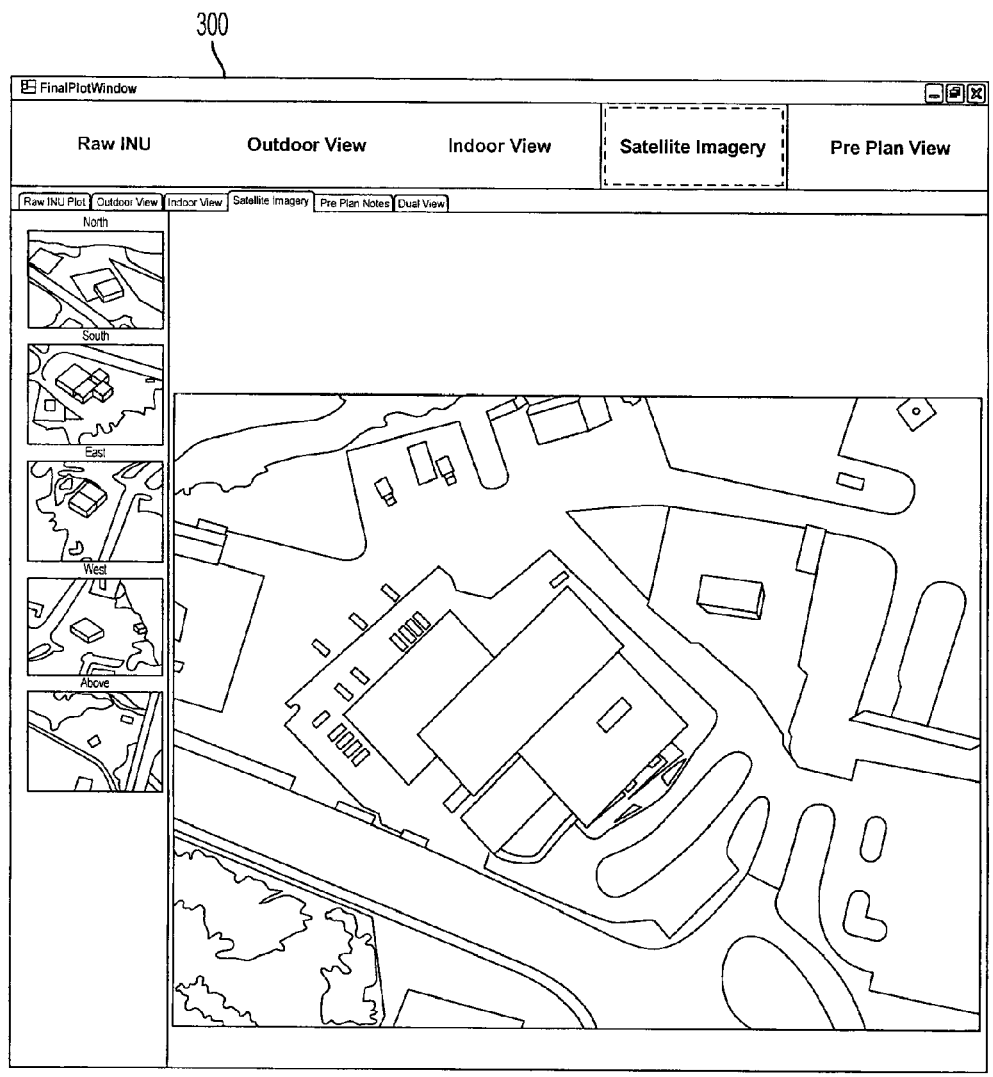
FIG. 3 is an exemplary illustration of a display of an overhead aerial image of a building, according to an aspect of the invention.

Images of a building from an overhead view may be obtained and stored using overhead aerial images. FIG. 3, for example, depicts a view 300 according to an aspect of the invention, wherein an overhead aerial image of a building obtained from a source (e.g., Microsoft® Virtual Earth™) may be displayed. This information can aid a variety of users in a variety of applications. As one illustrative example, this information can assist Emergency Incident Commanders in planning roof operations, such as venting, for firefighting operations.

Figure 4:
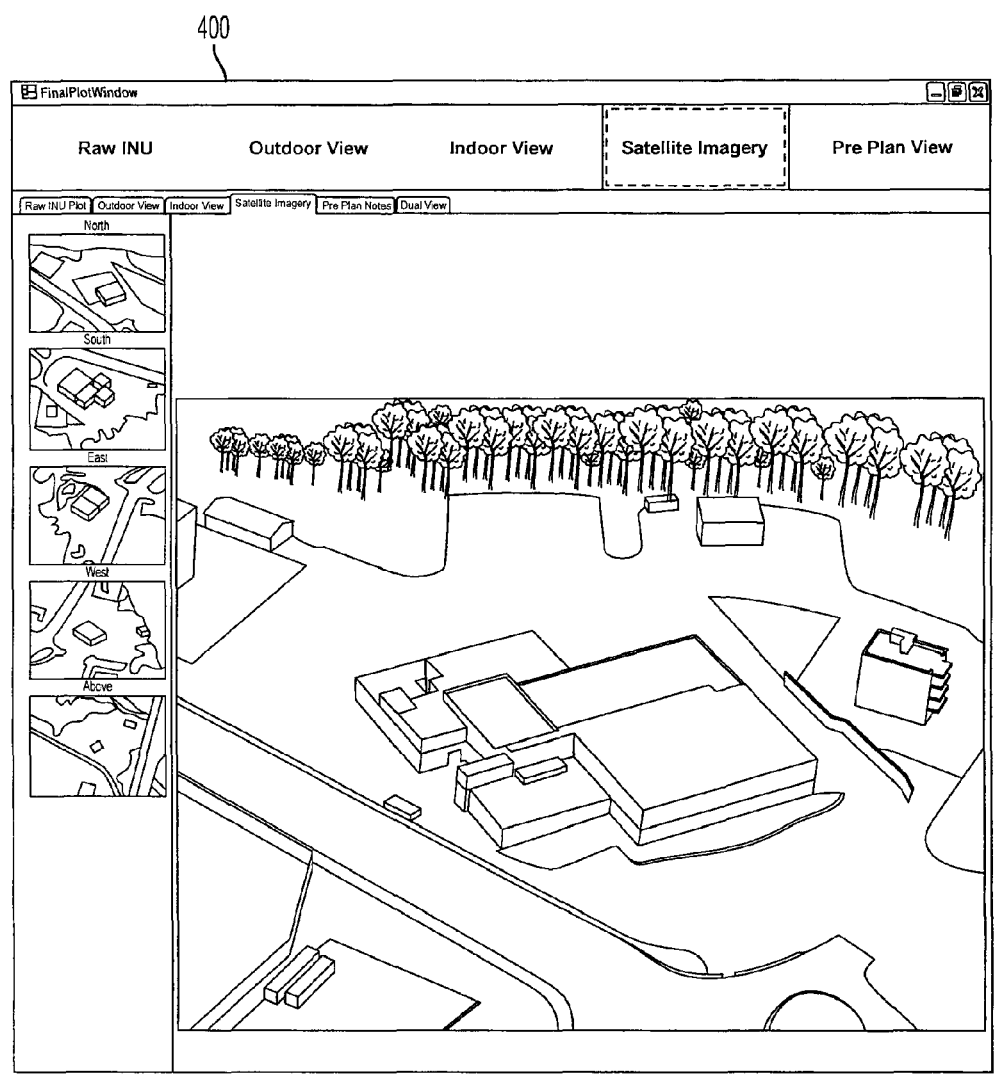
FIG. 4 is an exemplary illustration of a display of an overhead aerial image of a building, viewed from the North, according to an aspect of the invention.

In addition, some accessible aerial imagery software includes images of a building from four or more different views such as, for example, North, South, East, and West. FIG. 4 depicts a display 400 according to an aspect of the invention, wherein an overhead aerial image of a building (viewed from the North) obtained from a source (e.g., Microsoft® Virtual Earth™) may be viewed. Viewing images of a building from four or more different views may reveal, among other information, the exits of the building, and information regarding the building's surroundings. Viewing these images may be achieved, for example, by interfacing with existing aerial imagery software, or by storing images tagged to a building in a database.

Building Reference (Outline and Geolocation).

The outline or footprint of a building may be useful in tracking systems. According to one implementation of the invention, a building outline, for example, may be used to correct location estimates by ensuring that indoor paths (of trackees) remain within the outline. This can be quite valuable in signal-based systems where outliers are common, and even in inertial tracking systems to correct scaling errors. In addition, several building features have been observed to be aligned to the building outline. This observation may be used to generate floor plans of buildings accurately, and correct for angular drift in inertial systems.

Figure 5:
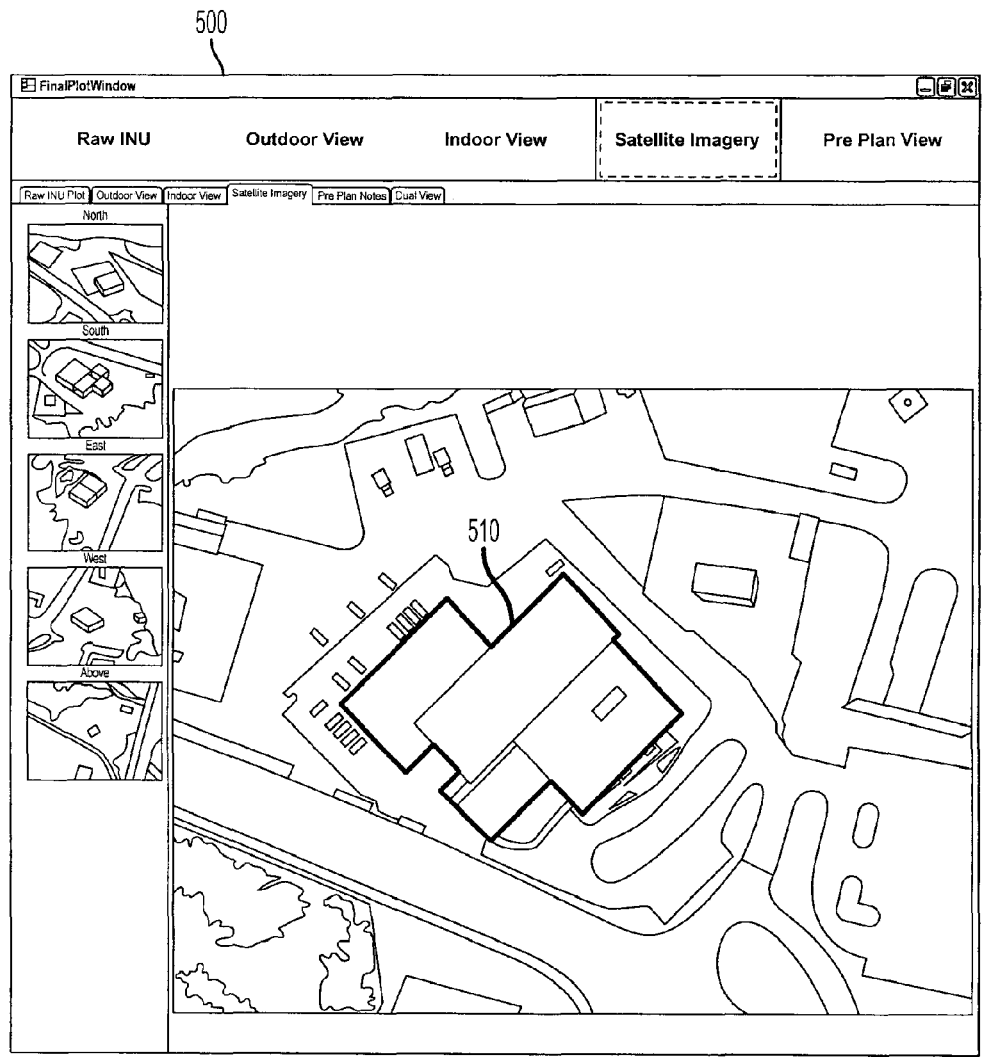
FIG. 5 is an exemplary illustration of a display wherein a building outline has been registered on an aerial image of the building, according to an aspect of the invention.

FIG. 5 depicts a display 500 wherein a building outline 510 has been registered on an aerial image using a GUI tool, according to an aspect of the invention. In one implementation, the GUI tool enables a user to draw a polygon to represent the building outline. The building outline may be displayed using various colors, patterns, or other visual indicators.

Aerial Imagery may also include a Georeference for each pixel of a building outline, yielding the building outline as a series of points, or lines, or a polygon that is georeferenced. The building may then be georeferenced by its outline, or by clicking (or otherwise selecting) a point inside the building outline, such as the center, to be its unique georeference. This is useful for database queries, and for grouping and searching buildings near a global location.

Building Exits.

Most of the exits of a building may be visible using aerial imagery from different directions. The exits may be registered using a GUI tool that enables a user to click on (or otherwise select) exits, and then records them, tagged by building, using their corresponding Geolocation. These exits may then be used, for instance, for matching outdoor-indoor transitions in tracking data since trackees entering or exiting buildings have a high probability of doing so through the conventional building exits.

Building Name.

Each building may be associated with a name or other identifier (e.g, comprising any number of text or numeric characters) in a building database for purposes of queries and/or display. This may also be useful for enabling users to search for buildings, and for navigation directions.

Building Elevation Data.

One challenging problem in indoor tracking is the ability to track in three dimensions (or 3D) (i.e., determining elevation). Even if elevation is stated accurately as distance traveled in the "z" or vertical direction in global units (e.g., feet, meters, etc.), it may not be very useful for positional awareness or navigation purposes. Indoor elevation may be best represented as a floor number, although other representations may be used. Assigning a floor number to a 3D location enables users (e.g., an Incident Commander at an emergency scene) to best understand the elevation status of their personnel and/or assets, or their own location. This, however, can be quite challenging due to the differences in the height of each floor in different buildings, and the differences in the number of stairs in-between floors. Accordingly, to make a floor assignment process more feasible, it may be useful to include building elevation data (e.g., number of floors, basement data, elevation of each floor, or other building elevation data) in the building data that is tagged to (or associated with) a building.

Number of Floors.

In one implementation of the invention, the number of floors in a building may be determined or estimated from one of the building side views. In common building types, it may be noted as the number of rows of windows at different elevations.

Basement Data.

If surveyed, the number of basement floors may also be included in the building data. Alternatively, if the presence of a basement level is visible from aerial imagery, it may be noted.

Elevation of Each Floor.

Knowledge of the elevation of each floor may help in the process of assigning floor numbers to 3D position estimates. Aerial Imagery software often includes rulers to determine distances between points. This may be used to find the approximate distance between the ground and approximate start of the first floor, and so on, for all of the floors. The total elevation of the building can also be recorded in the building data.

Importing, Marking, and Storing Building Floor Plan Data when Physical Preprocessing Option is Available, and Associating Buildings with their Floor Plans.

In addition to building data that may be viewed and recorded from satellite imagery, buildings may also be associated with their respective floor plans in a building database. These floor plans may be used to provide context for viewing tracking of personnel and/or assets, planning missions and rescue operations, and performing other functions that may be aided by an indoor view. Further, and with regard to tracking, the knowledge of a building's shape, its floor plans, or its other attributes or characteristics may be used to enhance the accuracy of tracking data by utilizing the building or floor plan data to correct the position estimate of a trackee.

According to an aspect of the invention, a building may be associated with its complete set of floor plans, or a subset of available floor plans. Storing floor plans tagged by floor number and/or global reference may facilitate automated use by mapping application 130.

Building Features and Landmarks.

Indoor location based features and landmarks that might be useful for viewing and tracking may include, but are not limited to, structural landmarks, global and reference data, utility landmarks, and media.

Examples of structural landmarks may include, but are not limited to: (1) Exits/Entrances of the building, possibly on multiple floors; (2) Stairwells; (3) Elevators/Escalators; (4) Hallways; (5) All Rooms and entry points to the room; (6) Large Rooms; (7) Open Spaces; (8) Walls and obstructions; and (9) Connectivity of each of the foregoing with one another.

Examples of global and reference data may include, but are not limited to: (1) Floor Plan Images; (2) a Floor Plan Boundary; and (3) Floor Plan Global References.

Examples of utility landmarks may include, but are not limited to: (1) Gas, power lines; (2) Emergency utility locations, fire extinguishers, sprinklers, etc.; (3) Routers/Wi-Fi Access points and other wireless fixed devices; and (4) Cameras (e.g., security cameras).

Examples of media may include, but are not limited to: (1) Photographs; and (2) Videos.

Obtaining Building Feature and Landmark Data.

According to an aspect of the invention, indoor data for buildings may be obtained from sources such as CAD drawings of buildings, images of building floor plans in any format, preplans that are well-scaled, or from other sources.

CAD drawings may have a higher level of detail leaving fewer details (such as, for example, router and camera locations) to be added or updated manually. According to an aspect of the invention, CAD files may be imported and read to extract available data. For floor plans of a building in an image format (e.g., such as *.jpeg, *.pdf, etc.) which are more readily available, either manual marking of features or an automated feature detection algorithm may be utilized.

According to an aspect of the invention, mapping application 130 may be used to create and/or edit a building in a database, and to register all available data associated with the building from various input files. Additional data may be added based on the intended application for which the building database is being used, such as for tracking.

In one implementation, building data (e.g., building features and their description) registered in the building database may be stored in a universal format such as, for example, XML, or in other formats. The level of detail may be customized depending on the intended use of the building database. For tracking, landmark data may be customized to the characteristics of tracking data available from inertial methods, signal-based methods, or other methods, or a fusion of methods.

According to an aspect of the invention, structural features on floor plans may be marked by a user (via a GUI) as points with an (x, y) location on the floor plan, or as polygons that represent the landmark region, or in another manner.

Structural Landmark Details.

(1) Exits/Entrances.

Exits and entrances to a building may be stored for situational awareness, navigation and guidance, and for correcting position estimate when a transition is detected from outdoors to indoors (or vice-versa), or for other purposes. In one implementation, the exits may be marked (via the GUI) by a point location on the floor plan, or as a polygon spanning the exit area. Since most building exits open into hallways, lobbies, or stairs, registering the closest landmark of each type when present may be used in tracking and navigation systems.

(2) Stairwells.

Stairwells are often used by personnel to change floors, and marking stairwells can help reset a trackee's location estimate to the correct stairwell, and update a trackee's elevation to the correct floor. In one implementation, stairwells may be marked (via the GUI) as point objects, or as a polygon spanning the stairwell region.

For stairwells, additional data may be added to enhance tracking. For example, a stairwell's winding is a structural characteristic that is associated with the direction in which turns are taken while traversing the stairwell. Most stairwells have landings at or in between floors. To illustrate, for most stairwells, a person moves straight up or down the stairs in one direction, makes a turn at the landing, often 180°, and continues in another direction, often opposite to the previous direction. As such, if a person turns clockwise at a landing to get to the next set of stairs while going upstairs, he or she must turn counter-clockwise while going downstairs. This observation may be used while matching trackees to stairwells.

In one implementation, a stairwell's winding may be defined as clockwise, counter-clockwise, straight, or using another definition, depending on the direction in which turns are made while going upstairs for convention. Other definitions may be utilized.

In addition, for each stairwell, the floor to which it connects may be registered (via the GUI) to indicate stairwells that connect only specific floors and do not continue through every floor in the building. When available from plans or from a floor plan image, the number of stairs and the number of winds can also be added to the stairwell data. This data may be used to resolve the number of floors crossed in algorithms that count stairs, as well as an angle turned.

Connectivity of a stairwell to hallways and other landmarks may also be registered.

(3) Elevators and Escalators.

In addition to stairs, elevators and escalators are often used by personnel to change floors, and marking them may help reset the location estimate of a trackee to the correct elevator or escalator, and may be used to update a person's elevation to the correct floor. In one implementation, elevators and escalators may be marked (via the GUI) as point objects, or as a polygon spanning the region they occupy. The connectivity of elevators and escalators may also be added to determine the possible floor changes from each landmark. In addition, the connectivity to hallways and other landmarks can be registered.

(4) Hallways.

According to an aspect of the invention, hallways may be marked since they enable the connectivity of different parts of buildings, especially in larger buildings. Several large buildings are structured as rooms built around several connected hallways. This often results in a person traversing hallways to get from one room to another. In addition, for tracking and navigation, hallways may serve both as a location correction landmark when long straight tracks are observed, as well as a heading correction landmark since there are essentially only two possible general directions to walk straight (along the length of) a given hallway.

In one implementation, hallways may be marked (via the GUI) by points or nodes at the start and end of the hallway, and at a point where hallways intersect. Hallways may also be marked as polygons, typically rectangles, that indicate both the length and width of the hallway. Once a polygon is registered, the slope of the hallway may also be calculated by calculating the slope of the long edge of the rectangle.

(5) Rooms.

The location of each room in a building may be marked along with entrances into the room to facilitate accurate tracking estimates. In addition, associating rooms with the name of the company, group, or person (or other identification indicator) using the room can help in navigating through a building. In one implementation, a room may be marked (via the GUI) as a closed polygon representing the area it occupies on the floor plan, as a polygon with openings for entry points such as doors, as polygons with doors marked as associated points, or in other manners. Location of entry points, as well as labels to describe owner, occupant, purpose etc. of a room may be registered. Connectivity with hallways may also be marked to match transitions in and out of rooms.

(6) Large Rooms and Open Spaces.

In cases where all room data is not available, marking only the large rooms and open spaces may be beneficial to tracking and navigation algorithms. Straight long paths may then be matched to hallways and inside large rooms and open spaces. Marking these large rooms and open spaces (e.g., gymnasiums, warehouse floors, exhibit halls, lobbies, etc.) can help matching algorithms to fit long paths that do not occur along the building's main grid angles.

Global and Reference Data Details.

(1) Floor Plan Images.

In one implementation of the invention, images of each floor in a building may be stored in the building database. They may, for example, be tagged by floor number. When a single image for the entire floor is not available, the images may be manually pasted together, or saved separately in the database. The floor plan global references and/or manual fitting may be used to determine which part of the building a floor plan fits into.

(2) Floor Plan Boundary.

A polygon marking the boundary of the floor plan may be registered (via the GUI) to describe the limits of the floor. If the floor plan is for the entire building, the boundary may be used to confine the tracking location estimates to within the boundary, and to correct errors. If the floor plan is a partial floor plan, crossing the boundary can trigger the need to display the adjacent floor plan in the building database, if available, or to build a floor plan.

(3) Floor Plan Global References.

According to an aspect of the invention, for each floor plan, marking the geolocation of a number of points (e.g., two points) on the floor plan can provide a georeference to determine the geolocation of each point on the floor plan. This combined with the boundary may describe the extent of the floor plan in global co-ordinates. Alternatively, the boundary of the floor plan may be described as a polygon comprising points whose geolocation is known.

(4) Elevation Data.

For software depicting aerial imagery, the height of each floor and an estimate of the number of floors may be noted. For buildings with windows, each row of windows may be interpreted as a new floor, and the height of each of these rows above ground may be noted as the height of that floor above the ground. This may aid in resolving floor numbers for tracking when the separation between floors (such as number of stairs) is not consistent.

Methods of Extracting/Marking Building Data.

Currently, floor plans of buildings are not well organized by city, and may not be easily available. In addition, floor plans available as images may have inconsistencies in the symbols used to represent stairs, doors, elevators, and other features. Some images may have low resolution, or may be blurred. As such, mapping application 130 provides advantageous tools that facilitate the extraction of useful information from available floor plans of varying quality. With regard to matching and visualizing tracking positions, marking even a few landmarks on floor plans can enhance tracking accuracy. More detailed feature marking may also be performed to further enhance tracking accuracy. In some implementations, automatic feature detection algorithms, followed by manual marking of undetected features, may be used in lieu of manual marking.

According to an aspect of the invention, a GUI may be provided to enable users to import an image for a particular floor of a building. The user may then enter (or mark or register) landmarks by using provided tools.

Hallways.

According to one implementation, hallways may be marked (via the GUI) by clicking on four points to form a rectangular polygon, or by drawing a rectangle. In the latter case, mapping application 130 may compute the locations of the four points.

Curved hallways may be described using a polygon with more points, a polyline or combination of ellipses. For non-curved hallways, the software may calculate the slope of each hallway by computing the slope of its longer edge.

The term slope, and orientation angle are used to refer to the positive clockwise acute angle (0-180 degrees) between a line and the X-axis (horizontal axis in screen coordinates). For a line segment from point p1 (x1, y1), to p2 (x2, y2), the function arctangent (y2-y1, x2-x1) returns an angle in radians. This angle when converted to degrees lies between −180 and 180. The slope is then defined as arctangent (y2-y1, x2-x1) modulo 180. Also, arctangent (y2-y1, x2-x1) modulo 360 is referred to as heading herein. Therefore, heading between two points, or along a line, is directional (e.g., from p1 to p2), whereas slope refers to its orientation without a direction. For rectangles, slope may be defined as the slope of one of the rectangle's longer edges.

Alternatively, the hallways may be represented, for example, by clicking the start and end point of the line representing the hallways, and the slope may be calculated as the slope between the start and end points. Hallway connectivity may be manually entered by selecting the hallways that intersect and drawing their intersection region, or may be calculated by using intersection detection algorithms.

Stairwells.

According to an aspect of the invention, stairwells may be marked (via the GUI) by clicking on four points, or by drawing rectangles to represent the region. The slope for stairwells may be calculated as for the hallways to indicate their orientation. If winding direction is indicated in the floor plan image, it can be entered for each stairwell as the winding while going upstairs for convention. The convention may be chosen to be winding looking up or down, but one direction should be chosen for consistency.

Alternatively, stairwells may be marked as a single point in the stairwell area. Since stairwells often open into hallways, the stairwell and hallway that are connected may be selected and connected. If floor plans of the floor above or below are available, the connectivity can be registered. For example, if a stairwell on the 7$^{th}$ floor is connected only to the 8$^{th}$ floor, and not the 6$^{th}$ floor, registering the connectivity can help indicate that a person cannot go downstairs from the 7$^{th}$ floor using that stairwell. Connectivity of stairwells may be accomplished using auto-detection algorithms.

Elevators and Escalators.

In one implementation, elevators and escalators may be marked (via the GUI) in a manner similar to stairwell regions, while noting direction, up or down, for escalators if available on the image. Connectivity may be entered similar to the process described above for stairwells.

Exits.

In one implementation, exits that are visible on the floor plan may be marked (via the GUI) as points (or otherwise), and connectivity to hallways registered as described above for stairwells. Exits may also be added for applications in real-time.

Large Rooms.

In one implementation, large rooms may be drawn, for example, by clicking points of a polygon, or by drawing rectangles for rectangular rooms. Drawing the largest rooms can enhance tracking quality as it indicates areas other than hallways where long stretches of straight walking is possible. If possible, each large room and its entrances may be marked (via the GUI). Similarly, open spaces may be marked by clicking a polygon that bounds the open space.

Global References.

According to an aspect of the invention, and as mentioned above, an entire floor plan may be georeferenced by, for example, clicking a number of points (e.g., two) on the floor plan, and entering their geolocation such as latitude, longitude. Geolocation information may be obtained from Microsoft® Virtual Earth™ Google™ Earth, Geographic Information Systems (GIS) maps, or from other sources. The two points may be chosen, in one implementation, such that they are extremities of the floor plan and their location is visible on the edges of the building outline for easy clicking. For the reference points on a floor, or for each floor, the global elevation, or elevation above ground may be registered to assign floor numbers after analyzing tracking data. This elevation may be obtained from detailed floor plans or from satellite imagery software, or from other sources. The boundary of the floor plan may be entered by clicking points forming a closed polygon.

Storing Building and Floor Plan Data.

In one implementation, once new data is entered, the floor plans and their respective data can be stored in a file (e.g., an XML file) or other format with tags for each separate data type entered. The XML file may have a tag for the floor number, tag for each landmark type such as hallways, stairs, and so on. Each landmark type may be associated with tags for its individual data such as points describing the hallways, slope of the hallway, and so on. The XML files may then be tagged to the building that they belong to and imported into the building database. Additional data may be added to the existing data over time, and existing data may be edited using mapping application 130 (or other software).

Figure 6:
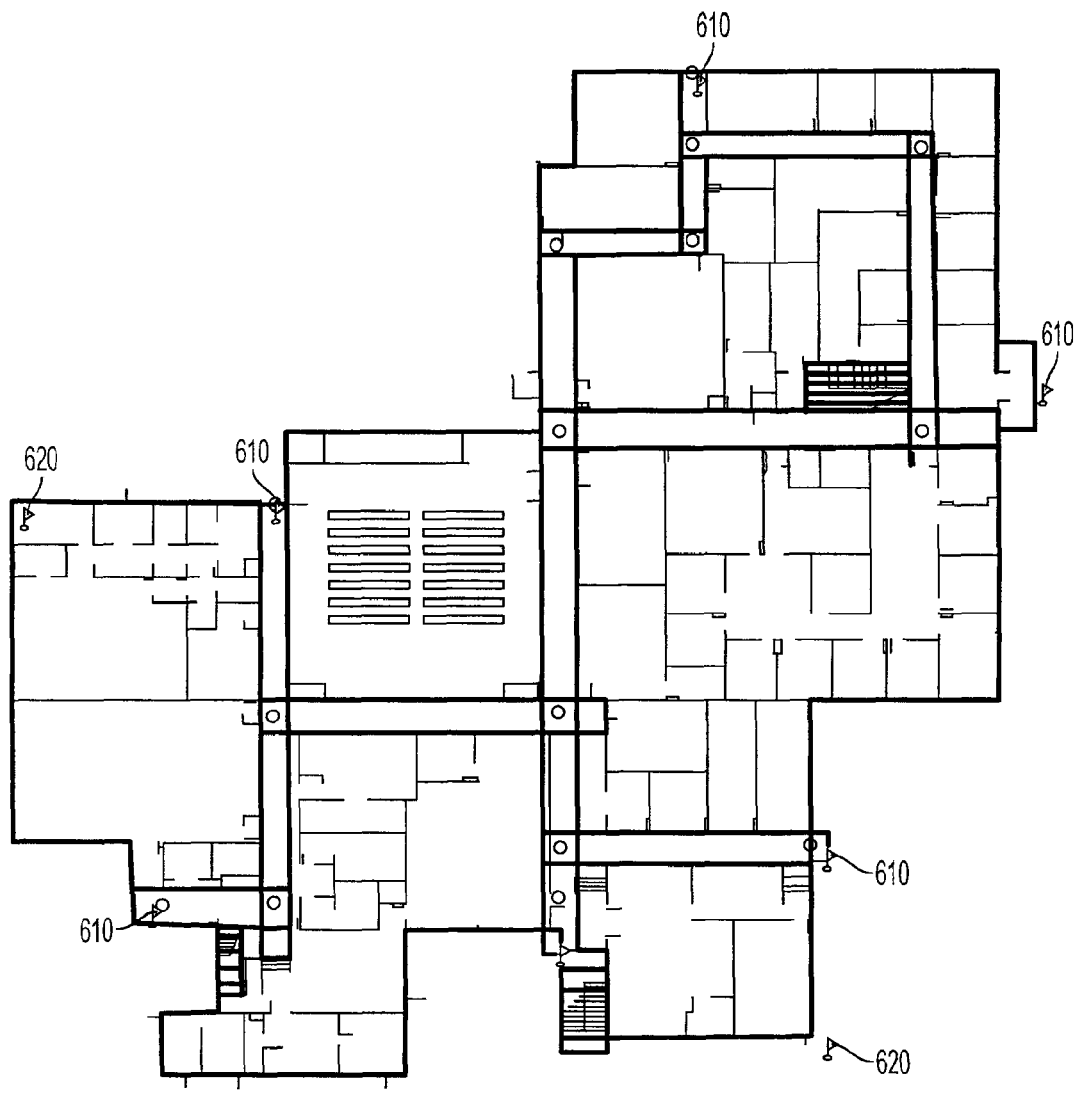
FIG. 6 is an exemplary screenshot illustrating a preplan of a building floor plan after the process of marking landmarks has occurred, according to an aspect of the invention.

FIG. 6 is an exemplary screenshot illustrating a preplan of a building floor plan after the process of marking landmarks has occurred. As shown, hallways have been marked with rectangles, stairs have been marked with rectangles including stripes, exits have been marked using flags 610, and Georeferences have been marked using flags 620. In various implementations, various landmarks may be marked using any number of colors, shapes, patterns, textures, or other visual indicators.

Figure 7:
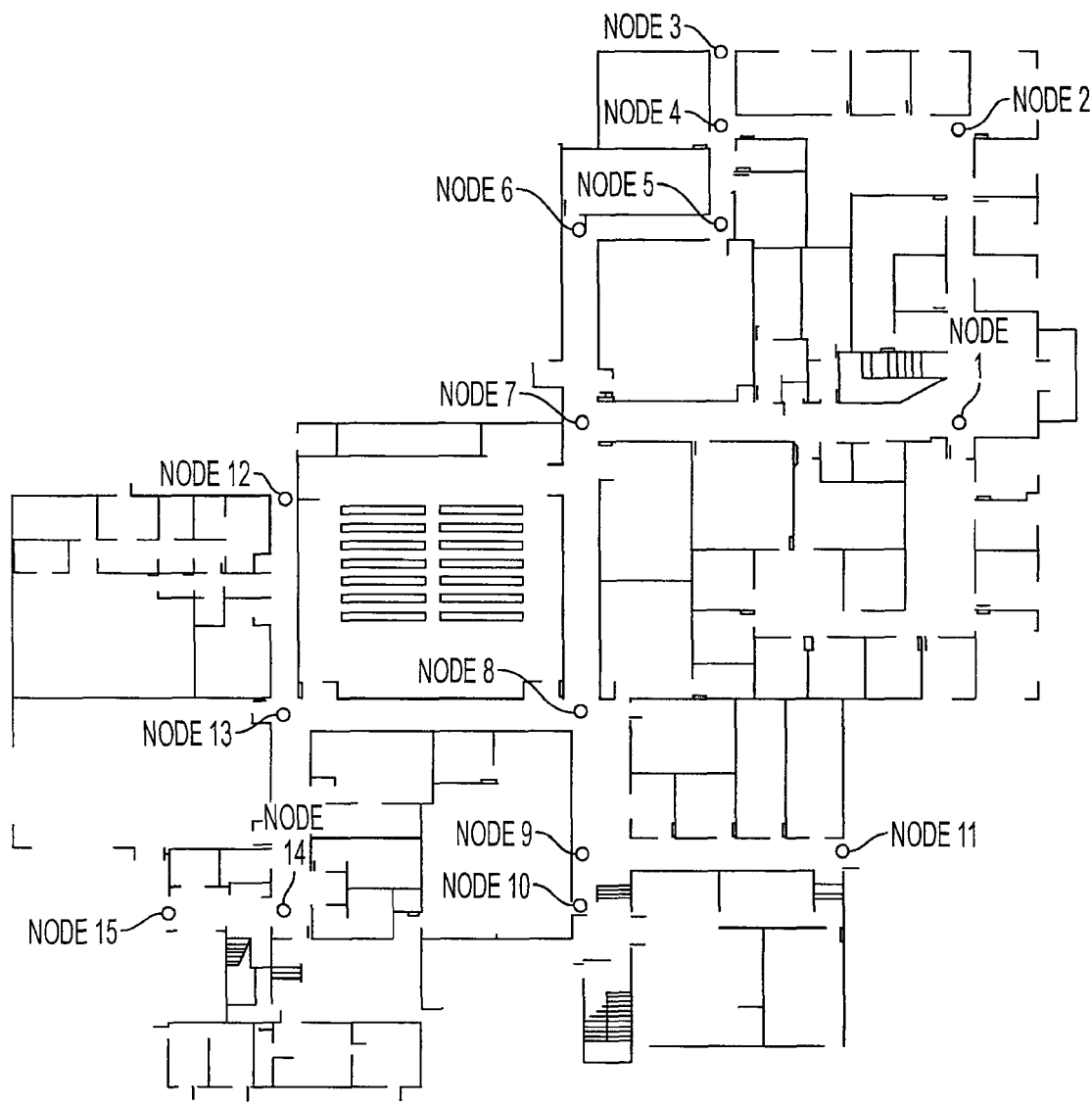
FIG. 7 is an exemplary screenshot illustrating a preplan of a building floor plan after the process of marking landmarks has occurred, according to an aspect of the invention.

FIG. 7 is an exemplary screenshot illustrating a preplan of a building floor plan after the process of marking landmarks has occurred in an alternative manner. As shown, hallways have been marked with points. Nodes 1 and 7 form a hallway, nodes 6-10 form an intersecting hallway, and so on.

Representing hallways as a rectangle may be very useful while using geometric methods in the matching methods described herein. Several of the matching steps may use comparison of rectangular and/or linear segments of tracking data with hallways, and comparison of tracking data segment headings with the orientation of the hallway. A rectangular shape may be used, for example, as shown in FIG. 8.

Figure 8:
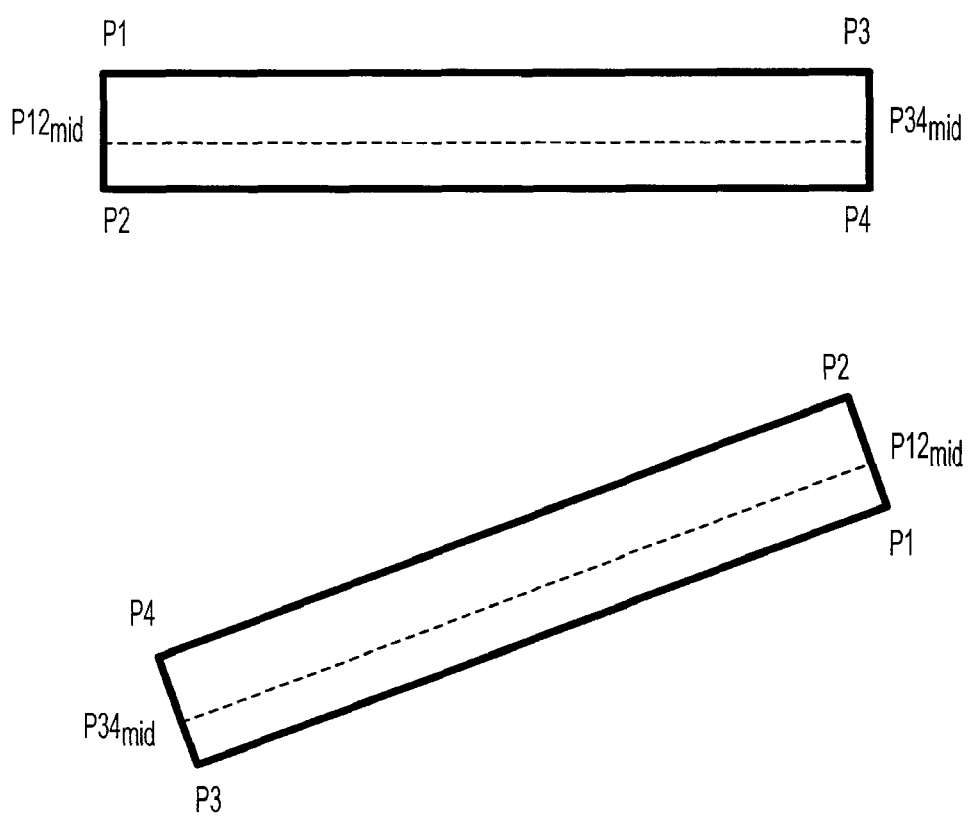
FIG. 8 is an exemplary illustration of a rectangular region on the floor plan marked as four points (P1, P2, P3, P4), according to an aspect of the invention.

FIG. 8 is an exemplary depiction of two instances of a rectangular shape (rectangle). The shape may be described by four points (P1, P2, P3, P4). The rectangle line segment is the line segment connecting the midpoints of the shorter sides (i.e., the line segment from P12mid to P34mid). The slope of the rectangle is the slope of the longest edge of the rectangle (e.g., 0 degrees for the top rectangle, and approximately 150 degrees for the bottom rectangle). Hence, by representing the hallway as a rectangle, the hallway may be provided with a slope for easy comparison with headings in the tracking data and/or slopes of other shapes. A rectangle's internal region represents the hallway area, and allows for tracking points to be tested for containment in the hallway. In addition, several of the advanced matching tools described herein may operate on lines for matching shapes. These tools may represent the hallway using the rectangle line segment defined above. Additionally, other matching tools may use points to represent shapes, and may use the rectangle points (P1, P2, P3, P4), or the end points of the rectangle line segment (i.e., P12mid and P34mid) for their operation, as needed. The rectangular shape used to represent the hallways, therefore, provides a high level of versatility in the geometric methods used herein.

Extracting Additional/Unavailable Building Data

Much of the data that can be marked accurately, as described above, may also be extracted by auto-detection algorithms. These algorithms may be used if the preprocessing option is not available, or if the building is partially preprocessed.

Extracting Data for Navigation and Map-Matching from Building and Floor Plan Landmarks.

Once the location of features mentioned above (hallways, stairwells, exits, etc.) are known, data including, but not limited to, connectivity and intersection regions may be extracted even if they have not been manually marked.

Connectivity and Intersection of Landmarks.

For indoor track (or path) matching and navigation, detecting the intersection of various landmarks and establishing connectivity between them may be useful for the algorithms of mapping application 130. This processing may occur at any time. Connectivity may be recorded both to use data regarding which features are directly connected to one another (or lead to one another), and to determine which features, even if unconnected, are often visited in succession.

In one implementation, for hallways represented as rectangular polygons, each pair of rectangles may be tested for an existing intersection region. If an intersection exists, it may be registered as an intersection region of the two hallways, and the hallways are connected. If the hallways are marked with a start point and an end point, they may be considered to be represented by a line segment from the hallway start point to end point. The intersection point of the two lines representing the hallways can be found. If the point of intersection lies within both line segments, then the hallways have an intersection at the point of intersection found.

In one implementation, connectivity between landmarks of different types may be detected by checking for intersection regions, such as checking if a stairwell polygon intersects with any hallway. For landmarks recorded as points, the closest hallway to the landmark may be found by distance of a point to line formula. If the distance to the closest hallway is less than a threshold distance, for example, the features may be connected. Even if they are not physically connected, the proximity suggests that they may be traversed in quick succession. Well known geometric problems such as intersection of lines, distances between points, distances between lines and points and other similar functions, may be performed by a suite of low-level geometric functions in a basic geometry library. Well known polygon manipulations, such as polygons containing points, and other functions may be performed by a low-level geometry library often using the functionality of the basic geometry library.

Inflated Regions and Proximity Regions.

To perform intelligent map-matching for tracking data that may have inaccuracies, it may be useful to combine probabilistic approaches with decision making methods. Human sight and pattern matching capabilities may, for examine, determine that a person "appears" to be walking in a hallway even if the path is not along the hallway. To model tolerances in matching paths to features, it can be useful to define geometric proximity regions to detect path matches to landmarks.

For example, inflated proximity regions for rectangular landmarks may be generated by increasing length and/or width by threshold amounts. These threshold amounts can be fixed thresholds, thresholds based on the error of the input tracking data, adaptive thresholds at run-time, or other thresholds. Tracking points and/or segments that are contained in the inflated proximity regions of a hallway rectangle may be tested for a match to the hallway. If a match is found based on or more criteria established in the map matching and map building methods described herein, the tracking points and/or segments can be corrected to lie within the hallway rectangle.

Figure 9:
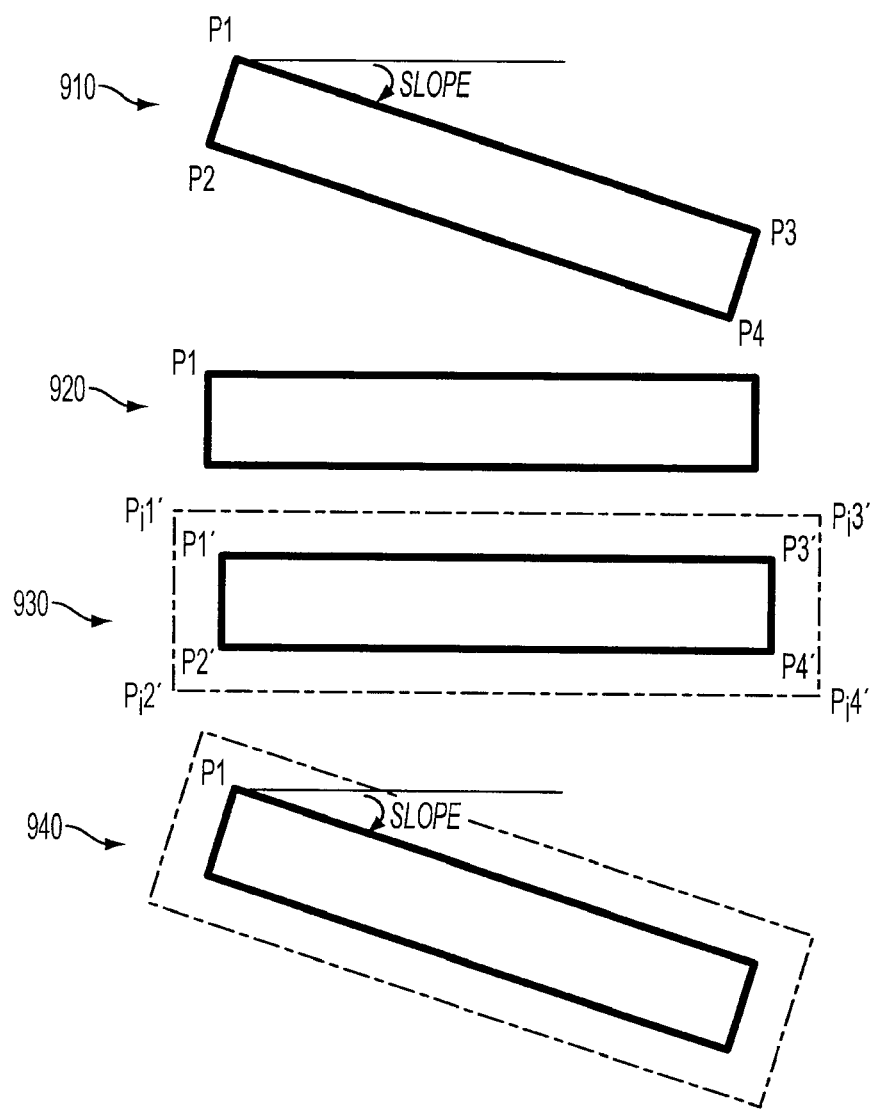
FIG. 9 is an exemplary illustration of steps to inflate a rectangle region, according to an aspect of the invention.

FIG. 9 is an exemplary depiction of processing operations (described below) used to inflate a rectangle region by an Inflation Size (InflationWidth, InflationLength).

In a first processing operation, depicted at 910 in FIG. 9, an original rectangle region is provided. This rectangle may be obtained from a rectangle representing a landmark marked on a floor plan (e.g., hallway, stairwell, etc.). It may also be obtained from rectangular landmarks generated by map building methods, or from rectangular segments obtained from segmentation of the tracking data.

In a second processing operation, depicted at 920 in FIG. 9, the rectangle may be rotated around one of its points, here P1, by its slope in the counter-clockwise direction.

In a third processing operation, depicted at 930 in FIG. 9, the rectangle is inflated using the following equations:

$$Pi1'=(x\text{min}-\text{InflationWidth}, y\text{min}-\text{InflationLength});$$

$$Pi2'=(x\text{min}-\text{InflationWidth}, y\text{max}+\text{InflationLength});$$

$$Pi3'=(x\text{max}+\text{InflationWidth}, y\text{min}-\text{InflationLength}); \text{ and}$$

$$Pi4'=(x\text{max}+\text{InflationWidth}, y\text{min}+\text{InflationLength});$$

Where:
P1'=(xmin, ymin);
P2'=(xmin, ymax);
P3'=(xmax, ymin);
P4'=(xmax, ymin);
(xmin, xmax) are the minimum and maximum of all the x coordinates in P1'-P4'; and
(ymin, ymax) are the minimum and maximum of all the y coordinates in P1'-P4'.

In a fourth processing operation, depicted at 940 in FIG. 9, the inflated rectangle from operation 930 is rotated clockwise by the slope around P1 to obtain the inflated rectangle for the original rectangle depicted at 910.

Similar to the intersection of the actual landmark regions, the intersections of the inflated landmarks may be determined to model inflated transition or connection regions.

Graph of Floor Plan Landmarks and Connectivity.

To use existing algorithms in graph theory such as the A* algorithm for indoor navigation, the floor plan landmarks and their connectivity may be represented as a graph.

Graph Nodes.

In one implementation, for hallways, the start and end points may be added as nodes of the graph. The start and end points for hallways represented as rectangles may be determined as the midpoints of the shorter edges. For landmarks such as stairwells and elevators, the center of the polygon may be added to the graph as nodes, and for point landmarks such as exits, the point may directly be added as a node. In addition, the center of the intersection regions of hallways may be added as graph nodes.

Graph Edges.

According to an aspect of the invention, all nodes in the same hallway may be connected to one another with edges with the edge weight of the distance between the nodes using the formula:

$$\text{dist} = \sqrt{(x_2-x_1)^2 + (y_2-y_1)^2}.$$

This formula, referred to herein as the distance formula, can be used to find "closest" or "nearest" points and landmarks. This method automatically connects intersecting hallways since the intersection nodes are connected to nodes in both of the hallways. Edges may be placed between stairwell and exit nodes and their closest hallways by adding a node for the closest point on the hallway line to the node. The distance from the landmark to the closest hallmark may be tested before adding the edge, and the edge may be added if the distance is less than a threshold. All unconnected nodes can be connected to the closest connected node for continuity.

Floor Plan Maze.

In one implementation of the invention, a maze representing the floor plan may be established to perform functionality similar to the graph. In floor plans where the location of all walls is available, a maze may be used to perform more refined navigation.

Auto-Detection of Landmarks.

Landmarks used in the methods above such as hallways, stairwells, elevators and so on, may be detected on several floor plans by using auto-detection algorithms. These auto-detection algorithms may be developed using image processing techniques such as though transforms to detect the dominant black lines (walls) in a floor plan. Currently, auto-detection algorithms may be difficult to use due to the lack of quality floor plans, and inconsistency in floor plan symbols.

B. Tracking Data

Tracking Data Characteristics and Formats

As previously noted, mapping application 130 may receive tracking data (in addition to other types of data) as input. As described in greater detail below, tracking data may be obtained from any number of sources and/or from any number of tracking methods. By way of background, the most prominent tracking methods include Inertial Navigation and Signal-based methods. Inertial methods are generally considered to be those that use sensors such as accelerometers, gyroscopes, magnetic field sensors, pressure sensors, and other sensors to calculate the trajectory of a target being tracked without the need for external references. Due to errors present in sensor readings, inertial paths are often subject to "drift" and are more accurate in the short-term than over long periods of time.

Signal-based methods can include analyzing signals from references to obtain a position estimate. Position estimates may be obtained by using methods such as triangulation, signature matching, time-of-arrival calculations, or phase difference calculations. Signal-based methods typically have bounded errors over the long term, but are often less accurate in the short term. This is often due to multi-path and other signal propagation issues. Signal-based location systems are characterized by tracking point "outliers," which are individual points that are significantly offset from actual location, and are often due to the signal propagation characteristics of a trackee's location.

The position (or location) estimate generated by mapping application 130 after analyzing the tracking data may be improved via techniques customized for different types of tracking data. Additional information may also be provided to mapping application 130 to increase the accuracy of the position (or location) estimate.

According to an aspect of the invention, mapping application 130 may enhance the accuracy of tracking data, and may utilize similar processing techniques irrespective of the type of tracking data. However, the tracking data type may be important to set (or define) parameters, thresholds, settings, or other metrics for use with the mapping algorithms of mapping application 130. For example, custom methods may be applied to different tracking data types depending on the tracking data characteristics. The tracking data may include data type, which may be broadly be defined as Inertial, Signal-based, Fusion, or both separately. Additional data tracking types may be added with the advent of new technology.

In one implementation, various error correction methods may be implemented by mapping application 130. For example, drift minimization methods may be implemented by mapping application 130 if the tracking data indicates that it is inertial, whereas outlier correction methods may be implemented if the tracking data is signal-based. A flag (or other indicator) to indicate that data is accurate in the short-term may be set for inertial data, whereas a flag (or other indicator) to indicate that data may be inaccurate in the short term but has bounded error in the long-term may be set for signal-based data. Even if tracking data does not include its type, mapping application 130 may detect the type by checking for "outliers." For example, if any two successive tracking points have a distance greater than that which can be traversed in their time-separation, it suggests the data is likely signal-based. This can be checked over the entire tracking path to count the number of such "outliers." In inertial systems, this count may be negligible, if not 0. Other outlier detection methods may be implemented.

The one or more tracking systems (e.g., 110a, 110b, ... 110n) (FIG. 1) may be configured to collect any one or more of the following types of tracking data. As previously noted, this data may also be obtained from other sources.

2D Tracking Data.

According to an aspect of the invention, two-dimensional (or 2D) tracking data may be provided as geolocations (latitude, longitude). Alternatively, 2D tracking data may be represented as (x, y) increments from an initial position. In such cases, the initial position may be provided by manual input (or in another manner) as GPS, signal-based initial position, etc.

3D Tracking Data.

To perform tracking in three dimensions (3D), data representing the displacement in the "z" or vertical direction (i.e., elevation), may be added to the 2D tracking data. This data may be represented as an elevation in the "z" direction in global units (e.g., feet, meters, etc.), as the number of stairs counted with an indication of whether the stair was encountered as an up stair or a down stair, or as an increment in the "z" direction with reference to an initial elevation. A combination of these types may be used to indicate elevation change by different mechanisms such as, for example, elevators and stairs.

Global Heading Information.

Heading information may be obtained from a 2-axis magnetic field sensor (e.g., compass) if it is held level. This heading is less accurate when the device is tilting. The use of a 3-axis magnetic field sensor in combination with sensors that provide accurate tilt information, such as accelerometers and/or gyroscopes, can provide a very accurate global indication of the direction in which the device is facing in the absence of magnetic interference. For a 3-axis magnetic field sensor, the elevation angle may also be added to the tracking data.

Relative Heading Information.

Gyroscopes may be used to obtain yaw, pitch, and roll angles for a device from an initial orientation. The heading from gyroscopes may be added to the tracking data as an angle restricted between 0 and 360 degrees, or as an unrestricted angle. The unrestricted gyro angle may include both heading information, and information regarding the number of turns taken.

Fusion Heading Information.

In systems with both global and relative heading data, the two may be fused to obtain a fusion heading estimate, and provided to mapping application 130 for further processing.

Tracking Flags.

According to an aspect of the invention, several flags may be defined for events that can be detected by a tracking device or system (e.g., tracking system 110a of FIG. 1) to provide mapping application 130 with information for tracking awareness and decision-making Some of the flags that may be defined and included in tracking data are now described.

(1) Stair Flag.

A stair flag may indicate whether a tracking device or system is encountering stairs. It may also indicate if the stairs are being traversed in an upward or downward direction.

(2) Stopped Flag.

A stopped flag may indicate whether a tracking device or system has stopped (e.g., its location has not changed). The criterion (or criteria) for what constitutes "stopped" may be customized for different tracking applications, and the time since a "stopped" event has been determined may be included in the tracking data.

(3) Elevator Flags.

Elevator flags may indicate whether a tracking device or system is in an elevator, and may indicate direction of travel (e.g., up or down). Elevators may be detected by an INU. In one implementation, the first step for detecting floor changes by elevators may comprise detecting the elevator pattern in the INU.

Figure 10A:
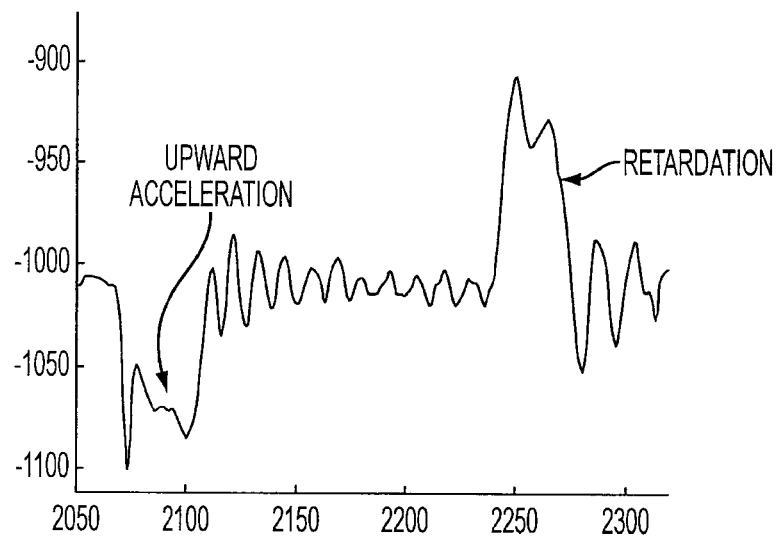
FIGS. 10A-10B are exemplary illustrations of z-acceleration elevator signatures, according to an aspect of the invention.
Figure 10B:
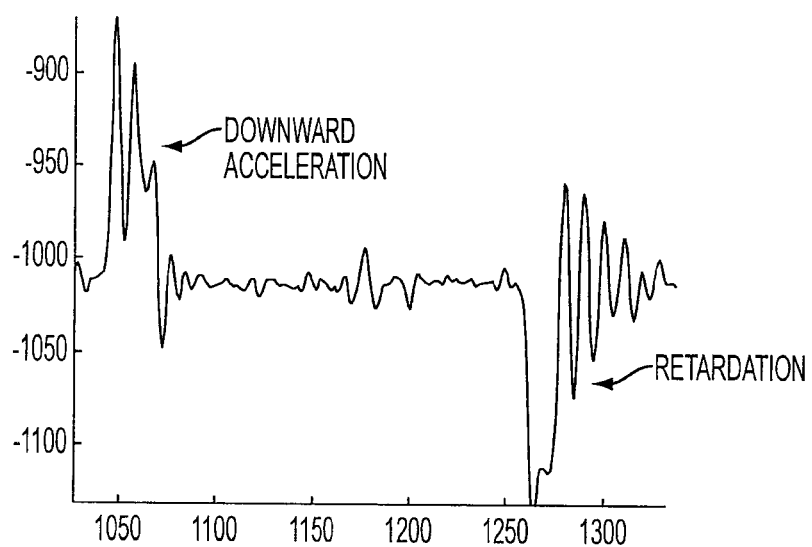

FIGS. 10A-10B illustrate z-acceleration elevator signatures (or signatures in z acceleration sensor data for elevator transitions). FIG. 10A illustrates a signature obtained while an elevator ascended one floor, and shows a first peak area (upward acceleration) and movement until the elevator begins to come to a stop (retardation). FIG. 10B illustrates a signature obtained while an elevator descended one floor, and shows a first peak area (downward acceleration) and movement until the elevator begins to come to a stop (retardation).

An elevator event may be isolated, for example, by examining a very low frequency, such as approximately $1/10^{th}$ the step frequency by applying a low pass filter.

Once the presence of a tracking device or system in an elevator has been detected, the number of floors traversed, elevation height change, and/or other data may be obtained by integrating the area under the peaks to obtain velocity. The velocity may then be multiplied by the time in the elevator to obtain an approximation of the distance traveled, in either the upward or downward direction. This distance may then be added to a "z-elevation" distance field in the tracking data, or reported separately in an elevator report.

Figure 10C:
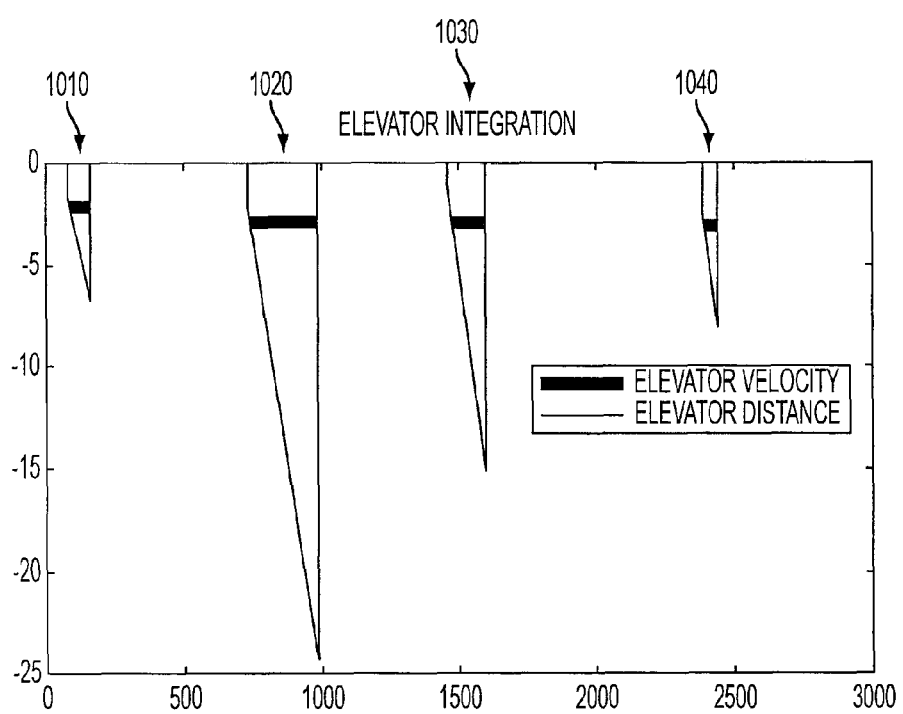
FIG. 10C depicts a graph displaying the result of a computation of distance traveled in an elevator, according to an aspect of the invention.

FIG. 10C depicts a graph displaying the result of a computation of distance traveled in an elevator by determining elevator velocity and time traveled in the elevator. In particular, FIG. 10C illustrates four elevator rides (1010, 1020, 1030, 1040) for a one-floor, four-floor, two-floor, and one-floor transition, respectively, in the elevator. As seen, the velocity (indicated by the heavier-weighted lines) is almost the same in all four cases. The distance obtained in each case using the method discussed above is proportional to the number of floors traversed. Once the elevator detection and floor resolution is computed in the INU, it may be added to the data transmitted by the CSM to computer 120, and mapping application 130.

(4) Motion Type Flag.

For personnel tracking, the type of motion and/or posture detected by the person outfitted with the tracking device or system (e.g., crawling, walking, duck-walking, rolling, etc.) may be categorized and added to the tracking data. This information adds to situational awareness, and also helps assess the speed of the device.

(5) Hall Flag.

A flag indicating that a tracking device or system has been going straight for a certain amount of time can be included in the tracking data. This indicates that, if the tracking device or system is indoors, the tracked personnel/asset may be in a hallway. In addition, the time and distance measured while on each such straight stretch may be included in the data. In the presence of ultra-sonic sensor data within the tracking unit, this event may be augmented with ultrasonic sensor analysis.

Segmentation Information.

According to an aspect of the invention, while computing location information, a tracking device or system may break the calculated trajectory into segments, and provide this data as input to mapping application 130. This is particularly feasible in systems with gyroscopes, and may assist in the detection of turns, and the identification/interpolation of missing data segments. In one implementation, the segment data may be included as a segment number for each tracking point.

Signal Strength Information.

In systems that utilize signal strength from various reference stations and between multiple tracking devices or systems in a network, the signal strengths and/or observations obtained after analyzing these signal strengths may be included in the tracking data. The signal strength from the reference stations may enable mapping application 130 to perform more detailed pattern and signature matching to determine location. In addition, the proximity between tracking devices or systems may be detected by their relative signal strengths when available.

Events such as a number (e.g., two) of tracking systems sensing signal strengths above a threshold may be defined and indicated in the data using flags. Adding a time-stamp may also be of benefit when determining a position (or location) estimate. As an illustrative example, a system that equips each trackee with a tracking system comprising an INU-CSM pair (and/or other devices) may use a Wireless Personal Area Network (WPAN) to communicate between the tracking systems. In such a system, the tracking systems on each trackee may "hear" transmissions from tracking systems on other trackees. The signal strength of these inter-trackee transmissions may be recorded in the tracking data.

Long Range RF Signal Strength Data

Long Range RSSI (Received Signal Strength Indication) to triangulate a trackee's location may be more useful outdoors, where there is line of sight. Building structures may cause a signal to decay by differing amounts depending on building material (or other factors) making it difficult to get an absolute relationship between distance and signal strength. In addition, RSSI can fluctuate due to reasons such as mobile obstructions, etc. Techniques such as averaging and filtering may be implemented to stabilize RSSI readings.

One method to take advantage of signal strengths of an indoor tracking system from outdoor reference points may utilize RSSI signatures (or patterns). As an example, there may be locations in a building where signal strengths from the reference points do not scale accurately by distance. However, the signal strengths from one or more reference points may be unique or characteristic of a particular area and/or location in the building. Accordingly, if a set of signal strengths is observed and recorded when a trackee is at a given location (e.g., location "A") at a first time t1, a similar set of signal strengths may be observed when the trackee revisits the same location (i.e., location A) at a later time t2. While these signal strengths may not facilitate location by triangulation, they may reveal that the trackee is at the same location at time t2 as he or she was at time t1.

Figure 11A:
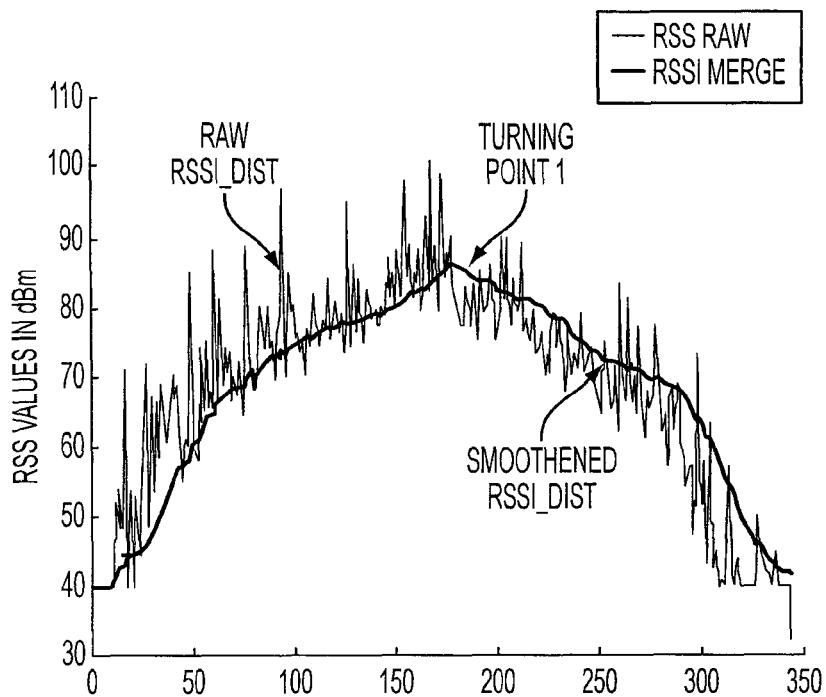
FIGS. 11A-11B are exemplary depictions of acquired RSSI patterns (or signatures), according to an aspect of the invention.
Figure 11B:
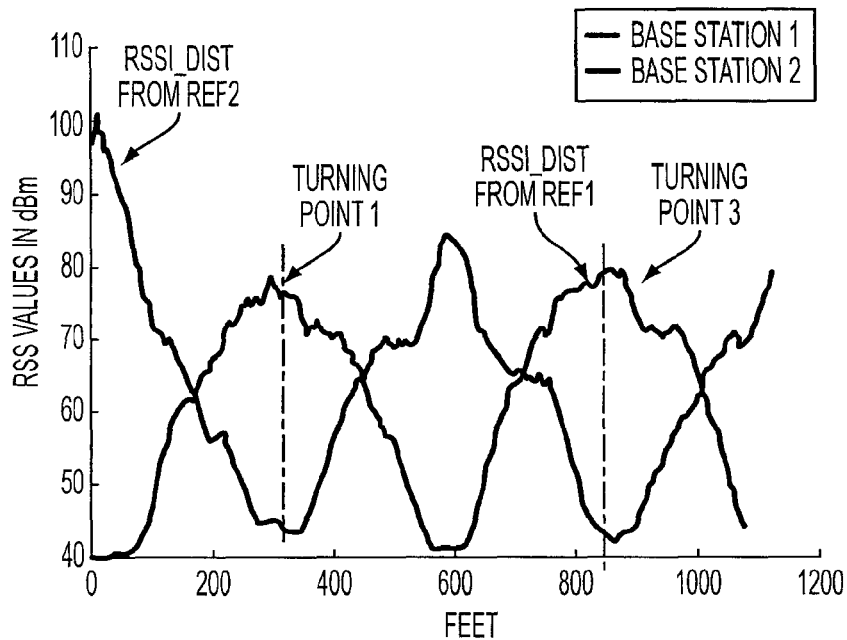

FIGS. 11A-11B are exemplary depictions of RSSI patterns (or signatures) acquired during a session wherein a hardware device equipped with a radio was attached to a trackee. The trackee's hardware device was configured to receive transmissions from a radio located at a reference point (e.g., a base station), and to record the RSSI from the reference point radio. RSSI readings may then be passed through smoothing algorithms to obtain a stable estimation of the RSSI. In some implementations, a plurality of reference points (each with a radio) may be utilized.

FIG. 11A depicts an RSSI pattern recorded at a single reference point (e.g., a base station) located outdoors for a person walking up and down a hallway in a building (indoors). A distance parameter (RSSI_dist) is based on RSSI while a person is moving away from the reference point, up to a turning point (Turning Point 1), and then back toward the reference point. As shown in FIG. 11A, the distance parameter (RSSI_dist) (which is proportional to distance and inversely proportional to RSSI) is shown to increase as the trackee moves away from the reference point until the trackee reaches Turning Point 1, and then decrease as the trackee returns to the reference point. The transmissions may be received inside the building using high power transmissions (e.g., 1 W).

FIG. 11B depicts an RSSI pattern recorded for a person walking a path (along a hallway) twice, with a first reference point (or base station) "Ref1" placed at a first end of a building, and a second reference point (or base station) "Ref 2" placed at the opposite (or second) end of the building. In this case, as the trackee moves between the two reference points, the distance parameter (RSSI_dist) can be seen to increase at one reference point, and decrease at the other, until the trackee reaches one of the reference points, and then turns around. The opposite trend can then be noted.

Proximity (Quadrant) Signature.

In FIG. 11B, at any given distance when the RSSI_dist curve for Ref1 is lower than the curve for Ref2, the trackee is closer to the side (or half) of the building where the first reference point is located. When the curve for Ref2 is lower than the curve for Ref1, a trackee is closer to the side (or half) of the building where the second reference point is located. Accordingly, in a search and rescue mission (or other operation), a location or search area may be narrowed to the appropriate side (or half) of the building.

In one implementation, when four reference points (or base stations) are positioned on each of the four sides of a building (outside), the closest two can reveal the quadrant in which a trackee may be located. Quadrant information may be invaluable during search and rescue missions (or other operations).

In other implementations, a number of reference points (or base stations) may be positioned at a number of predetermined locations (outside) of a building to therefore reveal a portion of an established grid (comprising 6 regions, 8 regions, etc.) in which a trackee may be located.

Heading (Direction) Signature.

In FIG. 11B, the portion of the curves before Turning Point 1 show the RSSI_dist values from Ref2 decreasing (indicating that the trackee is moving toward Ref2), and the RSSI_dist values from Ref1 increasing (indicating that the trackee is moving away from Ref1). As such, the signature can indicate the direction in which the trackee is proceeding in a hallway by observing variances in the signal at known reference points. Therefore, in the illustration, if Ref2 is located to the north of Ref1, it may be determined that the trackee is proceeding North in the hallway.

Location Signature.

An additional signature that may be interpreted from FIG. 11B may be referred to as a location signature. RSSI stabilization algorithms coupled with signature detection methods may identify that the RSSI values from Ref2 and Ref1 at the Turning Point 1 and Turning Point 3 locations are almost identical (the RSSI_dist values at a given point are where the dotted vertical line intersects the RSSI_dist curves). Turning Points 1 and 3 are at the exact same location—the end of the hallway being traversed toward Ref2. Accordingly, for a set of reference points (e.g., base stations) placed around a building (outside), the same location results in the recording of very similar RSSI values at the respective reference points (e.g., base stations), and can be used to track personnel and/or assets inside a building from outdoors without pre-installing devices or leaving "breadcrumbs" (relays).

Accordingly, in various implementations, various types of signal strength signatures may be noted and utilized for tracking purposes. The reference stations above have been described as being placed in outdoor locations. This is because it may be desirable for emergency personnel (e.g., firefighters) to track without any installation/setup inside the building. For these cases, these reference points may be placed on the fire trucks and/or other vehicles that drive up to an incident scene, and/or placed around a building by personnel. This approach, however, may extend to indoor reference points. Additionally, for high-rise or other tall buildings or structures, it may be useful to place reference points on a floor closer to where personnel and/or assets are being tracked. Therefore, in a emergency personnel scenario, where personnel are deployed in a high rise on higher floors (e.g., floors 20 and above), it may be useful to place these reference points on a selected staging floor (e.g., floor 20) for better connectivity.

Ranging Data from Obstructions.

When a tracking system is indoors, it may be useful for both the map-matching and map-building techniques (described in detail below) to access data indicating how far the tracking system is located from obstructions in the building such as, for example, walls. In one implementation of the invention, this information may be obtained by adding ranging sensors to the tracking systems that are provided to personnel and/or assets, and by including the data in the tracking data that is provided as an input to mapping application 130.

Ranging information from obstructions may be obtained, for example, using ultrasonic sensors, lasers, optic sensors, or other devices. Analyzing and calibrating ranging data can help resolve some hard-to-detect scenarios such as, for example, whether a trackee is in a hallway or room. For example, for sensors (similar to ultrasonic sensors) placed on the sides of the trackee, readings from the sensors on both sides of the trackee indicating close by obstructions may suggest that the trackee is in a hallway. Readings which are less uniform and that indicate the presence of obstructions further away may suggest that the trackee is in a room or other similarly-sized space. A lack of obstructions in acquired ranging data may suggest that the trackee is in a large room or open space (e.g., a gymnasium, on a warehouse floor, exhibit hall, lobby, etc.).

Error Estimation and Reliabilities.

Data from a tracking system may have varying accuracy at different times. The tracking system may therefore, in one implementation, include its estimate of the maximum possible error of its data to enable mapping application 130 to better utilize the data. These errors may, for instance, be represented as "reliabilities" such as, for example, a compass reliability, with a number (or other indicator) indicating how accurate the compass is at the time that the compass angle is reported. For inertial systems, maximum angular drift, and maximum scaling error may comprise some examples of error estimation data.

Trackee Type.

In various implementations, the type of trackee may also be included in the tracking data to enable processing methods to customize methods to the trackee. As previously noted, trackees may comprise, for example, personnel or assets. The type of trackee may be used to establish rules and/or constraints that govern the movement of the trackee.

Type of Tracking Data and Characteristics.

In one implementation of the invention, the tracking data may be obtained from an Inertial System combined with GPS information, with the following illustrative (and non-limiting) tracking data format:

(1) GPS Data: may comprise latitude, longitude, GPS indicators such as Horizontal Dilution of Precision (HDOP), number of satellites, satellite signal strengths or other data.

(2) X, Y: 2D tracking information relative to a start point, based on headings from the gyro.

(3) Zpos: The number of stairs counted while tracking, increments for an 'up' stair, decrements for a 'down' stair.

(4) Gyro_angle: The relative heading predicted by the gyro, this may be unrestricted (e.g., not bound to 360°).

(5) Compass_angle: The absolute heading predicted by the compass.

(6) Compass_Reliability: A number, for example, between 0 and 127 (or within another range), indicating how accurate the compass is estimated to be after analyzing magnetic field characteristics.

(7) Fusion_angle: A heading estimate after combining compass_angle with gyro_angle.

(8) Fusion_Reliability: A number, for example, between −64 and 63 (or within another range), indicating how accurate the fusion angle is estimated to be after analyzing compass, gyro and fusion characteristics.

(9) SegmentNo: The current segment number for the path which increments when a turn is detected by the Inertial System.

(10) HallFlag: A flag indicating that a trackee is going straight and may be in a hallway.

(11) TurnFlag: A flag indicating that a trackee is turning.

(12) StillFlag: A Flag indicating the a trackee is not moving.

(13) PostureFlags: Flags indicating if a trackee is crawling, lying on back, or upright, or in any number of other postures.

In one implementation of the invention, the foregoing information may be combined with one or more of the following:

(1) LadderFlag: A flag indicating that a trackee is using a ladder.

(2) ElevatorFlag: A flag indicating that a trackee is using an elevator.

(3) ElevatorDistance: A distance traveled by a trackee in an elevator.

(4) Z distance: Estimated displacement from an initial elevation estimated by the system.

(5) Maximum errors: Maximum possible scaling error, and angular error using sensor limitations, distance traveled, total rotation, etc.

(6) PostureFlag: May indicate posture (or other) types such as belly crawling, duck-walking, running, etc. for personnel.

(7) Signal Strengths: Long and short range radio signal strengths from stationary references and other mobile units of the system.

Inputting Tracking Data into Mapping Application 130

As previously noted, mapping application 130 may receive tracking data (in addition to other types of data) as input.

In one implementation, the tracking data may comprise data acquired in real-time (e.g., one or more tracking points may be provided with every new update) while personnel and/or assets are outfitted with tracking systems (e.g., 110*a*, 100*b*, . . . 100*n*) (FIG. 1) and are being monitored. In real-time applications where data is being transmitted to computer 120, and limited bandwidth is available, a tracking system may perform smart buffering if and when it goes out of range of computer 120. If the number of tracking points is too large to send when the connection between the tracking system and computer 120 is re-established, the tracking system may transmit results of the smart buffering such as, for example, only the start and end points of each segment.

In an alternative implementation, the tracking data may comprise previously-acquired data that may be provided to mapping application 130 for post-processing. The tracking data may be stored locally on computer 120, or in one or more databases (180*a*, 180*b*, . . . 180*n*) or other storage devices (in operative communication with computer 120).

In some implementations, tracking data type information and trackee type data may be used to set parameters, thresholds, settings, or other criteria for mapping application 130, thus customizing mapping application 130 to the tracking data and the trackee. Mapping application 130 may also be customized for various applications.

III. Mapping Application Overview

Having provided a description of the various types of data (e.g., building data and tracking data) that mapping application 130 may receive as input, an overview of the features and functions of mapping application 130 will now be provided.

Mapping application 130 may enable a wide variety of features and functions. It may, for example, receive as input tracking data for one or more trackees, and produce more accurate tracking estimates for each trackee. Mapping application 130 may achieve this by analyzing the tracking data and using a suite of mapping tools to make corrections to the tracking data. Additionally, mapping application 130 may further use information from building data, when available, to enhance the tracking estimates.

Figure 12:
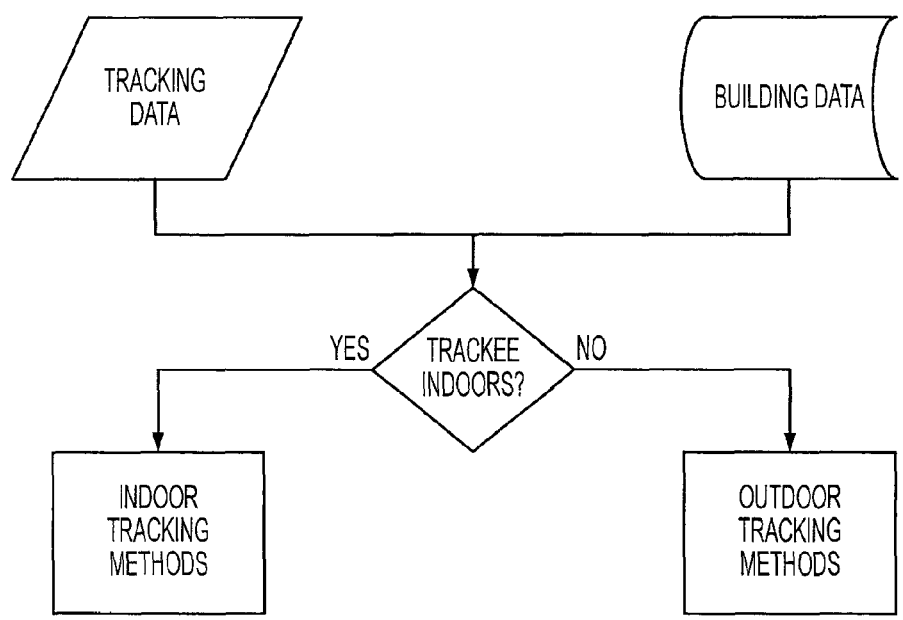
FIG. 12 is an exemplary flowchart broadly differentiating various mapping methods as indoor tracking methods or outdoor tracking methods, according to an aspect of the invention.

According to an aspect of the invention, and with reference to the exemplary flowchart of FIG. 12, the various mapping methods enabled by mapping application 130 may be broadly differentiated as indoor tracking methods or outdoor tracking methods. Some methods may, however, be used for both indoor and outdoor tracking In one implementation, the indoor tracking methods may be used to generate tracking estimates for trackees, when indoors, by fusing some or all of the available indoor tracking data. This may be performed using general tracking concepts and/or concepts specific to tracking personnel and/or assets indoors (e.g., when limitations may be imposed by the structure of a building). According to an aspect of the invention, indoor tracking methods may include, among others, sensor fusion methods, map building methods, and map matching methods.

When the tracking data comprises tracking estimates, and/or tracking information from multiple sources or techniques (e.g., inertial tracking estimates and compass data, or inertial tracking estimates and signal-based tracking estimates), mapping application 130 may fuse the data into a single tracking estimate which can be more accurate than the individual estimates. This process is referred to herein as sensor fusion. Sensor fusion methods may also account for logical limitations imposed by the structure of a building.

Figure 13:
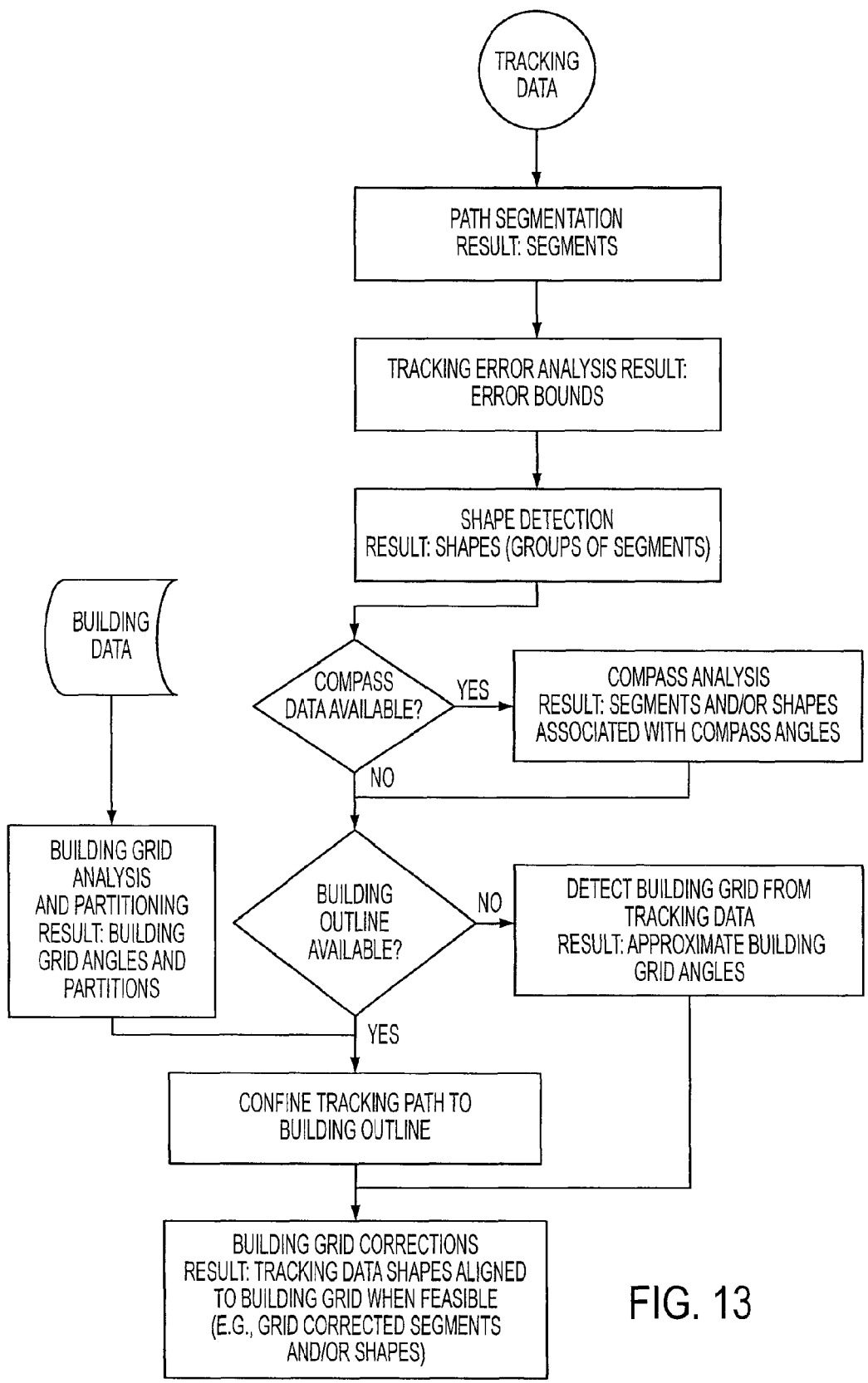
FIG. 13 is an exemplary flowchart of processing operations of a sensor fusion method, according to an aspect of the invention.

An illustrative (and non-limiting) example of a sensor fusion method is illustrated in FIG. 13, wherein tracking data may be fused with compass data (if available) and building data (if available) to correct heading (or other) errors in a tracking path. The processing may result in building grid corrections, which may comprise tracking data shapes aligned to building grids when feasible (e.g., grid corrected segments and/or shapes). The output of sensor fusion methods may be used as a final tracking estimate, or provided as inputs into map building and/or map matching methods as described herein. The various processing operations depicted in the flowchart of FIG. 13 are described in greater detail herein. The described operations may be accomplished using some or all of the system components described in detail above and, in some implementations, various operations may be performed in different sequences. In other implementations, additional operations may be performed along with some or all of the operations shown in FIG. 13. In yet other implementations, one or more operations may be performed simultaneously. Accordingly, the operations as illustrated (and described in greater detail below) are exemplary in nature and, as such, should not be viewed as limiting.

According to an aspect of the invention, map building methods may include methods that can generate features and/or landmarks of a building using sections of tracking data, and then use these features to match and correct other sections of tracking data. Map building may include generation and matching functionalities as well as the functionality of sensor fusion methods.

According to an aspect of the invention, map matching methods may include methods that correlate the tracking data to known features in the building. For example, building data and tracking data may be received as inputs, and building features and characteristics may be utilized to improve the accuracy of the provided tracking data. In particular, the trajectory of personnel and/or assets in a building may be limited and characterized by features in the building such as hallways, stairwells, elevators, etc. While tracking personnel and/or assets in buildings, the tracking data input may be matched to known features in the building to increase the position accuracy and reduce and/or remove the errors inherent in the methods used to obtain the tracking data.

Inertial systems, for example, can provide highly accurate relative tracking data especially over short periods of time. Inertial systems, however, are subject to inertial drift. Errors in calculating the offset of gyroscopes and inaccuracies in scaling parameters may lead to angular drift. This causes the calculated trajectory to drift away from its true location and heading over time. Using knowledge of building features may help eliminate the error due to drift. Unlike outdoors, most buildings have few locations where long straight paths are possible, such as hallways, large rooms, and open spaces. For each hallway, there are only two general headings at which the hallway may be traversed (along its length). Matching a straight path correctly to a hallway may reduce scaling errors accumulated over time, and eliminate angular drift.

Features such as stairwells, elevators, and escalators are, in most cases, the only way to change floors inside a building. Other floor changes may also be caused by accidental falling through floors which can be sensed and detected in inertial systems. In all regular cases, the change in elevation may be detected and matched to the corresponding features serving an accurate estimation of the current position, and elimination of currently accumulated positional errors.

Signal-based location technologies such as GPS, AGPS, Wi-Fi or RF signal triangulation or signature matching, are typically characterized by local inaccuracies rather than by error accumulation. Certain obstructions and their materials can cause the location estimate to be offset from its actual position, sometimes by a significant distance. Using the building features to match relatively accurate tracking data can help identify the less accurate tracking data, and predict the actual path taken using map-matching and map navigation.

Tracking data obtained by fusing inertial and signal-based systems may be used to make highly accurate position estimates by mostly following inertial data in the short term, and using accurate signal-based data to align the global position. The signal-based predictions may also be used to qualify or disqualify solutions when multiple map matching or map building solutions are being computed in parallel.

The current availability of accurate floor plans is rather limited, however, the use of building features to increase the accuracy of tracking data may be used even if floor plans of the building are not available. If the location of building features are not available beforehand, they may be detected using the tracking data, and can later be used for matching future tracking data. This map building method (or technique) can be quite effective for scenarios wherein multiple personnel and/or assets are being simultaneously tracked in a building whose floor plans are not available. The layout of the building, and the location of features such as stairwells and hallways, may be detected and modeled in real-time while using them to correct the location estimates of trackees.

Figure 14:
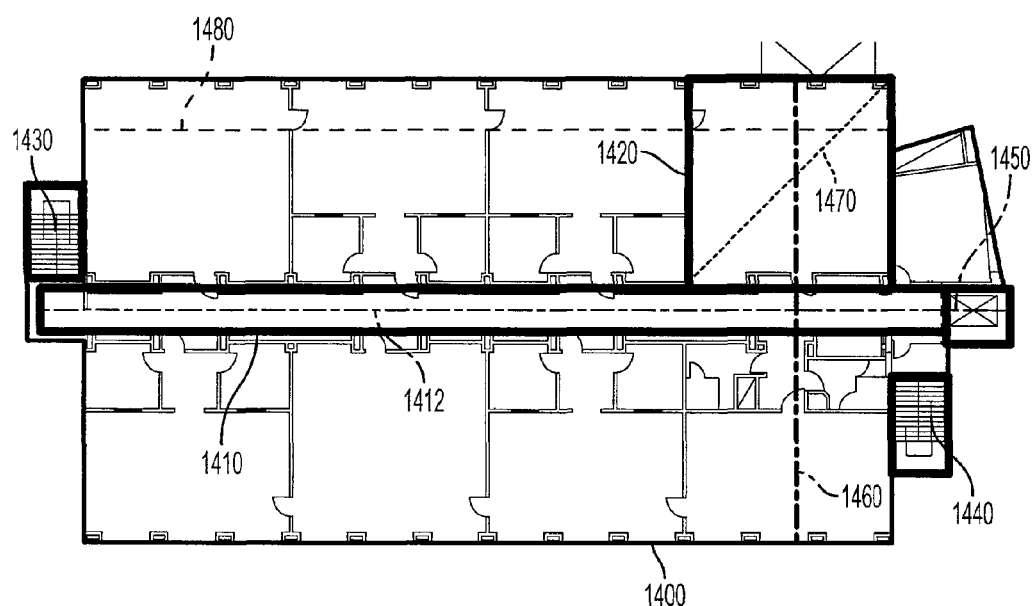
FIG. 14 is an exemplary illustration of a building floor plan including landmarks and indoor trajectories, according to an aspect of the invention.

FIG. 14 is an exemplary illustration of a building floor plan including landmarks and indoor trajectories. As shown, polygon 1410 represents a hallway, polygon 1420 represents the largest room, polygons (1430, 1440) represent stairwells, and polygon 1450 represents an elevator. The long dashed line 1460 depicts a straight path from the end of the largest room (represented by polygon 1420) to the room on the opposite side of the hallway. The diagonal dashed line 1470 line indicates the longest path feasible inside the largest room (represented by polygon 1420), and the dashed line 1480 shows a horizontal path running parallel to the hallway through multiple rooms.

According to an aspect of the invention, if the locations of the aforementioned landmarks are known, they can be used to make probabilistic and logical decisions about the true location of the trajectory of a trackee. The hallway provides the longest straight path feasible in this building as shown by the dotted line 1412. Also, a path straight down the hallway is confined within the width of polygon 1410.

Though long paths are feasible such as the paths indicated by lines (1460, 1470, 1480), they are less likely due to furniture and other obstacles in the rooms. Therefore, if a trackee traverses across this floor plan once, his location may be determined to be at either one end of the hallway or the other. This combined with any reliable heading information may narrow a location estimate to a single location with some error. In addition, events following these paths, or detected alone, may help immediately detect the location of the trackee. If an elevator event is detected, in this building the trackee must be within polygon 1450. If stairwell traversal is detected the trackee must be within either polygon 1430 or polygon 1440.

Moreover, because FIG. 14 illustrates the floor plan of the $2^{nd}$ floor of the building, the trackee would not leave the floor outline of the floor plan, polygon 1400, under normal circumstances. If an exit is detected outdoors, it can be assumed that the trackee had previously been placed on the wrong floor, and was on the $1^{st}$ floor or, in an unlikely scenario, exited through a window. Variations from normal behavior such as leaving through a window either by jumping or climbing down a ladder could be detected. The salient point is that the person would not walk beyond the boundaries of the floor while indoors on a floor without exits.

In one implementation, before tracking data may be matched with features in the building, certain preprocessing may be performed on the tracking path (or trajectory) of a trackee. Each trackee has a tracking path (or trajectory) which may comprise the entire path in the case of post-processing, or a current set of tracking points in the case of real-time tracking. Each tracking point comprising the tracking data may have an associated time-stamp, t, and each tracking point may include values for some or all of the tracking data discussed in detail above.

According to an aspect of the invention, various preprocessing steps may be selected depending on the subsequent set of methods that will be applied to the data such as, for example, map matching and/or map building methods. These preprocessing steps may either be performed as separate preprocessing steps, or simultaneously with one or more of the map matching and/or map building methods. Additionally, the preprocessing steps may be chosen depending on building type if known prior to mapping. Several preprocessing steps and options are described below. The can be applied singly or in combination with other methods to enhance the tracking estimate or to condition the tracking data for subsequent methods when applicable.

Figure 15:
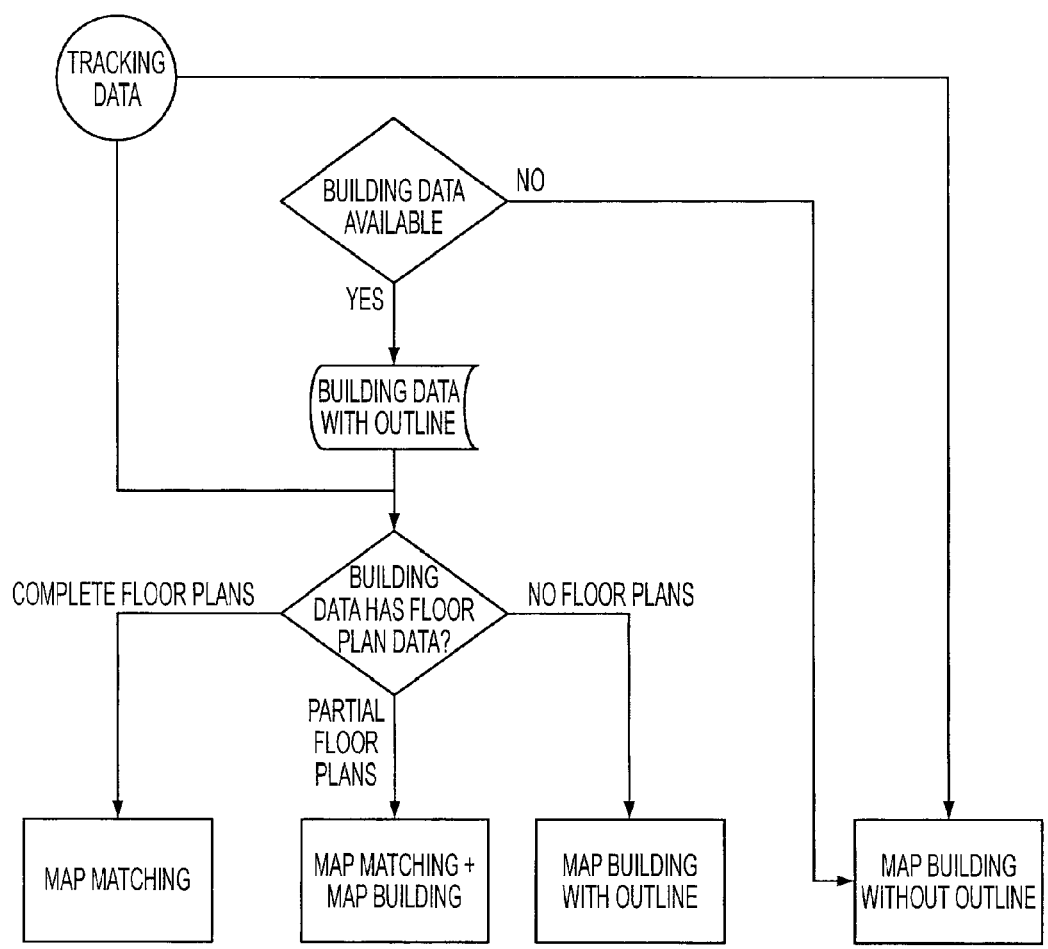
FIG. 15 is an exemplary flowchart identifying non-limiting examples of different modes in which map matching and map building methods may be used, according to an aspect of the invention.

FIG. 15 is an exemplary illustration of a flowchart depicting some of the different modes in which map matching and map building methods may be used. The operations as illustrated (and described in greater detail below) are exemplary in nature and should not be viewed as limiting.

Referring back now to FIG. 12, mapping application 130 may implement one or more outdoor tracking methods when it is determined that a trackee is outdoors. These methods, described in greater detail below, may fuse position estimates from tracking data that includes estimates from multiple outdoor tracking methods (e.g. inertial tracking estimates, and GPS estimates).

IV. Mapping Techniques and Tools

As previously noted, mapping application 130 may comprise a suite of mapping tools that may be utilized to track the location of personnel and/or assets, both indoors and outdoors. The mapping tools may be used to detect characteristic shapes in the tracking data, and align the shapes to valid compass angles when available. Furthermore, the tools may align the shapes to hallway orientations. The various tools may also be used to match paths and/or shapes, match parts of paths to other parts of the same path, match paths to other paths, match paths and/or shapes to known shapes (such as, for example, hallways), and create hallways from overlapping shapes. These and other enabled features and functionality are detailed below.

A. Analysis and Processing of Building Data

According to an aspect of the invention, building outlines may be obtained by methods such as, for example, marking aerial imagery, or directly from GIS layers of the area. A building outline may also be obtained by tracking data of personnel and/or assets traversing the edge of a building to estimate the outline, or via other methods.

In one implementation, an outline of a building may be used to restrict the indoor trajectories of personnel and/or assets within the building, prevent outdoor trajectories from crossing into the building, and correcting heading of personnel and/or assets. Building outlines may be used for other purposes as well.

The outline of a building, even without a floor plan, may provide very valuable hints about the type and configuration of the building. Most buildings have hallways that are aligned (parallel or perpendicular) to the longest walls (edges) in the building outline. In a rectangular building for instance, it is very rare to see a hallway that is not parallel or perpendicular to the outer walls. Thus, in a simple rectangular building, a path that appears to be on a hallway could be corrected to lie parallel or perpendicular to one or more building walls.

Grid Angle Extraction

According to an aspect of the invention, the footprint of a building may comprise a polygon that may be characterized by long straight edges. Grid angles may be defined as the angles at which these long straight edges are oriented. Several buildings are orthogonal with edges perpendicular to one another, hence forming an orthogonal grid. Several other buildings are characterized by a mostly orthogonal shape with one slanting edge. This introduces an additional grid angle for the building, or secondary grid angle. Other buildings may be defined by edges where each edge adds a new grid angle.

Grid angles are relevant to mapping techniques, for example, to achieve heading corrections. In map building methods, the orientation of hallways may be unknown and can be determined each time a new hallway is detected. Hallways of most buildings are constructed along a grid of the building (e.g., parallel or perpendicular to the long building edges). Buildings may have hallways that do not run along the grid angles of the building, though they are usually smaller hallways. These exceptions, however, may be taken into account by the map building methods described herein.

In one implementation, if an outline of a building is available from one or more sources such as, for example, GIS mapping or aerial imagery, the grid angles may be obtained by analyzing the building outline. The slope and length of each of the edges of the polygon (representing the building outline) may be extracted using the distance formulae and slope formulae. In some implementations, edges that are shorter than a predetermined threshold may be ignored. In one implementation, this threshold may comprise 10 meters, although other thresholds may be used. This threshold may be, for example, be determined by checking the lengths of the longest building edges.

Once the long edges of a building and their respective slopes are determined, comparisons may be made to identify groups of edges that are approximately parallel or perpendicular to each other. It may be noted that the grid angle of an edge and/or line may be described as slope modulo 90, such that lines along slopes 0 and 90 are along the grid described by the grid angle 0. Edges that are parallel or perpendicular to each other are referred to as being on the same grid. Each group of edges on the same grid may yield a new grid angle if the grid angle does not yet exist. In addition, since several buildings with slanted edges often have a few slanted edges coupled with a more orthogonal shape for the rest of the building, a determination may be made as to whether the building has a dominant grid angle, also referred to as the primary grid angle. The primary grid angle may be defined as the grid angle which defines the slope of the majority of the edges of the building. For the following map building methods, it may be noted that the probability of creating hallways may be higher along the grid. In addition, the probability of hallways along grid angles other than the primary grid angle may be higher when in the area of the building constructed along the edge that yielded the grid angle.

Building Partitioning

According to an aspect of the invention, a building may therefore, via building edge analysis, be partitioned into sections, with each section being associated with expected hallway orientations or angles. The partitioning may be achieved by first determining the primary grid of the building, where the primary grid is defined as the slope modulo 90 which a majority of the outer walls of the building are aligned to. In one implementation, this may be obtained by iterating through each edge of the building above a threshold length, and grouping these long edges by their slope modulo 90 (or grid angle). A threshold may be used to define which angles are considered to be along the same grid. The group with the highest density may be chosen as the primary grid. The sum of the lengths of the edges in each group can also be considered when one grid has several short edges, whereas the primary grid has a few very long edges.

Once the primary grid has been detected, lines along this grid may then be spawned out starting from all corners of the building, dividing the building into a set of rectangles and/or triangles (or other shapes) all aligned to the building edges. With this mechanism, any point inside the building outline will now lie in exactly one of the rectangles. Next, each edge along the outline adds its own slope as a plausible slope for hallways lying within any of the rectangles intersecting the edge. Also, internal rectangles neighboring rectangles with slopes other than their own may inherit their neighbor's slope as a plausible slope when the rectangle is within a threshold distance from the edge defining this slope. The plausible slopes that a long segment of the path might lie at may now be determined by which rectangles that segment intersects, as these slopes are the slopes of the outer walls near the area where the segment lies.

Figure 16:
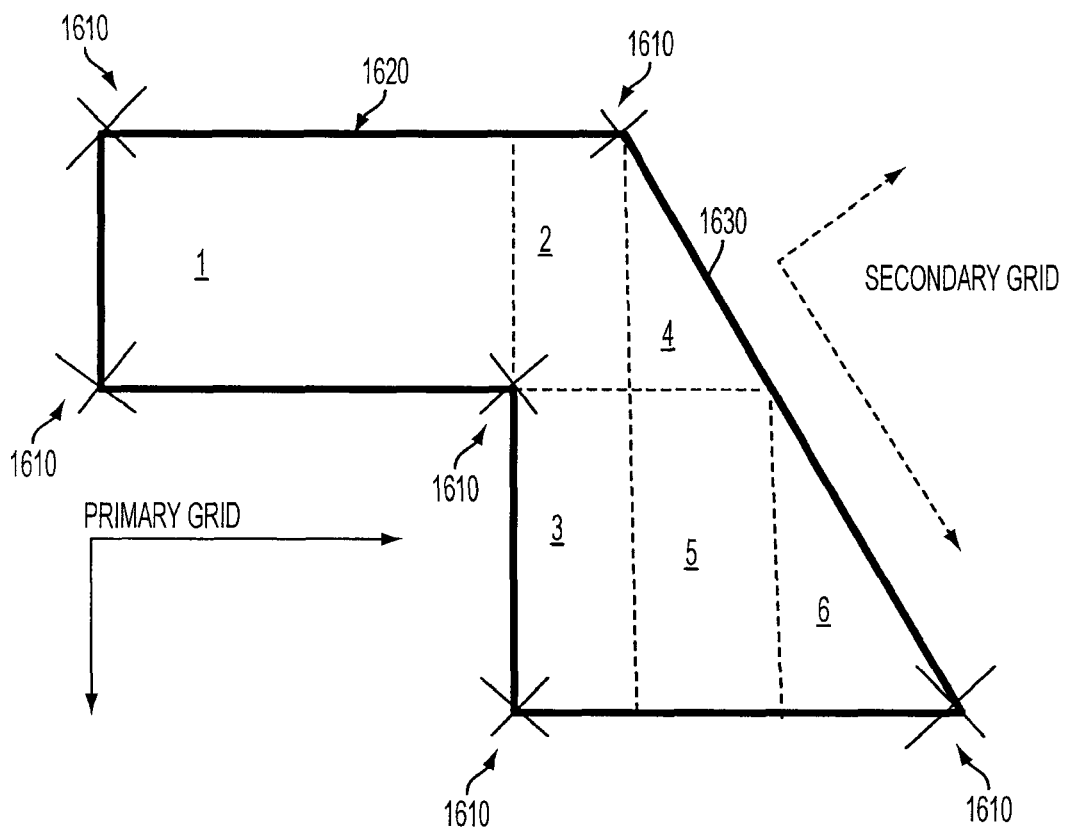
FIG. 16 depicts an illustrative example of building partitioning, according to an aspect of the invention.

FIG. 16 is an illustrative example of building partitioning. Each "X" 1610 represents a building outline point, and the X's combine to form the building outline polygon 1620. The building outline polygon may be processed using the method described above to partition the building into rectangles and triangles as shown, for example, by partitions 1-6. The orientation of the primary grid in this example is shown to the bottom left of FIG. 16 since it is the orientation of the majority of the outer walls.

The building may also be assumed to have a secondary grid defined by the single slanted edge 1630. The secondary grid represents the orientation of slanted edge 1630 and the orientation perpendicular to slanted edge 1630. In a map building and/or path alignment method the probability of a hallway being along the secondary grid may be high when the segment and/or points lie in partitions 4, 5, and 6. Partitions 2 and 3 also have some probability of including hallways along the secondary grid due to proximity to slanted edge 1630, and being neighboring partitions to partitions directly connected to slanted edge 1630. A high probability of hallways along the primary grid may be assumed to exist in all the partitions in this illustrative case.

Various alternative building partitioning methods may be implemented. One goal of building partitioning is to determine what is inside a building based on the outline of the building. As such, any method of interpolating slopes within the building may be utilized. For example, the creation of Voronoi diagrams, which may be used to group all points within the building with the nearest edge of the building's outline, might be implemented. Additional implementations may include storing compass readings to increase reliability of angles within rectangles, or merging nearly consecutive edges of the building together in order to increase the range of claimed areas. Signatures of different input data may be assigned to each rectangle, allowing parameters such as a compass heading along a segment, a series of magnetic readings, signal strengths from base stations, etc. along a segment to determine in which segment the rectangle likely lies.

Shape matching on a building outline may also enable the detection of the probability of irregular shapes in certain sections of the building. A series of outline points in the shape of an arc, for example, may suggest the possibility of curved hallways or circular rooms.

B. Segmentation of Tracking Data

According to an aspect of the invention, a tracking path, which may comprise a series of (x,y) points in tracking data, may be divided into segments. Segmentation may be used, for example, to identify long straight stretches in the tracking path which may be matched to features such as hallways. Additionally, multiple segments may be grouped into shapes that can be fitted into the shape formed by the union of the hallways. Segmentation may be utilized in both indoor and outdoor tracking methods, and by other mapping tools.

Sequential Segmentation.

Since tracking points typically occur in a certain order depending on the path of the trackee, it may be advantageous to group them into segments including consecutive sequences of tracking points.

Sequential Polygonal Segmentation.

In one implementation, to match a tracking path to one or more hallways of a building, if present, the tracking path may be divided into groups of tracking points that may be contained within a rectangle of a threshold maximum width. This method may be referred to herein as sequential polygonal segmentation.

Rectangles may be used to detect that a group of points might be in a hallway, to match them to specific hallways, and/or to create hallways from the rectangles (as in map building methods). The threshold maximum width may be the average width of hallways (e.g., approximately 2.5 meters), the average width of the hallway with a tolerance, or specific to the hallways of a particular building, if known. The tolerance may be determined using the nature of the tracking data type, if known. As previously discussed, tracking data types are largely dependent on the primary method and/or device used to determine location. The method to achieve sequential polygonal segmentation may be modified depending on the data type. Because inertial tracking data is very accurate over the short term, looking at sequential segmentation of inertial data is a highly effective method of grouping the data for further analysis.

According to an aspect of the invention, one exemplary method is described for drawing a minimum oriented bounding rectangle (minOBB) for a set of tracking points including an (x, y) 2D location. The bounding box (minBB) of a group of points may typically be defined as the smallest orthogonal rectangle (a rectangle oriented to the axes) that completely contains the points. Specifically, the minBB may be found by defining a rectangle with top left corner (minX, minY), top right corner (maxX, minY), bottom left corner (minX, maxY), and bottom right corner (maxX, maxY), where minX, and minY are the minimum X and Y coordinates for the group of points, and maxX, and maxY are the maximum X and Y coordinates for the group of points.

In one implementation, the minOBB may be determined by calculating the minBB for the tracking points in their current orientation, calculating the area of this bounding box, and setting it as the current minOBB, with area, Amin. The points may then be rotated by a degree, the degree accuracy desired (e.g., 1 degree), clockwise about the first point, and the minBB may be calculated again. If the area of this minBB, or Acurr, is smaller than Amin, then Amin may be set to equal Acurr, and the total rotation may be noted (e.g., at this point 1 degree). The points may then be rotated about the first point by one degree more than the rotation in the previous iteration, and the same comparison may be performed. This may performed up to a rotation of 90 degrees. Once 90 degree rotation is complete, the minimum oriented bounding box may be defined as the bounding box with the smallest area rotated around the first point by −1*total_angle_of_rotation (i.e., counter-clockwise by total_angle_of_rotation).

In the foregoing method, the increment of rotation may be increased or decreased depending on the amount of accuracy required, and the points may be rotated about any point as long as the bounding box is rotated back by the rotation amount about the same point. Though this method is highly accurate, it may be slow for some applications.

In another implementation, the same goal may be achieved by first calculating "a line of best fit" for the points. A widely known equation using linear regression for the line of best fit in the form y=a+bx, is given as:

$$a = y\text{mean} - b*x\text{mean};$$

where ymean is the average of the y coordinates of the points; and xmean is the average of all the x coordinates of the points. The slope, b, may be defined as:

$$b = (\Sigma XY - ((\Sigma X)(\Sigma Y))/N)/(\Sigma X^2 - ((\Sigma X)^2/N));$$

where N is the number of points;
$\Sigma X, \Sigma Y$ is the summation of all the X, Y, coordinates of the points;
$\Sigma X^2$ is the summation of the squares of all the X coordinates; and
$\Sigma XY$ is the summation of the products of the X and Y coordinates of the points.

This "line of best fit" may be found by minimizing the distances from the point to the line along the Y axis. This results in the predicted line of best fit sometimes being inaccurate when the points are better fit by a more vertical line (e.g., slope>45 degrees) rather than a horizontal line (e.g., slope<45 degrees). This may be corrected for by first calculating the minBB for the points. If the bounding box has width>height, then the best fit line is found as is. If not, the points are all rotated about the first point by 90 degrees clockwise. The best fit line for these rotated points may be found using the equation above, and then the line is rotated counter-clockwise by 90 degrees about the first point. Once this actual line of best fit is found, the minimum oriented bounding box can be found by rotating the points by the slope of the line of best fit clockwise, calculating the minBB, and rotating it back counter-clockwise by the slope of the line of best fit.

The methods to find the minOBB may then be used to perform sequential polygonal segmentation to group the points sequentially into segments, such that the points in each segment are contained in a rectangle of width not more than a threshold, RECTANGLE_MAXWIDTH.

In one implementation, the segments that the path is divided into are called Polygonal Path Segments (PPSs) and specific to this implementation are rectangular segments. Rectangular segments can be useful since hallway and stair regions, for example, are often rectangular and can be suitable for comparison. Each PPS comprises a list of tracking points, and the minOBB of the points. The method may start with initializing an empty list of PPSs that represent the tracking path and a new PPS, currPPS, with the first tracking point, and the minOBB for the first point. This minOBB is also set as currOBB. For each new point, the minOBB may be calculated for the points in currOBB and the new point, to yield a new currOBB. If the currOBB has a width less than RECTANGLE_MAXWIDTH, the current tracking point is added to currPPS, and minOBB of currPPS is updated to currOBB. If not, currPPS is added to the list of PPS for the tracking path. currPPS may then be initialized to a new PPS with the current tracking point, and currOBB, which is the minOBB for the new point. This procedure may be continued for all the tracking points to generate a list of PPSs representing the entire tracking path.

The above method generates an effective grouping of points in general, although it should be noted that around turns it sometimes results in the PPS following the points in the turn rather than breaking the current PPS and starting a new one.

In one implementation, turns may be more effectively handled by keeping track of a consecutive series of tracking points that cause the width of the currOBB to increase a threshold ratio more than they cause the length to increase. This event is flagged for each such tracking point as WIDTH_INCREASING_FLAG. If an increase in width above the threshold is noted, and then another point is included in the same currOBB with less than threshold increase in width compared to length, the flag may be reset because this motion is likely due to wandering back and forth in a hallway, rather than a turn. Each time a new currOBB is initialized, a check may be made to see the last point in the previous currOBB triggered the WIDTH_INCREASING_FLAG. If so, the first point in the series of points before the last point which triggered the WIDTH_INCREASING_FLAG is found. currPPS may be modified to remove the series of points that had triggered the WIDTH_INCREASING_FLAG, and the minOBB for the PPS is updated to the minOBB for the remaining points. This currPPS is added to the list of PPSs. The new currPPS is then set to include the series of points that triggered WIDTH_INCREASING_FLAG and the new point, and currOBB is updated to be the minOBB of the new list of points. This method effectively breaks the PPS at the turn point, capturing the points after the turn into the new PPS. The procedure may be continued for each point to generate the list of Polygonal Path Segments (PPSs).

Figure 17:
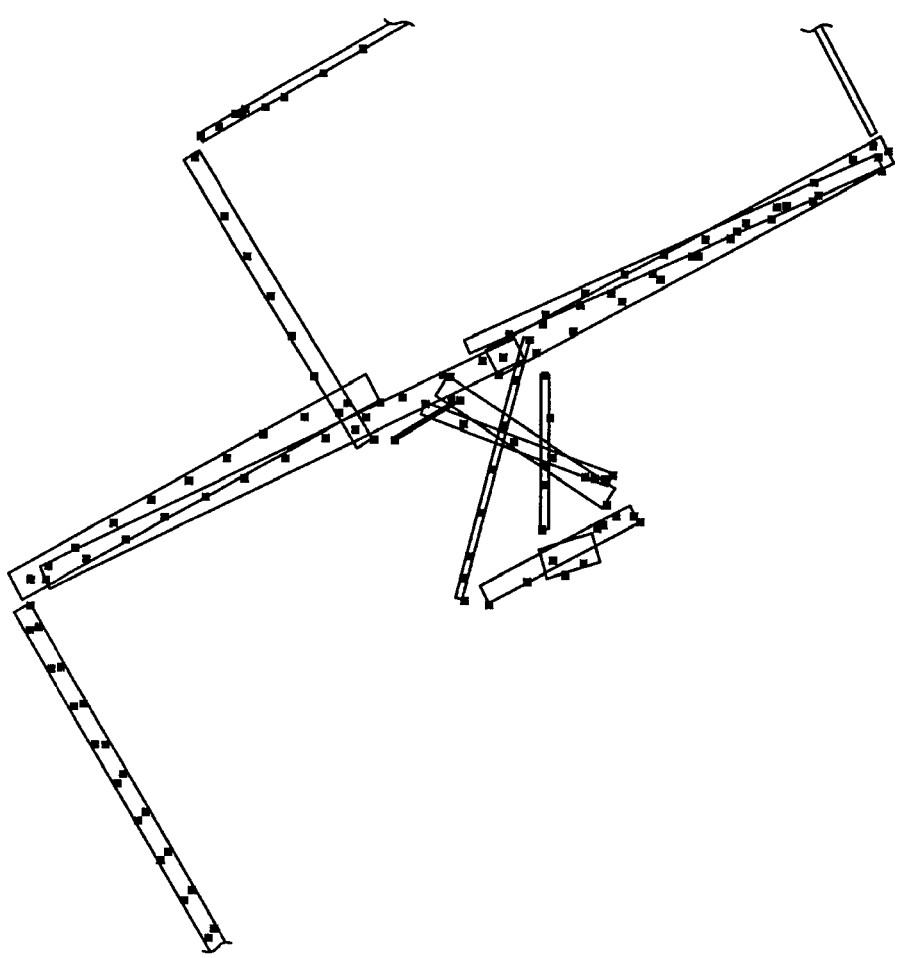
FIG. 17 depicts an illustrative example of results of sequential polygonal path segmentation, according to an aspect of the invention.

FIG. 17 is an illustrative example depicting the results of sequential polygonal path segmentation, according to an aspect of the invention.

Sequential Adaptive Polygonal Segmentation.

According to an aspect of the invention, as an alternative to grouping the points into rectangles with a threshold width restriction, they may be grouped into adaptive polygons. A series of points that is better represented as a rectangle with a width restriction may be represented as in the sequential polygonal segmentation method, whereas a series of points better represented by a box (a rectangle with comparable length and width) could be represented by the same. It may, for example, be useful to group points into polygons that suggest they are either on hallways for long rectangles, or in rooms for box polygons. In one implementation, this may be achieved by first using the above sequential polygonal segmentation method to break the tracking path into polygonal path segments. A following method analyzes consecutive PPSs to determine whether they can be included within a box polygon.

Global Polygonal Segmentation.

According to an aspect of the invention, for tracking data that is not subject to drift, such as signal-based systems, or potentially for high quality inertial systems where drift is highly minimized, the tracking data may be grouped into polygons as in the sequential methods, however a batch of data may be analyzed over some period by analyzing their location as absolute (modulo some bounded error) and ignoring the sequence in which the points were taken. Additionally, in the case of global polygonal segmentation for tracking data that is not subject to drift, the path may be scanned for straight segments along the grid angles of the building if the building outline or hallway angles are known.

Global Adaptive Polygonal Segmentation.

The same scanning as described for the global polygonal segmentation can be performed for data without angular errors such as data from signal-based tracking methods, or inertial tracking data after angular correction, by scanning the data for straight segments without taking sequence into account.

Polygonal Segment Parallelism Checks.

The result of various segmentation methods may be processed to build a set of relations between different segments. If segments are within a certain threshold slope of one another, they may be flagged as parallel indicating that they may be along parallel hallways.

Polygonal Segment Orthogonality Checks.

According to an aspect of the invention, a set of relations between segments may be updated to include a flag to indicate that two segments are orthogonal or approximately orthogonal (i.e., their slopes are approximately 90 degrees apart).

Polygonal Segment Extended Inclusion Checks.

According to an aspect of the invention, a set of relations may also include an indication as to whether segments can include one other if extended, referred to as an extended inclusion check. This relation between the segments may indicate that the segments are located in the same hallway. The above parallel, perpendicular, and inclusion checks may be valid over the short-term neighboring segments in inertial data, but applicable globally for signal-based tracking data.

C. Location Computation Using Previous Tracking Estimate

According to an aspect of the invention, for both indoor and outdoor tracking methods, each time a new tracking data point, segment, or shape is encountered, its current tracking estimate may be computed using the estimate of the previous point, segment, or shape. This operation may be performed assuming that corrections have previously been made. For inertial tracking data, all previous corrections may be applied to a new point, segment, or shape.

According to an aspect of the invention, tracking points may be processed on a point-by-point basis, and as groups such as segments. When a new tracking point is encountered in real-time, or when iterating through tracking points when future tracking points are known, the location of the current tracking point may first be set assuming that no corrections are being made. A check may then be performed to see if corrections can be made.

In the absence of a complete description of a building, corrections may be made to location estimates when possible. At most other times, new points may be updated to their relative position to the corrected points, rather than attempting to match them to the building or matching them to links which distort the tracking data.

In one implementation that takes data from an inertial system, the tracking path may be updated on a point-to-point basis. In inertial systems that report increments from a start point, corrections made to each point may be applied to all future points. The start point may be set either by a transition (e.g., outdoor-indoor) method, a correction method, or by the user. In addition, since inertial systems calculate tracking paths based on gyros, the path may progress in a different heading from its true heading and the entire path may need rotation. The raw heading, rawHeading, is the slope of the line from the previous tracking point to the current tracking point. When a location estimate is made for a tracking point, its estimated map heading, mapHeading, changes. The angular difference between mapHeading and rawHeading, pointRotation, may be calculated at each point for all the points. For each new tracking point, the distance between the tracking points, rawDistance may be calculated using the distance formulae. The heading, mapHeading may then be calculated as the rawHeading+pointRotation, where the pointRotation is the rotation for the previous tracking point. The current location estimate without correction may then be computed as:

$$X=\text{prev\_}X+\text{rawDistance}*\cos(\text{mapHeading}); \text{ and}$$

$$Y=\text{prev\_}Y+\text{rawDistance}*\sin(\text{mapHeading}).$$

The same calculation may be achieved by adding the raw increments to the previous tracking point to obtain the new tracking point, and by rotating the new tracking point around the previous tracking point by pointRotation.

In one implementation, processing may be performed on a segment basis and point-to-point basis, where the tracking data has been grouped into PPSs as previously described. In this implementation, corrections may be preformed for individual points, a single PPS, or group of PPSs. Each correction made may be represented as a translation, rotation, and a scaling. Each correction applied to any segment may then be queued onto a list of corrections, and is also represented as a matrix. Some corrections which are made for local fitting to landmarks may not be queued on to the correction list. A new PPS may be transformed (both the points and the minBB are transformed) by all the correction matrices queued so far resulting in the new location for the PPS. This method allows for a location of a point or segment to be determined without having to calculate the location of each point before it. In addition, the location of a single point may be found by transforming it by the list of correction matrices. Alternatively, the same effect may be achieved by applying the correction for a given segment to it, and all future segments.

The same correction methodology may be applied when groups of segments/shapes are processed iteratively. Each shape may be corrected by the transformations applied to the previous shape. After computing the new location estimate for the current shape, checks can be performed for additional corrections for the current shape.

D. Tracking Error Analysis

According to an aspect of the invention, analyzing the error in a tracking path may be used to determine bounds on the corrections that may be made while matching tracking path segments and/or shapes to features in the building, or to other tracking path segments. It may also be used by shape matching and shape alignment methods to determine different matching criteria for each segment and/or shape rather than using constant thresholds. Additionally, the error bounds may be used by methods such as map matching and map building to accept or reject a possible correction. For example, if a segment is close to a hallway but the correction to the hallway exceeds the maximum scaling error accumulated in the tracking estimate, the correction may be rejected.

In one implementation, inertial tracking error estimates may be obtained at the mapping layer as a part of the tracking data if the analysis is done by a tracking system (e.g., system 110a of FIG. 1), or may be obtained by methods that operate on the tracking data. The error may be expressed as an angular error estimate and a scaling error estimate and may be tailored to the type of inertial method used to predict the location of the trackee, if known. For example, inertial systems that only use gyroscopes to determine heading can accumulate error due to the rate of turning, the total magnitude of all the turns, and time elapsed. However, if a compass is used to correctly update the heading at certain time points, the error can be reset. Similarly, while estimating scaling errors, if an inertial system uses integration techniques, the error may depend significantly on time elapsed as the integration accumulates error at every time step. However, in an inertial system that uses a pedometer, the dependence on time elapsed may be less, since motion is not registered until a step is taken, and is more dependant on number of steps taken.

The errors at a tracking point of interest may be estimated with respect to a reference point. This reference point may be the start point of tracking, a selected point, or any tracking point in the tracking data. The scaling error may be estimated as a function of displacement from the reference point and the distance traversed since the reference point was registered.

For illustration, if offset (x, y) is the 2D offset of the current tracking point from the reference point, dist, the distance traversed between the two tracking points, the error offset, error (x, y) in 2D can be estimated as:

error.*X*=errorPerDisplacement*offset.*X*+
errorPerDistance*dist;

error.*Y*=errorPerDisplacement*offset.*Y*+
errorPerDistance*dist;

where errorPerDisplacement is the fractional error per unit displacement; and errorPerDistance is the fractional error per unit distance traversed.

For example, if the inertial system is tested to accumulate 5% error of the distance traversed, errorPerDistance would be 0.05. The offset can be calculated in a particular orientation such as the heading at the current or reference point. The equation may be interpreted as providing a rectangular bound on the error at the current point (curr) represented by the rectangle anchored at curr.X−error.X, curr.Y−error.Y, with length 2*error.X, and height 2*error.Y. This indicates that, if the position of the reference point is known, the current point is estimated to lie in the error rectangle relative to the position of the reference point.

For illustration, the angular error may be estimated using a similar concept as:

Angular_error=errorPerDegreeRotation*totalDegreesRotated+
errorPerDegreeDeviation*degreeDifference+ errorPerUnitTime*time_interval;

where the Angular_error is for one tracking point with respect to a reference point;

totalDegreesRotated is the summation of the angle changes between the two points;

degreeDifference is the resultant difference between the two angles; and time_interval is the time difference between the two timestamps.

A more accurate angular error estimate may be made in the tracking unit taking random walk and rate of angle change into account.

Figure 18:
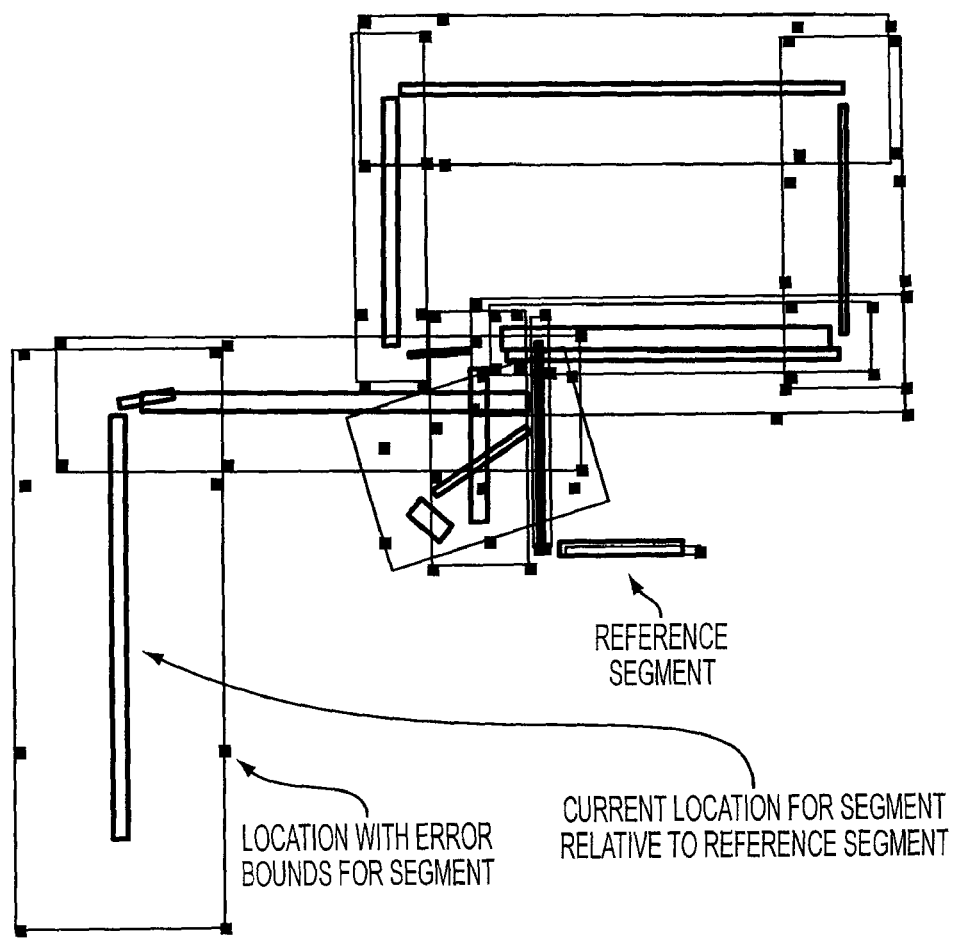
FIG. 18 is an exemplary depiction of error bounds for a segment relative to a reference segment, according to an aspect of the invention.

FIG. 18 is an illustrative example of error bounds for a segment relative to a reference segment. As shown, segments are depicted as black rectangles, error bounds are shown in gray, and error points for segment start and end points and displayed as black points. In the illustration, the scaling error analysis has been performed after correcting the heading of the segments removing angular errors.

According to an aspect of the invention, the foregoing methods may be extended to segments of inertial data. For example, if tracking data is segmented into lines, the error of one segment with respect to the other may be estimated by finding the error bounds of the start point and the end point of the line with respect to the start or end point of the reference line. The error bounds for the entire segment may then be found by finding the rectangle that bounds the error bounds of both points. The same approach may also be used for rectangular segments by using the four points of the rectangle. Also, the error bounds may be found for each point in the segment individually, and the error bounds for each point may be bounded by a single rectangle to represent the error bounds for the segment. The error bounds may also be represented as different shapes such as circles and ellipses.

E. Path Grid and Shape Detection

Most buildings are either orthogonal in shape or comprise multiple orthogonal sections. Consequently, hallways providing connectivity within the buildings can also often run parallel or perpendicular to other hallways. Rooms are often built along hallways, often rendering them aligned to the hallways. The presence of these features can lead to tracking paths comprising sections of long segments that are along the same grid (i.e., parallel or perpendicular to one another).

For tracking data with errors, it may be particularly useful to identify segments that are approximately parallel or perpendicular to one other, and identify them as being on the same grid. This method of grouping of segments also helps in identifying shapes that can be matched to known hallway structures. In addition, human pattern and shape recognition skills may help an observer decide where in the building a particular shape can fit. Similarly, logical shape matching methods may be implemented in mapping techniques to combine the shape matching capabilities of humans with the computation power of a computer. Shape matching techniques can be extremely dependant on the detection and definition of shapes, making segmentation and subsequent shape detection a critical tool in performing shape matching.

Inertial tracking paths may have heading inaccuracies due to drift. In most inertial systems, inaccuracies due to drift can be incremental. Additionally, in some inertial systems, angular rate changes above the maximum measuring rate of the gyroscopes can cause sudden heading errors. Furthermore, inertial systems which do not have full tilt compensation due to lack of 3-axis gyroscopes or tilt compensation methods can demonstrate abrupt heading errors when the tracking unit is tilted away from being upright. To account for the different types of errors, path grid detection methods may be implemented and may be tailored to the quality of the inertial tracking data.

In one implementation, path grids may be identified by analyzing the result of a segmentation method that results in a series of segments. These segments may comprise a simple grouping of points, or a more advanced approximation of the segment such as a line, rectangle (PPS), or ellipse. Each segment may be associated with an orientation (slope) such as the slope of the line, or rectangle approximating it, or the slope between the start and end points of the segment. The segments that can be grouped into path grids, due to restrictions imposed by the building, are typically longer segments. Therefore, segments with length above a threshold may be considered for the analysis.

In one implementation, consecutive orthogonal grids may be detected by iterating over a series of chosen segments. For each segment, the difference of the slope of the current segment with the current grid may be computed. This difference may be found, for example, by calculating the angle difference for these numbers, modulo 90. If the difference is below a predetermined threshold, the segment may be added to the current grid, and the difference may be added to all of the following segments since this counts as a correction. If the difference is above the predetermined threshold, the segment is considered to be on a new grid. In this case the previous grid ends while the new segment starts a new grid. If the inertial error analysis is available, the correction threshold may be replaced with the maximum possible heading error with respect to the last segment on the grid.

These orthogonal shapes may be used by shape matching and fitting methods to match tracking path shapes to the floor plan shapes. Multiple shapes may be combined (treated as a single shape) if subsequent methods such as compass and building grid corrections result in segments in multiple shapes being orthogonal to one other. Additionally, in buildings with multiple grid angles, non-orthogonal shapes may be created to be tested for shape matching.

F. Corrections to Tracking Data Using Compass Data

Tracking data that includes magnetic/compass data can greatly enhance tracking capabilities. Specifically for inertial tracking data, headings are often relative to the direction in which the inertial tracking unit was turned on. This implies that in the absence of any other information, the entire path may be rotated to be aligned to the true heading. Inertial drift adds to this problem with different sections of the data requiring different rotations to be aligned to their actual headings.

According to an aspect of the invention, identifying the true heading of a trackee at any given point may remove most (if not all) of the error due to drift. Correcting the heading of an inertial path using accurate compass angles (headings) is one of the methods that can be used to reduce the effects of inertial drift. Large buildings can have high levels of magnetic interference, therefore resulting in few accurate compass headings to align to. The lack of availability of continuous accurate compass headings may result in the inaccuracy of those methods that are dependant on compass headings being accurate at each time step. In addition to the inconsistency of compass readings, it is also a challenge to identify that the compass angle is accurate even when the readings are good.

In one implementation, for tracking data including compass angle and gyro angle data, checks may be performed by matching the compass angle and gyro angle trends to detect which compass angles are good. In the absence of a reported gyro angle, the heading between successive points may be used to replace the gyro angle.

To apply robust compass checks, in one implementation, the tracking data may first be segmented. For each segment, a segment heading may be computed. For each tracking point in the segment, if a compass angle is available, the compass angle may be adjusted by the difference between the segment heading and the gyro angle at that tracking point. This ensures that the compass angles being compared are all facing the same direction. This compensates for tracking points in the same segment where a tracking unit was facing different directions. Compass angles recorded while the tracking device is still and/or turning may be ignored as they tend to be less accurate. The rotated compass angles would now approximately all be the same if all of the compass angles were accurate. In cases where there are inaccurate compass readings, simply averaging these angles may result in incorrect compass estimates since compass angles can be highly inaccurate when magnetic interference is present. Therefore, when all the compass angles are not accurate, a scan may be performed to find all the values that are approximately equal to one another. This may be performed by clustering the angles into groups that are within a threshold angle of one another. Once grouped, the average angle of the cluster with the highest density may be tagged to the segment as a suggested compass value. If two or more compass angle clusters have a similar densities, the one with the highest may be chosen, or multiple angles may be tagged to the segment for subsequent methods to resolve. If the count of angles in the densest cluster is less than a predetermined threshold number of points, or two clusters are too close to be resolved, the segment may be tagged with an "unknown" value, specifying that the compass angle could not be determined.

In one implementation, a similar technique may be applied over multiple segments or path grids within a range where the inertial heading error is within known bounds. If path grids have been detected, the compass may be checked over all the points within the grid after rotating the compass angles to the same direction. Alternatively, the compass estimate of segments in a path grid may be found separately, and the compass estimates for each segment may be checked to be consistent with the shape of the path grid. Compass angles may be inherited for the segments that have "unknown" compass angles, and overridden if the compass angle does not agree with the other segments in the path grid, or if the rotation required to align the segment to the compass angle is greater than the maximum heading error possible.

In one implementation, if the grid angles of the building are known and large path grids that must conform to the building grid angles are detected, compass angle clustering may be performed to match the compass clusters of segments to the building grid angles. To illustrate this, if a building is aligned to North, South, East and West, and the compass angles for a segment or path grid (rotated to one of its segments, after removing the magnetic declination) are obtained, they may be scanned and clustered around 0, 180, 90 and 270 degrees, respectively, and the cluster with the maximum density may be chosen as the correct orientation for the segment or path grid.

G. Corrections to Tracking Data Using Building Grid and Partitioning

Since most hallways in a building are aligned to the building grids, shapes comprising long orthogonal segments are likely to occur along the building grid. After detection of path grids/shapes in a tracking path, and assigning compass angles when available, the tracking path may be corrected to the building grid and partitions where appropriate. By iterating through the shapes in the tracking path, each shape may be checked for the building partition or partitions it crosses and/or lies in. From the angles associated with the building partitions using the building partitioning tool, the probable headings for the shapes may be obtained. The entire shape may be rotated to a probable heading that is within correction bounds by checking a rotation threshold or the maximum rotational error in the error analysis. This may be performed for each shape in the tracking path while applying the correction for a shape to all following shapes for inertial tracking data.

H. Shape Analysis Using Line Analysis and Line Matching

According to an aspect of the invention, while analyzing a single tracking path of a trackee over a long period of time, or comparing the tracking paths of multiple personnel and/or assets, methods to compare the layout of dominant lines in the tracking data may be useful. This analysis may be directed toward identifying hallways of the building which are usually long and traversed multiple times by different trackees. These lines extracted from the tracking data may be referred to as tracking lines.

In one implementation, these lines may be obtained as the longest segments using line or rectangular segmentation. Specifically in inertial tracking data, as scaling errors start to accumulate, paths along the same hallway may appear to be offset from one another if separated in time. Additionally, the paths of different trackees through the same hallway may be offset from one another due to accumulated errors over time or due to inherent scaling errors between two different trackees.

To analyze the line segments of a trackee, each line segment may be transformed to Hough space where each line is described as a vector from the origin or any fixed reference point to the line. In one implementation, the analysis may be limited to line segments above a certain predetermined threshold length that can be along hallways of the building. Once the Hough representation of each line segment is obtained, they can be sorted by distance from the origin or reference point.

Determining which lines lie in a hallway while analyzing a single tracking path or multiple tracking paths can be a very challenging task, especially when floor plans of the building are not available. Each trackee may traverse a different path, and even when the same hallway is traversed, it may be partially traversed and traversed at times when different tracking paths have different accumulated errors.

To locate possible hallways and corrections to the lines of the same (or different) tracking paths, the relative position of the lines may be compared to determine whether they match the relative position of tracking lines in the same path or tracking lines in another trackee's path. If this match occurs within the bounds of the errors in the tracking data at the lines being examined, a correction may be made to laterally align (translate) these lines to one another. To implement this method, the lines may be sorted by distance from the origin or reference point. This may be performed after grouping the lines by orientation or slope. A list of numbers may then be generated by calculating the offset perpendicular to the slope of each line from its previous line, creating a list of relative offsets. With two such lists of relative offsets (e.g., one from each trackee's list of lines traversed), creating the set of all signed differences from the first list to the second and then finding the mode (with a fuzzy threshold) can create the offset that overlaps the most lines.

Performing this processing for each axis that long lines lay upon generates a set of vectors, each the optimal in terms of overlap count for its direction. Combining these vectors into a single offset in the original coordinates may be accomplished by finding the location where perpendicular lines drawn from each vector approximately intersect. Finding this location may be accomplished using vertex clustering or other techniques. This processing may also list all offsets resulting in overlap, as the greatest overlap may be outside correction bounds. Shape alignment techniques can be applied to heading corrected inertial data, and/or data from signal-based systems using the same underlying principles.

Figure 19A:
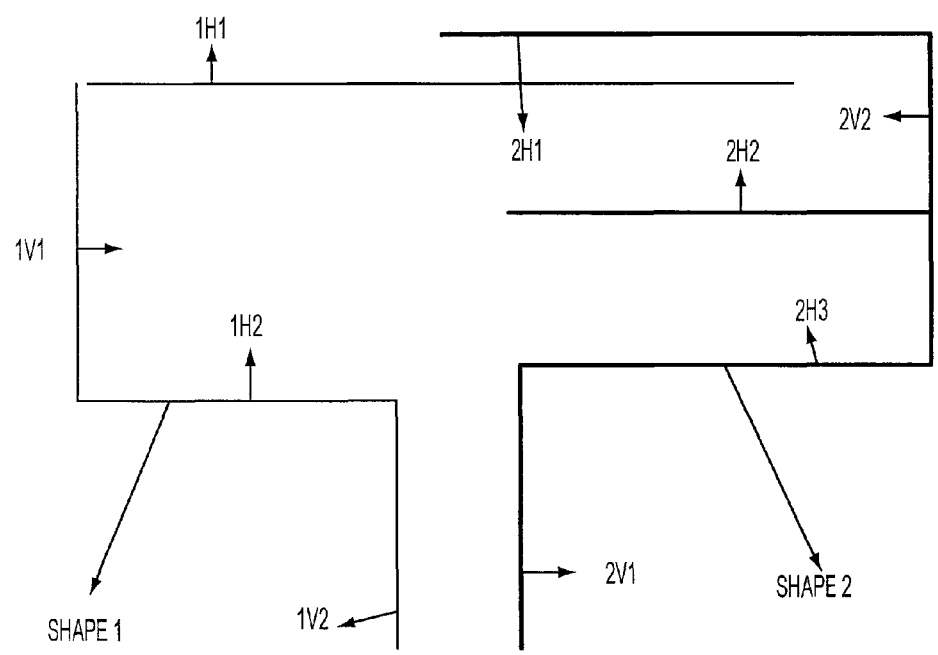
FIG. 19A is an illustrative example of two separate shapes extracted from the segmentation of the tracking path of two different trackees, according to an aspect of the invention.

FIG. 19A is an illustrative example of a first shape, "Shape 1" (depicted in the color gray), and a second shape, "Shape 2," (depicted in the color black), extracted from the segmentation of the tracking path of two different trackees. Due to previously accumulated tracking errors, the vertical line pair "1V2" and "2V1" are horizontally offset from one other. In addition, the two line horizontal line pairs ("1H2" and "2H3") and ("1H1" and "2H1") are vertically offset from one another by a similar (fuzzy) vertical offset. The line "2H2" of "Shape 2" does not have a match in "Shape 1" (the gray shape). When these two shapes are sent to a shape alignment tool (or processing algorithm), the tool may compute all of the possible offsets and the corresponding overlaps for these offsets. The combination of a vertical offset to align "1H1" and "2H1" and the horizontal offset to align "1V2" and "2V1" may be found to result in a maximum overlap (all three pairs mentioned above) within feasible correction bounds. Performing a correction for this offset in a method (such as, for example, map building) may be useful to create a floor plan using the two shapes. It may be noted that another large horizontal offset aligning "1V2" with "2V2" may align four pairs of lines: (1) "1V2" with "2V2;" (2) "2V1" with "1V1;" (3) "1H2" with "2H3;" and (4) "1H1" with "2H1." Though this offset overlaps more line pairs, it may be ignored if found to be greater than the maximum accumulated horizontal error in the tracking path.

I. Shape Matching and Shape Fitting

Comparing tracking paths to floor plans (known or generated), comparing tracking paths to one another, and/or or comparing floor plans (known or generated) to one another are all examples of what may be referred to as geometric shape matching problems.

The problem of matching a tracking path to hallways may be represented as a shape matching problem where the input shape (e.g., the tracking path) has certain inaccuracies. The base pattern (e.g., the floor plan) may also have inaccuracies since floor plans are not always accurate, or because a given floor plan may have been generated by a method with some inaccuracies.

These shape matching problems may be described using shapes such as points and lines. Most features on a floor plan (such as hallways) may be represented as lines, rectangles, or a series of points. If marked as rectangles, hallway lines may be approximated to be the line between the midpoints of the two smaller edges of the rectangle.

While matching a tracking path to a floor plan, the problem may be formulated as a shape fitting problem. If the location of each hallway (and each large room) is known and represented using shapes, the problem may be described to have the input tracking path (the input pattern) completely fit into the floor plan lines (the base pattern).

A more probable scenario may include a partial description of the floor plan. For example, it is possible that the locations of most of the hallway rectangles and/or lines are known. This condition may lead to several additional cases that may be taken into consideration. Some long tracking lines, also referred to as input pattern lines, may be on hallways whose locations are not known, therefore, the input pattern lines may not completely fit into the hallway lines, also referred to as base pattern lines. Additionally, some long tracking lines may be inside large rooms, which are also not represented in the base pattern lines. Also, several hallways lead straight into a room at the end of the hallway. A trackee may, therefore, traverse the hallway and proceed straight into the room. In this case the resulting tracking line may comprise a line that fits partially on the hallway. In each of the above cases, the shape fitting problem may be set up to attempt to fit the input pattern lines into the base pattern lines with the possibilities of unmatchable lines. An unmatchable line is therefore a line whose match cannot be found in the base pattern lines.

Figure 19B:
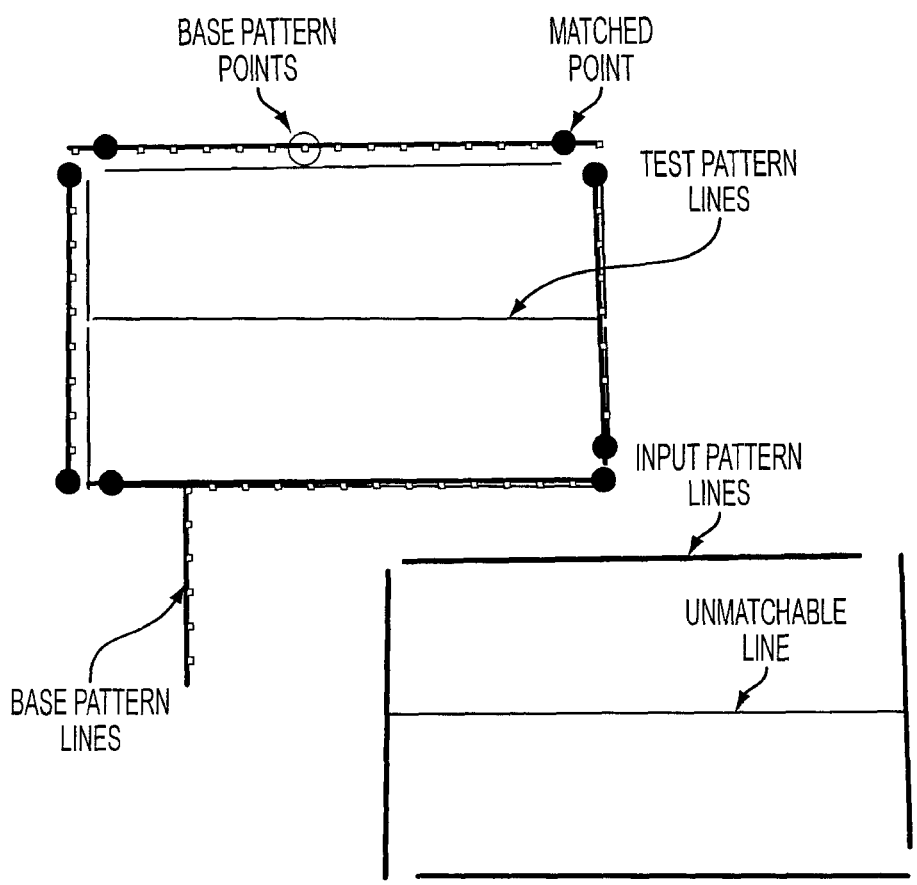
FIG. 19B is an illustrative example of a shape fitting method, according to an aspect of the invention.

According to an aspect of the invention, shape fitting without unmatchable segments may be achieved by converting both patterns into a set of points each, base pattern points, and input pattern points. To obtain the base pattern points, each base pattern line may be "segmented" into points. This may be achieved by interpolating points between the start and end points of the base pattern lines. The interpolation interval may be the desired accuracy of matching. FIG. 19B depicts an illustrative example of the base pattern lines and the corresponding base pattern points. Generating these points may be useful in the case of shape fitting since the input pattern lines may be matched to any part of the base pattern lines. The input pattern points may be obtained by performing the same segmentation of the input pattern lines. For shapes that are aligned to each other, the first input pattern point may be offset to a base pattern point, resulting in a series of test pattern points, or test pattern lines shown in FIG. 19B. The test pattern points are then tested for a fit in the base pattern points.

For each test pattern point, the closest base pattern point may be selected as the matched point. The distance between the two points may be recorded as the correction distance. The matched points and correction distances for all the test pattern points may be saved as a possible shape fitting solution. The smaller the matched correction distances, the better the quality of the shape fit. This process may be repeated by offsetting the first input pattern point to each of the base pattern points and computing the closest point analysis generating a series of solutions. The best solution may be chosen by a various criteria (e.g., one of which may comprise summing up the correction distances and choosing the solution with the least sum). If any of the correction distances in a solution are above a certain threshold, the solution may not be a complete fit. If no solution has all matching correction distances under the predetermined threshold, the shape may be reported as not fitting in the base pattern.

This method may work well for input patterns that are scaled quite well to the base pattern, and when there are irregular shapes such as curves, arcs, and circles. Irregular shapes are used in the same method as a series of lines or points, and the base pattern points are obtained by segmenting each line, or interpolating between consecutive base pattern points.

In the description above, the closest base pattern point for each test pattern point may be found by considering all the base pattern points. For shape fitting problems where the base shape comprises straight lines, the method may be improved by ensuring that the matches for all points in a single input pattern line are made to points in a single base pattern line. Additionally, the input pattern points in this case may be limited to the start and end point of the line instead of segmenting the line. This is illustrated in the match found for the input pattern lines in FIG. 19B. The input pattern lines are shown in black, and the test pattern lines are shown in gray after being offset to the base pattern lines. The input pattern points and thus the corresponding test pattern points are obtained using only the start and end points of each input pattern line. The corresponding matched points in the base pattern lines are shown as black dots in FIG. 19B.

For shape fitting problems where there are unmatchable segments, all offsets from the input pattern lines to the base pattern lines may be computed using the shape alignment tool. Subsequently each combination of offsets may be used to test the shape match, ignoring lines that were not found to be overlapping. In FIG. 19B, the input pattern line marked in gray as an unmatchable line is found to not fit in the base pattern lines.

For fitting shapes that may be rotated from one another (not aligned), the same method may be performed by first choosing a base pattern line for one of the input pattern lines. Next, the rotation to align the lines may be determined. This may result in two possible rotation angles, one acute and one obtuse. The input pattern may then be rotated to align to the base pattern. Once the input pattern lines have been aligned to the base pattern lines, the shape fitting method for aligned shapes, described above, may be performed to find the best shape fit.

In one aspect of the invention, shape fitting may be performed after aligning the shapes to the base pattern. The error bounds may be calculated for each line in the input pattern with respect to the lines being offset to lines in the base pattern. The correction distances in the solutions for each line may then be compared with the corresponding error bounds for the line. All shapes whose line correction distances are within the error bounds of each line may be reported as potential matches.

The shape fitting tool described above may be used by various tracking methods such as the map matching and map building methods disclosed herein. For example, in one aspect of the invention, the tracking path may be broken into segments, which may then be aligned to the building grid using sensor and data fusion methods shown in FIG. 13. The rectangular segments above a threshold may be selected for shape fitting. The input pattern lines may be obtained from the rectangular segments, and the base pattern lines may be obtained from the rectangular hallways. They are then tested for the best shape fit using the method above that accounts for unmatchable lines. If a match is found, corrections may be made to correct the matched segments to the matched hallways. If a match is not found, the input pattern lines may be alternately grouped into consecutive grids using the results of the path grid/shape detection methods. Each shape may then be sequentially matched to the hallways, and corrections may be accepted if a match within the error bounds if found.

A second version of shape comparison may comprise shape matching where two shapes are tested for being of similar shape. This method is described while disclosing the outdoor tracking method.

J. Constraint Solving

Construction and Satisfaction of Constraints on Tracking Data for Feasibility Checks, Corrections, Solution Quality Classification and Assigning Reliabilities According to an aspect of the invention, the solution at different steps (or processing operations) of the various methods disclosed herein can be checked for feasibility, and the operations required to perform corrections, if needed, may be determined.

In one implementation, for example, a tracking path may be defined as a set of constraints between points and/or lines related to the tracking data. For each solution generated as an input or output from a given method, checks may be performed to test the satisfaction of the constraints. Additionally, when violated, the corrections required to restore the constraints may be calculated and quantified to enable comparison and testing of tracking solutions.

Identifying corrections to be performed may be realized by creating constraints on the data, and then determining when these constraints are violated or unsatisfied. As an illustrative example of a required correction, a path on an upper level (or floor) of a building that extends outside the bounds of the building's outline is invalid, as it would violate a constraint that requires the entire path to occur within the bounds of the building. Another failure of heuristics may result in two points along a path being spatially separated by the entire length of the building, yet being temporally separated by mere seconds (this may, for example, violate some maximum velocity constraint between the two points). After properly formulating the constraints and their subjects, a constraint solver could detect these violations.

Verifying Validity of Mapping Results and Detection of Necessary Corrections and/or Failure According to an aspect of the invention, a tool such as a Particle-System-Constraint Solver (also referred to as a "constraint solver" or just "solver") may be provided and configured to treat certain features of a trackee's tracking path as particles, and to detect failed constraints. Features of the path may include, but are not limited to, points along the path, straight segments along the path, or portions of the path believed to be lying on stairways. Features of the path may also extend to any points or geometric shapes whose positions or orientations taken together might define or influence the path. Inertial data or any other data may be the source of these features. Such a solver may then have constraints added between its particles to represent constraints between these features, or upon these features to constrain them based on other matching method results.

It is possible, for example, to take all points along a path generated by a set of map generation heuristics (or by any other methods), and set these as the particles in a Particle-System-Constraint Solver. The solver could, for example, add a constraint that enforces that some or all of these particles must lie within a polygon or polyhedron representing a building's boundaries. It then becomes possible to detect which points, if any, are outside of the building, and, as such, whether or not the path that the heuristics have created is valid given that it must lie within the building.

Ranking and Comparing Tracking Solutions

In addition to verifying the validity of mapping results, the solver may also rank mapping results generated by different sets of heuristics, or by any other method. A constraint solver may assign to each solution a value or set of values encompassing how many constraints are satisfied or unsatisfied. The solver may then use the degree to which each constraint is satisfied to weight each violation. Even an estimate of how large a transformation would be required to turn the given mapping result into a solution that satisfies all constraints (or some subset thereof) to within some predetermined threshold of an optimal solution could be a suitable measure. Given these rankings, also referred to as "ratings," the best of a set of mapping results may be selected from multiple results. The ranking and ratings can be assigned to each. For example, in one aspect of the invention, the rating for an individual length constraint may be assigned as the fractional agreement in the final length between the particles, to the length specified in the constraint.

Rating=1−$abs$(final length−constraint length)/constraint length;

where abs is the function that returns a positive value (magnitude) for a number.

The rating for all the length constraints combined may be obtained as the weighted average of these individual length constraint ratings using the length of the constraints as weights. Similarly, angle constraint ratings may be assigned the fractional agreement in the final angle and constraint angle. The combined rating may be represented using a combination of all the different constraints assigned to the constraint solver.

Additionally, results/solutions may be sorted from most to least useful (or according to other sorting or filtering criteria), and results may be filtered to show only those results that satisfy the set of constraints to within a certain measure. This functionality may enable a user to choose the correct solution from a set of feasible solutions. More importantly, it may enable the mapping technology to choose the best solution (e.g., tracking estimate or set of tracking estimates) when multiple feasible solutions have been computed. This functionality may be implemented in methods such as map matching and map building.

Correction of Tracking Path to Desired Results

According to an aspect of the invention, a constraint solver may be utilized to correct mapping results to create more plausible or more useful mapping results. After detecting that one or more features on a path violate certain constraints, a constraint solver, in conjunction with other methods, may create mapping results that either do not violate any prescribed constraints, or come closer to satisfying the constraints than the original mapping results. If the constraints are well chosen, this may imply that the result of constraint solving is a better solution than the result of the mapping heuristics.

One exemplary application may comprise fixing known points within a tracking path. For example, a series of points along a path with increasing z positions might be determined to comprise movement on stairs. If the final phase of the heuristics is to move these points to lie on top of stairs in a building floor plan display, the rest of the path must somehow transform as well. One solution may be to translate, rotate, and scale the entire path such that those points will lie on top of those stairs. However, this strategy may fail whenever there is more than one staircase traveled within the path. If the mapping results contain any error whatsoever, transforming the path to allow one set of points to lie along stairs may cancel the other while transforming the path to allow the second set of points to lie along stairs. Instead, reformulating the idea of lying on stairs as a constraint would enable the constraint solver to generate a compromise solution in which all points determined to be on stairs correctly lie on stairs.

Several of the mapping tools of the invention may analyze a subset of the points and/or lines such as the longest lines of the tracking path, and determine where their location estimates could be. The effect of these matches may then be tested, and applied to all of the other points in the tracking data. Scenarios like these, especially when the locations of two or more separate points affect the location of another point, can be solved by the constraint solver.

According to an aspect of the invention, the constraint solver may comprise a customized iterative constraint solver that may receive as input specific points along a mapping result path, and may constrain any features of the path. The constraint solver may allow fixed points and a variety of constraints including, but not limited to, those described in the aforementioned examples. The constraint solver provides advantages to the application of correcting mapping results in real time.

As a first example, the iterative constraint solver may depend on the input configuration of the input data to create its final answer. That is, instead of taking a series of constraints and constructing a solution from scratch, the constraint solver may take in that series of constraints as well as a guess at a correct solution, an input configuration that satisfies most of the constraints to some degree already. The solver may be more likely to perform small transformations throughout the path in order to satisfy those constraints that the original mapping results violated. This means that the iterative constraint solver is not likely to eliminate the results of the mapping heuristics. It is expected that the mapping heuristics and other methods used can be very reliable and accurate in a majority of cases and that only minor corrections could be required. In this case, the iterative constraint solver is an effective way by which to guarantee that it does not ignore the original guess, and that the result of constraint solving is as good as or better than the input guess.

In addition, in one implementation, a cap on the number of iterations may be implemented so as to create a cap on the time taken by the constraint solver to come up with its compromise solution. Creating perfect constraints is difficult with errors present in the tracking data. Therefore, if the constraints overly constrain the system, there may be no perfect solution. Yet a solution still needs to be made in a reasonable amount of time. Since the mapping results may need to be created in nearly real time, a cap on the number of iterations is one possible way to ensure that the constraint solver comes up with a solution, even if it is not the optimal one. With a particle based constraint solver and a ranking function for determining the satisfaction level with a set of constraints, it can also be ensured that end result of the constraint solving ranks no lower than the input guess, simply by ensuring at each iteration that the result is no lower than the result of the previous iteration. Even with a limited number of iterations, the result is ensured to be as good as the input guess.

One advantage of the constraint solver is that particle systems are common in animation and modeling, and most of the implementation details for a particle system capable of enforcing most types of geometric constraints between points have been developed. Because ragdoll animation often uses physics-constrained particle systems, particle system implementations capable of running in real time already exist. Finally, since tracking data in its most basic form consists of a list of points and most constraints required are geometric and local, a particle system based implementation may be integrated. The constraint solver may reformulate points along the path as particles and relations between these points as constraints between the particles.

The following are exemplary (non-limiting) examples of constraints:

Length Constraint.

A Length Constraint can force two particles to be within some range of distance.

Fixed Point Constraint.

A Fixed Point Constraint can force a particle to remain at a fixed position.

Bounding Box Constraint.

A Bounding Box Constraint can force a particle to remain within an axis aligned rectangle.

Polygon Constraint.

A Polygon Constraint can force a particle to remain within an arbitrary polygon.

Angle Constraint.

An Angle Constraint can force three particles to remain at a fixed angle.

Segment at Fixed Slope Constraint.

A Segment at Fixed Slope Constraint can force particles along a line segment to lie at some fixed slope.

Segment on Known Corridor Constraint.

A Segment on Known Corridor Constraint can force particles along a segment to lie on a particular hallway Rigid Body Constraint.

A Rigid Body Constraint can force a group of particles to move as one.

According to an aspect of the invention, mapping application 130 may enable a user to create (or define), edit, and/or save a number of constraints via the GUI.

Resolving Constraints

According to an aspect of the invention, the Particle-System-Constraint Solver may implement resolution methods (whether user-defined, default, or otherwise) for resolving each constraint type. These methods may be used when constraints described above are found to be violated and need to be satisfied. Non-limiting examples of resolution constraints may include:

Length Constraint Resolver.

This resolution method may move the two particles equally towards or away from each other to restore the desired length.

Fixed Point Constraint Resolver.

This resolution method may move the particle to its fixed position.

Bounding Box Constraint Resolver.

This resolution method may move the particle to the nearest point along the bounding box.

Polygon Constraint Resolver.

This resolution method may move the particle to the nearest point along the polygon.

Angle Constraint Resolver.

This resolution method may rotate the two particles on the outside of the angle about the central particle to restore the desired angle.

Segment at Fixed Slope Constraint Resolver.

This resolution method may rotate the particles about their center of mass to restore the slope of the segment Segment on Known Corridor Constraint Resolver.

This resolution method may move all particles onto the nearest point along the corridor.

Rigid Body Constraint Resolver.

The rigid body constraint may be enforced using length constraints between each point, and angle constraints between each set of three particles. The rigid body constraint, therefore, may be resolved by resolving these length and angle constraints.

Several more constraints may be implemented depending on the desired functionality of the Constraint Solver. Additionally, the constraint solving methods may be tailored to the characteristic errors found in each type of tracking data.

Solve Orders

According to an aspect of the invention, the Particle-System-Constraint Solver may implement various solving orders. A first exemplary solving order may comprise looping through all of a set of constraints in a pre-determined order (e.g., in the order they were added), satisfying each one individually. Repeating this process may often lead to a valid solution, however, certain orderings of the constraints may cause the solver to ignore certain constraints. In this scheme, if two consecutive constraints are mutually exclusive, the second constraint will always be the one that is preserved. Randomizing the order of the list of constraints after each loop through the list of constraints may cure this problem. One implementation of the invention enables allows both randomized and non-randomized solving by this method.

An additional exemplary solving order may comprise always resolving the constraint that appears to lead to the greatest rating increase, and to only resolve constraints that actually do lead to rating increases. The rating increase implies that the rating/ranking described above indicates that the constraints are more satisfied in a current solution as compared to the previous solution. Basing ratings on how well the set of constraints is satisfied may force the solver to come up with a solution no worse (and generally at least somewhat better) than its input configuration.

K. Confining the Tracking Path within the Building Outline

In certain instances, the tracking path of a trackee may extend beyond a building outline. This may be due to accumulated or local scaling errors, or other errors. In some instances, the tracking path may be considerably outside the building outline. This may be due, for example, to inaccurately estimating the start point of indoor tracking (e.g., initializing indoor tracking from the wrong building exit), and/or initializing tracking with an incorrect initial heading for inertial tracking data. Similarly, location estimates appearing outside a building outline may be found for signal-based systems due to outliers. In the foregoing instances, before performing map-matching or map building, a tracking path may be forced to be restricted to the building outline. This may be achieved using the particle-constraint-solver described above. The tracking points can be given the constraints of being within the polygon described by the building outline, and given rigid body constraints. As the constraint solver iterates, the polygon restriction pushes the points inside the building, and the rigid body constraints correct the shape of the tracking path which may have been distorted by the method that pushes points into the building.

L. Navigation

Navigation may generally comprise the process of determining routes from one location to another. Navigation may be used in the map matching and map building methods (and other methods) disclosed herein to provide routes within a building. Navigation may be used, for example, to display search and rescue paths to get to a trackee when used by emergency personnel, to display paths to exits of the building, to find stairwells, etc. In certain instances, for example, when a tracking path has for some reason not been matched to hallways of a building, the route from the last matched point to the approximate current location may be found to determine the hallways that could have been traversed between the two locations. Well known algorithms such as the A* algorithm may be used for determining the route.

Typical route finding algorithms operate between nodes of a graph. Navigation can be challenging when a complete description (e.g., a complete CAD drawing) of a floor plans is not available. In such cases, the start and end points of hallway rectangles may be added as nodes and connected by an edge. Additionally, hallway intersections may be added as nodes and connected to the nodes of some or all intersecting hallways. Other features such as stairwells and elevators may be added as nodes, and unconnected nodes may be connected to the closest node to connect the graph. While determining tracking estimates for the tracking path, the tracking estimates may also be added as nodes connected to the previous and following tracking estimates. This enables route determination using locations that are not marked as features in the floor plan, but that have been traversed by trackees.

M. Determining Location Using Signature Mapping and Matching

According to an aspect of the invention, readings from various sensors may be included in the tracking data. Some sensors may have the same or similar readings every time a trackee visits a certain location. Storing and mapping these readings may enable a tracking point at a later time t2 with more accumulated error to be matched to the tracking estimate for a previous tracking point at time t1. Signature mapping over short-term path history may yield unique signatures in a building which may be matched with a high degree of reliability. Additionally, the signatures from independent sensors may be merged to form a comprehensive signature for a location or area in the building.

Magnetic Signature Mapping

Figure 20A:
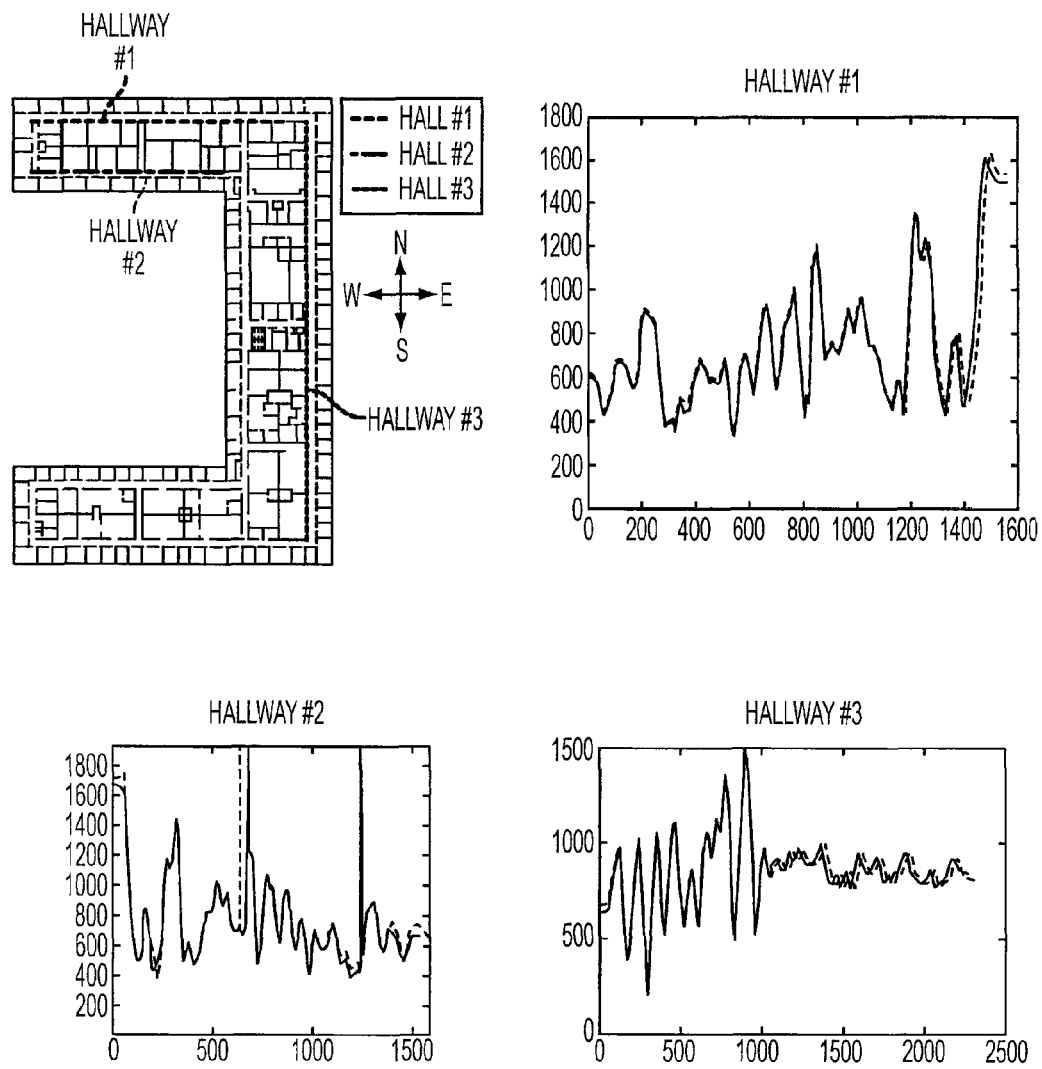
FIG. 20A is an exemplary depiction of unique magnetic signatures for three hallways in a building, according to an aspect of the invention.

According to an aspect of the invention, experiments may be performed in various buildings to show that each region in a building can yield a unique magnetic signature. FIG. 20A, for example, depicts unique magnetic signatures of three hallways in a building. Recording the magnetic signature for a region may help correct a trackee's position to this region when a signature match is detected.

Figure 20B:
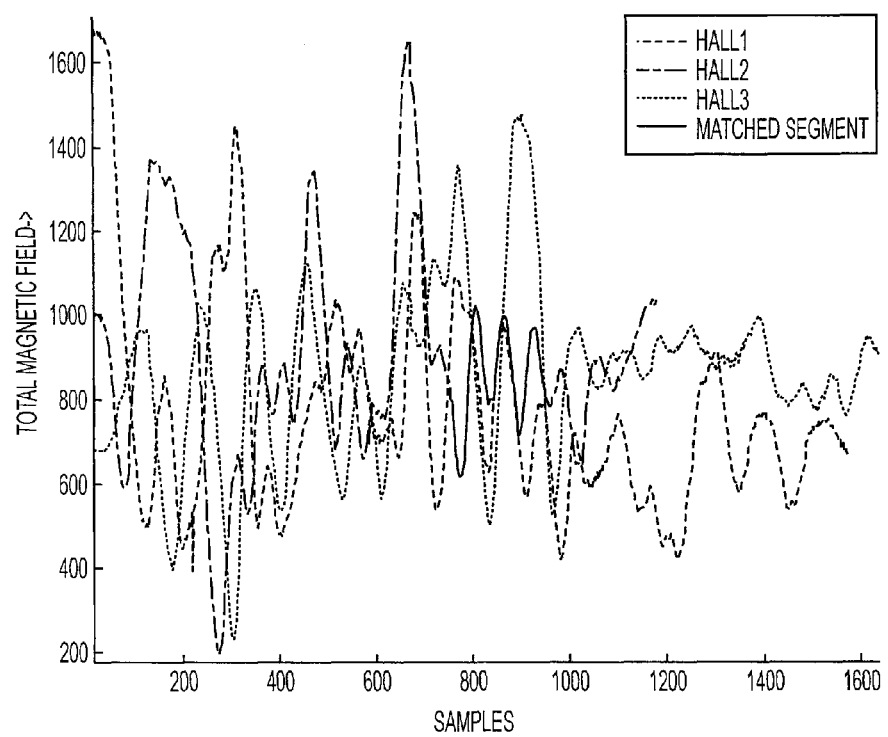
FIG. 20B is an illustrative example of results from one of a sequence of magnetic signature experiments, according to an aspect of the invention.

FIG. 20B is an illustrative example of results from one of a sequence of magnetic signature experiments conducted using data from an INU. Each hallway was found to display the same values of total magnetic field when the hallway was traversed at different times. These signatures were recorded for the 3 hallways as shown in FIG. 20B. A small segment was walked resulting in a magnetic path map which was tested against the data collected for the three hallways, and the segment was correctly identified in the part of the hallway it was recorded (as shown in the figure).

Magnetic signature matching may be used by, for example, the map-matching and/or map building methods. When mapping application 130 makes a correction to a hallway for the first time, or creates a new hallway, it may use magnetic data to create the magnetic signature map of the hallway. The INU report may contain data indicating total magnetic field, elevation and azimuth (as well as other data). These may be recorded in real-time against known location on the map for high reliability points. Each future correction to the hallway may be tested for consistency in the magnetic signature, and magnetic data for newly traversed regions may be continuously recorded. Once the signature is known and a future path from any trackee is close to a region whose signature has been mapped, a comparison may be made for a magnetic signature match to verify if the locations may be the same.

Figure 21:
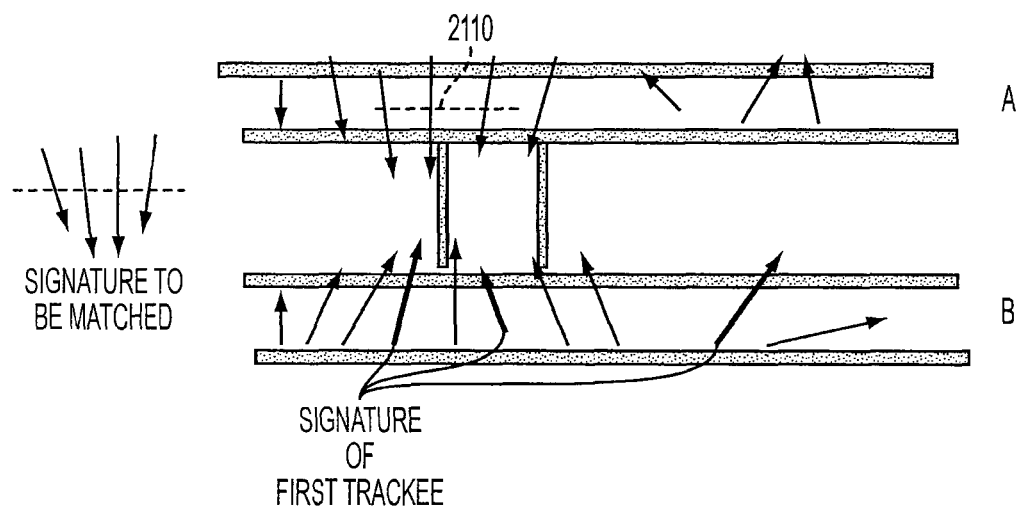
FIG. 21 is an exemplary illustration of a magnetic signature comparison, according to an aspect of the invention.

An illustrative example of this concept is shown in FIG. 21. Hallway B has a signature shown created by two trackees. The signature created by the first trackee is indicated on the figure. Hallway A has a signature created by a single trackee. Though the two hallways are close by (and parallel to one another), they may have distinguishably different signatures because a source of magnetic interference may be different (in each hallway) or the same source may create interference in different directions for these two hallways. If the map matching and/or map building methods finds a fourth trackee traversing between these two hallways and wants to figure out which hallway the trackee should be corrected to, it can compare the magnetic signature of the current segment and check it against the recorded signature of both of these hallways. As seen in the figure, the signature for the unmatched segment matches the dashed segment 2110 in Hallway A uniquely. In this case the ambiguity in hallway correction can be resolved using the signature matching.

Temperature Profile Matching

While calculating location information for each trackee in a building, mapping application 130 may also use temperature readings acquired from a tracking system (e.g., system 110a in FIG. 1) to create a temperature profile map. A floor plan or auto-generated map may be displayed (via the GUI) and shaded with a temperature color gradient to indicate what the ambient temperature of the region is like. This profile is expected to change over time especially in a fire. In addition to providing visual information about static and/or changing temperature conditions, the temperature mapping may also serve as an auxiliary signature mapping mechanism particularly in the short-term to determine whether a trackee's temperature may be correlated with the temperature profile of regions in the building.

Similar matching techniques may be used for other signature types such as RSSI signatures from reference points, pressure sensor data, and other sensor readings that may be similar at locations in a building. Signature matching can also be used to match features such as stairwells, and elevators, and different floors.

Additionally, signatures from multiple different sensors may be combined into a comprehensive signature and used to match locations.

N. Electronic Waypoint or Fixed Point Corrections

In one implementation, the absence of a global correction mechanism (such as GPS) indoors may be aided by location correction using fixed electronic waypoints in buildings. These waypoints may comprise an additional mechanism to perform high reliability corrections when installed in a building.

Fixed waypoint correction nodes at locations in a building programmed to transmit GPS latitude, longitude, and floor number (among other data) using short-range low power radios (or other devices) may provide mapping application 130 with fixed point corrections. These transceivers may either continuously transmit their location information if line powered or transmit location information only when they 'hear' another similar device come into range.

Tracking devices such as INU-CSM pairs may include proximity information regarding these fixed waypoints with a time-stamp in the tracking data. If these fixed nodes are densely spread out in the building, signatures from a set of fixed nodes may also be used to determine location.

Extending the Waypoint Correction to Node Cluster Corrections

In addition to correcting location to that of fixed nodes, devices with inter-device ranging information may include time-stamped proximity detection with other trackees in the tracking data. Both the fixed point corrections and node cluster corrections may be enforced by the mapping technology as constraints between points in the particle constraint system solver. Additionally, if reliabilities are generated for the tracking estimates, and two trackees reported to be at the same location appear at different locations, they may both be corrected to the location of the trackee with a higher reliability.

V. Indoor Tracking Methods

According to an aspect of the invention, indoor tracking methods may be utilized to take tracking data from one or more trackees and compute a more accurate tracking estimate for each trackee. Examples of indoor tracking methods enabled by mapping application 130 including, but not limited to, sensor fusion methods, map building methods, and map matching methods will now be explored.

A. Transition Methods

In one implementation, indoor tracking methods may be re-set each time a transition is made from outdoors to indoors. Hence, some or all indoor tracking methods may use various transition methods to detect that an outdoor-indoor transition has occurred, and may set a start point and initial heading to initialize indoor tracking Detecting Outdoor-Indoor Transitions Successfully detecting outdoor-indoor transitions may be important since tracking algorithms may need to be adjusted for indoor tracking Tests reveal that compasses can be inaccurate in buildings due to building infrastructure, electric lines in the walls, and magnetic interference from other objects in the building. For initialization, the gyro path may be rotated to the last known outdoor rotation, and tracking may be continued based on the gyro direction until compass accuracy can be verified.

In addition to switching to the gyro, the outdoor-indoor transition may be used to correct the path of a trackee closest to the exit in a building if building data is available and if the closest exit is within a predetermined allowable correction distance. Correcting only within allowable correction distances enables personnel and/or assets to be tracked while entering a building through unconventional entry points including, but not limited to, windows or unmarked exits. When building exit information is available, a trackee's indoor path may then be reset to the nearest exit point to the last outdoor tracking point for increased accuracy.

Manual Detection of Outdoor-Indoor Transitions

In an implementation of the system configured to track persons, a person outfitted with a tracking system (e.g., tracking system 100*a* in FIG. 1) may press (or otherwise activate) an indoor button (or other control) to indicate (e.g., via a transmission to computer 120, or via a tag appended to the tracking data and time-stamped for later processing) that an outdoor-indoor transition is occurring (or has occurred). This information may be used to obtain the exact (or nearly exact) transition point to be used in the following methods, as well as for comparison against automated outdoor-indoor detection algorithms (e.g., to detect the effectiveness and/or accuracy of automated algorithms).

Automatic Detection of Outdoor-Indoor Transitions

Changes and variance in one or more sensor values during the outdoor-indoor transitions may be quantified and combined to produce an accurate outdoor-indoor transition detector utilizing all relevant information in the tracking data.

Outdoor-Indoor Detection Signs

Various indicators (or signs) may be noted when a trackee outfitted with a tracking system moves from an outdoor location to an indoor location. For example, the GPS horizontal dilution of precision (HDOP) may increase, satellite strength may be drastically reduced, the number of satellites may decrease and, eventually, GPS may be unavailable, especially in larger buildings. In addition, the total magnetic field observed by magnetic field sensors (of the tracking system) may vary from that observed outdoors, and the magnetic field variance may increase. Further, an outdoor trajectory of a trackee may overlap a building location (when building maps are available). Received Signal Strength from outdoor reference points (or base stations) may decrease. Other detection signs of an outdoor-indoor transition may be noted. Additionally, a device comprising a short-range radio (e.g., zigbee) may be attached to the exits marking a reference point. Signal strengths of this reference point measured by a tracking system may be used to determine that a trackee has crossed the reference point and entered the building. Similar detection may be used while leaving the building.

Each of the foregoing observed phenomenon may be combined into an Outdoor/Indoor detection function in those instances when the appropriate sensors are included on a trackee's tracking system. In regular building traversal, there are a limited number of entry and exit points into and out of a building. These are referred to as the Exits of the building. For systems that track both outdoors and indoors, transition methods may be used to pinpoint the location of personnel and/or assets accurately when a transition from outdoors to indoors, or vice-versa, is detected. These methods may help remove the accumulated positional error in case of inertial systems, and local errors for signal based systems.

In one implementation, if all of the exits of a building are known and recorded in the building data, when an outdoor-to-indoor transition is detected, a trackee may be matched to the closest Exit. The closest exit, or closest point landmark to a current location estimate may be determined using the distance formula, where:

$$dist = \sqrt{(x_2-x_1)^2+(y_2+y_1)^2}; \text{ and}$$

where (x2, y2) and (x1, y1) are the two points whose relative distance is being determined.

The trackee's location estimate may then be made to be the same as the location of the closest exit.

Similarly, when an indoor to outdoor transition is detected, the same method may be used to find the closest exit, and to place the trackee outdoors. In instances where all of the exits of the building are not known, a predetermined threshold may be utilized to limit the maximum allowable exit correction distance. If the closest exit is within this predetermined threshold, the correction may be made. If the closest exit is not within this threshold, it may be assumed that the trackee is entering the building through some unmarked exit. This predetermined threshold may also account for events such as, for example, emergency personnel entering the building through windows etc. For indoors, the initial floor number may be set for the trackee depending on the floor location of the exit used to enter the building.

B. Sensor and Data Fusion Methods

According to an aspect of the invention, sensor and data fusion methods may produce tracking estimates by fusing tracking data from different tracking methods, and by applying some logical limitations of a building when building data is available.

An illustrative example of the Sensor and Data Fusion method will now be explained with reference back to FIG. 13. Particularly, an exemplary sensor and data fusion method may comprise breaking a path into segments using polygonal (rectangular) path segmentation. Tracking error analysis tools may then be used to determine error and correction bounds on the segments. Consecutive orthogonal grids or shapes may then be detected within the error bounds, and corrected to be orthogonal. If compass data is available, compass angles may be validated for each shape, and each shape can be corrected to the compass angle.

If the building outline is available, the building may be divided into partitions associated with expected headings. The outline of the building may then be used to constrain the tracking path within the building outline polygon. This processing operation may be achieved using the particle constraint solver discussed in detail above. The shapes may then be iterated through and tested for rotation corrections within their correction bounds to the building grids based on the partitions crossed by the shape. This results in a tracking estimate for the tracking data confined to the building and fused with compass and building data.

In an implementation wherein an inertial tracking path, a signal-based tracking path that uses reference points, and compass data and building data, are provided as inputs, the same steps may be performed to obtain building grid corrected shapes. For each segment in the inertial data, the corresponding time-correlated signal-based tracking points may be grouped. Using the width of the rectangular inertial segment, the outliers in the signal-based tracking points may be detected. The signal based shapes may then be formed to correspond to each inertial shape. The shapes may then be tested for a shape match allowing unmatchable segments in the shape. If a shape match is found, the inertial shape may be corrected to the matching points in the signal-based shape. This may be performed because the inertial shape is more accurate in the short-term, but the signal-based shape may be more globally accurate since it can be subject to outlier points and/or segments but not drift. The result of the sensor and data fusion methods may comprise a tracking estimate for a tracking system, or an input into map matching and/or map building.

C. Map-Matching Methods

According to an aspect of the invention, map matching methods may take advantage of the availability of (and knowledge provided by) the floor plans of a building. As described in detail above, the hallways of buildings may be represented as lines and/or rectangles. The longest stretches of tracking points in the tracking data may be tested for matches to these hallways, and corrected when matched.

Proximity Based Correction Methods

In one implementation of the invention, tracking data may be processed by iterating over points, or iterating over segments. These implementations may rely on proximity-based correction methods which navigate through the floor plan, finding corrections for groups of points, and/or segments based on proximity to local features. These implementations may be used for tracking data characterized by significant rotational errors where global methods such as shape alignment and matching are rendered less effective due to inaccuracies while detecting shapes. The following correction methods may be used for the on the fly corrections.

Landmark Correction Methods.

While traversing a building, there may be certain landmarks where a certain path and/or motion type is feasible. These path and motion types may be defined as Events, and checked for while analyzing the tracking data. If a given Event occurs, it may be matched to the corresponding landmarks in the building, and the path may be corrected if a match is found.

Straight Path (Hallway) Event.

A Straight Path or Hallway Event may be defined as detecting a long straight path in the tracking data. For indoor paths, there are limited areas in the building where such long straight paths are feasible. These include, for example, hallways, large rooms, and open spaces. If the long straight path occurs in a hallway, matching it to the correct hallway may reduce and/or eliminate both angular drift in inertial systems, and positional error in any tracking data. This may be accomplished using a Straight Path (Hallway) Correction. This correction may offset the tracking path to the matched hallway to reduce and/or eliminate positional error. It also aligns (rotates) the path to the matched direction on the hallway to reduce and/or eliminate angular drift. The Straight Path Event Detection may be tailored to the building data and to the following matching methods.

In one implementation, the straight path event may be detected from a HALL_FLAG incorporated into the tracking data from an inertial device. In this case, the inertial tracking device sets a flag, HALL_FLAG, high whenever it detects that it has been going straight without a turn for a predetermined threshold distance.

In another implementation, the Hallway Event may be detected by the mapping technology by computing "a line of best fit" for recent tracking points. The "line of best fit" is computed as previously discussed in the sections relating to Sequential Segmentation. If the maximum deviation of any tracking point is less than a threshold, and the length of the line is greater than a threshold, the Hallway Event may be triggered. This length threshold may be set to a minimum expected length of a hallway (e.g., 6 meters), and is referred to as MIN_HALLWAY_LENGTH_THRESH.

In one implementation, some or all of the tracking points may be grouped into Polygonal Path Segments (PPSs) as previously discussed in the sections relating to Sequential Segmentation, and the Hallway Event may be triggered whenever a rectangular polygon of length greater than a threshold is being processed. Since, while breaking the tracking points into PPSs, the maximum width of a rectangle is restricted to the hallway width with error bounds, the points are ensured to lie within the width of a hallway.

Alternatively, instead of preprocessing the points, a set of tracking points may be tested for lying in a PPS of a width less than the hallway width, and a length greater than the MIN_HALLWAY_LENGTH_THRESH. The hallway event may be greatly enhanced using tracking data that includes readings from sensors, such as sonar, that can measure distance between the trackee and obstructions such as walls. These can help the Hallway Event to distinguish between long paths in hallways, and long paths in rooms.

Straight Path (Hallway) Corrections.

In one implementation, once the Straight Path or Hallway Event is triggered, a determination may be made as to whether this event can be matched to an existing hallway in the floor plan, or be matched to a large room, or open space. The Hallway Corrections may be implemented using geometry of points and lines, by polygon matching, or a combination of methods.

In one implementation, the Hallway Event may triggered by the HALL_FLAG from an inertial tracking device (e.g., which may be part of tracking system 110a in FIG. 1). In this implementation, the inertial tracking device may also include a segment number for each tracking point, and Hallway Event may also be triggered if the distance between the tracking point currently being processed and the first tracking point in the segment (same segment number) is greater than a predetermined threshold. Additionally, the Hallway Event may also be triggered by the "line of best fit" analysis described above.

If the Hallway Event is triggered, mapping application 130 may attempt to calculate the correction of the current set of points that triggered the Hallway Flag to all the known hallways in the floor plan of the current floor using the building data. Each hallway may be traversed walking in two general directions—one in the direction of the slope of the hallway restricted to 180 degrees (slopemod180), and one in the opposite direction. The heading for the points being matched to the hallway may be determined from the average current direction of the tracking points when the Hallway Event is detected using the HALL_FLAG or a segment number from the inertial tracking device.

If a "line of best fit" method is used, the heading may be obtained as the slope of the line of best fit. For each hallway, the heading may be compared to the two possible traversal directions (180 degrees apart) for the hallway. This may be achieved by finding the angular difference between the current heading, and each traversal direction on the hallway. The hallway direction with the lower angular difference may be chosen as the matched direction and the angular difference may be noted as the Correction Rotation. The points may then be rotated by the Correction Rotation about the first point by applying a rotation matrix yielding a new set of points aligned to the hallway. The Correction Offset may then be calculated as the distance of the first point to the hallway line. The offset may then be added to all the points.

This rotation and offset may, however, correct some or all of the points out of the bounds of the hallway. Checks may then be made using the corrected points to determine whether the hallway should be considered for correction or not. If the first corrected point is out of bounds of the hallway line and a trackee is moving away from the hallway bounds, the hallway may be flagged as DO_NOT_CORRECT to indicate that it has been disqualified from being a potential match for the tracking points. If the first corrected point is out of bounds of the hallway line but within a predetermined threshold distance, and the points are headed towards the hallway, it may be considered as a potential match. The Correction Offset may be updated to the offset between the first point and the terminal point of the hallway line closest to the first point. If the first point is more than a threshold out of the hallway line, the hallway may be marked with the DO_NOT_CORRECT flag.

Once the corrections to all the hallways are determined, the lowest correction rotation, MIN_ROTATION, of all the corrections may be found. The correction within a threshold of MIN_ROTATION, and correction distance less than a threshold, MAX_CORRECTION_DISTANCE may be chosen as the matched hallway. If no hallway matches the criterion, the correction is not made.

In another implementation, the points that triggered the HALL_FLAG may first be checked for being in the proximity region of a hallway. As previously discussed, the proximity region may be obtained by inflating the rectangular region by an Inflation Size (Inflation Width, Inflation Length).

Room Event.

In one implementation, a Room Event may be triggered if the tracking data suggests that the trackee is traversing or has traversed a room in the building. The Room Event may be enhanced using tracking data which has readings from one or more sensors that can sense the approximate distance of obstructions. In the absence of additional sensors, the area of the room detected may vary with the area of the room covered by all the tracking data.

Rooms in a building are typically characterized by a polygon, often rectangular, with a (length:width) ratio less than that of regular hallways. In addition, most regular-sized rooms have one or two entry points, usually doors. These entry points create a restricted area or multiple restricted areas by which the room may be entered or exited. Accordingly, the typical traversal of a room results in a path that goes through an entry point, covers a certain area in the room, and then returns to the entry point used to enter the room previously, or to a new entry point, and then exits the covered area.

In addition, in buildings with hallways, most rooms are built along the hallway, resulting in a tracking path that transitions from the hallway, through an entry point into a room, traverses the room, and then exits through an entry point. Often the exit is made into the same or another hallway. In addition, since most rooms are constructed along the hallways, the entry point of a room often necessitates a turn to enter the room, often causing a general heading change between, for example, 45° and 135°. In one implementation, therefore, the Room Event may be defined as a series of tracking points (room tracking points) where the first room tracking point follows a tracking point matched to a certain hallway, and the last room tracking point is followed by a tracking point matched to the same hallway. Additionally, the minOBB of the room tracking points is calculated, and check may be made to ensure that the length and width of the box are greater than respective predetermined thresholds. As one non-limiting example, the thresholds may be 6 meters and 4 meters, respectively.

In one implementation, the Room Event may be triggered by a series of PPSs, wherein the first PPS follows a PPS matched to a hallway, the last PPS is followed by a PPS matched to the same hallway, and the minOBB for all the tracking points contained in the series of PPSs satisfies the restrictions in the first implementation.

Room Correction.

According to an aspect of the invention, if the location of each room is available with room entry point (e.g., door) locations, a method may attempt to match the Room Event and the Room tracking points to the closest room.

Shape Matching Methods.

In one implementation, the landmark correction methods may make corrections based on, for example, proximity and local path matching. The shape matching methods may perform path matching on a more global level, by matching paths over longer periods of time, and checking the feasibility of multiple corrections within the correction limits of the tracking data (e.g., two successive corrections may be feasible separately but not together). Unique shapes in the building may be matched quite quickly when a tracking path with a similar shape is encountered. Building shapes may be obtained by combining or taking the union of the building landmarks represented as polygons such as rectangles. Tracking shapes may be obtained by using the PPS segmentation method, and combining PPSs.

In one implementation, the approach of fitting combinations of PPSs into combinations of Proximity Regions may be utilized. This may be used for large buildings with hallways since the hallways provide the building connectivity. Shape matching may be attempted for the entire tracking path, a stretch of the tracking path, or for a collection of disconnected stretches of the path. The latter may be used particularly when a complete description of the building is not available. In one implementation, only PPSs above a predetermined threshold length may be selected. For each PPS, a list of hallways (feasible hallway list) that may contain the PPS is computed. This may be accomplished by determining whether the length of the PPS is less than the length of the Hallway proximity region.

Next, if reliable heading is available for any of the PPSs from sources such as the compass, the angular rotation of the reliable heading to each hallway in the feasible hallway list may be computed. This may result in two possible angular rotations representing both traversal headings on the hallway. If the angular rotations required to correct to the hallway are greater than a predetermined threshold, MAX_ROTATION_ANGLE, hallway may be removed from the PPS's feasible hallway list.

Next, for a list of PPSs selected to be matched to hallways, a combination of hallways, one of the feasible hallways for each PPS, is chosen to test a fit. The same hallway may be chosen for multiple PPSs. The hallway proximity regions may be united to form a single polygon that represents the hallways. The first PPS may then be corrected to the hallway selected for it. All of the following PPS's may be transformed by the transformation required for the correction.

Next, if all the points after the transformation lie within the united hallway polygon, the combination of hallways is a possible match. If not, the next combination of hallways may be tested. In the absence of reliable heading data, a PPS may be rotated to match both the hallway headings, and both solutions may be tested for feasibility. Since the PPS may be corrected to several starting locations on the hallway and still be contained in the hallway, several solutions within a threshold spacing are tested.

D. Map Building: Determining Location by Simultaneously Generating Building Maps Using Tracking Data, and Matching Tracking Data to the Generated Building Data.

As previously noted, matching the path of trackees to features in a building can greatly assist in improving the quality and accuracy of the tracking estimates. In cases where building data is unavailable, building landmarks may first be detected, and then created by combining the tracking data of one or more of the trackees.

Proximity Based Correction and Generation Methods

According to an aspect of the invention, tracking path data may be analyzed iterating over points and/or segments, and features may be matched-to, and/or generated based on proximity. Events can be detected, and matched to existing landmarks as in the disclosed map matching methods, or new landmarks may be created if they are not matched to any existing landmark. The location of each landmark may be refined over time using the tracking data of different trackees traversing the same landmark.

Generating Floor Plans of Buildings.

According to an aspect of the invention, floor plans of most buildings may be characterized by hallways and rooms, and areas to exit the floor plan such as stairwells, elevators, escalators, exits, etc. Accurately detecting and generating hallways and rooms from tracking data may provide an excellent representation of the floor plan of a building. As such, building features may be detected using the tracking path of one or more trackees. In addition, some tracking systems may produce sensor data, such as ultrasonic or laser ranging measurements. These ranging measurements may be used to estimate the position of obstructions such as walls, furniture, etc.

Detecting and Generating Hallways.

In several buildings, especially larger buildings, hallways often provide connectivity between different parts of buildings. A building's structure typically restricts the way a trackee traverses the building. In most buildings, long straight paths are highly likely to be in hallways since the only other usual places where they are possible is in very large rooms, or in open spaces. Also, rooms usually contain obstructions making it less probable for extremely straight paths to be contained in them. Hallways are created when there is a high probability that a tracking path is on a hallway. If future paths confirm the area is a large room or open space rather than a hallway, it may then be removed from the floor plan. For each group of points that could possibly be on a hallway, a determination may be made to see if any of the currently known hallways directly include it, or could include it if extended within predetermined threshold limits. If so, the hallway may be updated to include the new tracking points after correction to the hallway. If not, a new hallway may be created at a chosen orientation.

In one implementation, the tracking points may be grouped into Polygonal Path Segments (PPSs) as described above, and the Hallway Event may be triggered whenever a rectangular polygon of length greater than a threshold is being processed. Once the current PPS triggers the Hallway Event, the hallway may be tested for inclusion in any of the known hallways. This may be accomplished by first inflating the hallway rectangle by a threshold Inflation Size (Inflation Width, Inflation Length). The InflationWidth accounts for tracking inaccuracies, and the minimum allowed spacing between hallways on a floor plan, whereas the InflationLength accounts for the tracking path being in an undiscovered portion of one of the known hallways rather than a new hallway. In one exemplary, non-limiting implementation (using data from an inertial system), the Inflation Width may be 3 meters, and the Inflation Length may be 10 meters.

Next, for each Inflated Hallway, a determination may be made to as to whether any of the tracking points in the hallway segment lie within the Inflated Hallway rectangle. If an affirmative determination is made, the hallway may be noted as a possible match. The Correction Rotation for the match may be computed as the angular difference between the heading of the hallway segment and the matched hallway direction. The Correction Distance for an inertial system is noted as the distance of the first tracking point of the hallway segment from the hallway line segment. If multiple possible hallway matches are found, the one with the lowest Correction Rotation may be chosen. If there are multiple matches with the same Correction Rotation, the one with the smallest Correction Distance may be chosen. If there are no possible matches, or the Correction Rotation for all the matches is greater than a threshold, MAX_HALLWAY_ROTATION, the hallway may be assumed to be a new hallway, and needs to be created. In one exemplary, non-limiting implementation, MAX_HALLWAY_ROTATION may be defined as 20°, though other values may be used.

Additionally, in one implementation, the tracking points may be preprocessed and grouped into PPSs. The hallway may then be created by inflating the rectangle of the PPS that triggered the hallway event, to the typical hallway width, HALLWAY_WIDTH. A typical hallway width may, for example, be defined as 3 meters (approximately 10 feet), or as any other pre-determined width. This width can later be modified by future detections. The required Inflation Size required to achieve this has an InflationWidth of the difference between the width of the PPS minOBB, and HALLWAY_WIDTH, and an InflationLength of 0. Once the hallway shape is created, the closest grid angle to the current slope of the new hallway may be determined. If a grid angle is found within a threshold angle difference, MAX_ROTATION_ANGLE2GRID, the new hallway may be rotated to the grid direction about the first tracking point in the hallway segment. If no grid angle is within this correction angle, the hallway may be left unaltered and the slope of the new hallway may be added to the list of Grid Angles. In one exemplary, non-limiting implementation, MAX_ROTATION_ANGLE2GRID may be defined as 20°, though other values may be used.

Breaking or Merging Hallways.

In one implementation, while matching the detected hallway segments to existing hallways, the inflation check may be restricted to Inflation Size. This is due, for example, to the fact that several buildings have separated hallways that are lined up with one another, but not continuous, similar to line segments on a line. Therefore, if the same hallway is detected by tracking path segments separated by more than Inflation Length, they may be detected as separate hallways. In addition, though unlikely, if trackees traverse a large room in straight trajectories with different headings, this may result in multiple hallways being formed. These conditions introduce the need for breaking and merging hallways.

Detecting and Generating Rooms.

According to an aspect of the invention, rooms can be detected using the Room Event. When the Room Event is triggered by a series of tracking points originating from a matched hallway and returning to the same hallway, the Room Tracking Points may be first rotated clockwise around the first point by the slope of the hallway they are along. The minBB for the Room Tracking Points may then be calculated, and then the minBB may be rotated about the first point counter-clockwise by the slope of the hallway. If the minBB calculated for the points does not touch the hallway rectangle, it may be extended to do so. This can be accomplished by determining the point of intersection of the Room Edges perpendicular to the hallway and the hallway edge closer to the room.

Next, a check may be made for any other rooms detected along the same hallway, on the same side of the hallway. If any of the other hallway rooms have their outer edge further than the one minBB created, the furthest edge may be extended to be at the same distance away from the hallway as the room with the furthest edge. Additionally, if the Building outline data is available, a determination may be made as to whether the closest edge of the Building is within the width of a hallway of the outer edge of the detected room. If true, it may be assumed that no other landmark can fit between the Building edge and this detected room, and the outer edge of the detected room may be extended to the Building edge. When one room is extended, the other rooms along the same hallway, on the same side, can also be expanded.

E. Map Building Augmented with Shape Geometry

In one implementation, proximity based matching may be augmented with the detection of large shapes in a tracking path that may be aligned to shapes in the tracking path of other trackees, and/or the generated building floor plans. Inertial tracking methods may become more inaccurate over time due to accumulated errors. The formulation of map building as a geometry problem by comparing shapes can counter this shortcoming. In most tracking scenarios, a larger area of the building is traversed (e.g., discovered) by each trackee, increasing the correlations in the shapes in their tracking paths. This may increase the accuracy of the map generated and the corresponding tracking estimates with time and extent of building discovery.

Figure 22:
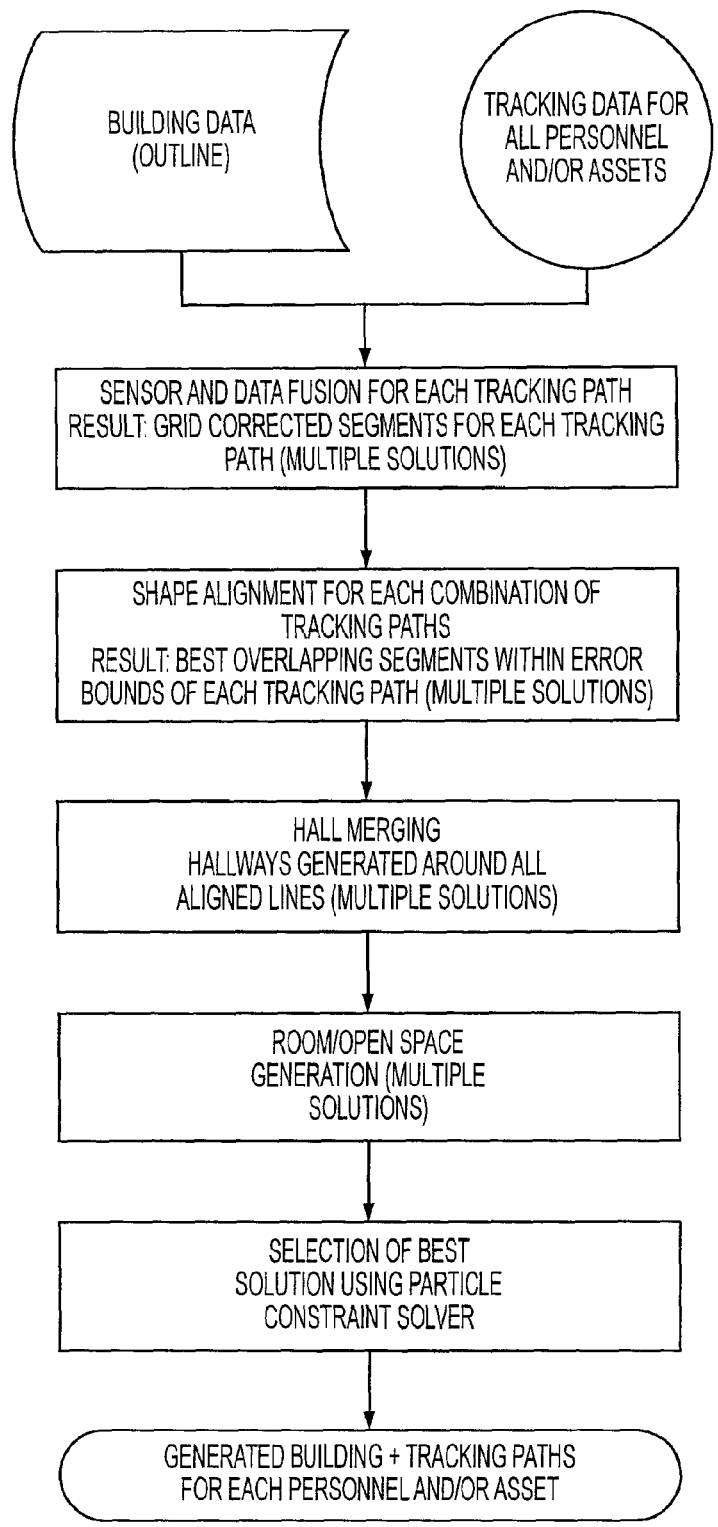
FIG. 22 is an exemplary illustration of a flowchart of processing operations for a map building method augmented with shape geometry and parallel solution computation, according to an aspect of the invention.

FIG. 22 is an illustrative example of a flowchart of processing operations for a map building method augmented with shape geometry and parallel solution computation. The various processing operations depicted in FIG. 22 may be accomplished using some or all of the system components described in detail above and, in some implementations, various operations may be performed in different sequences. In other implementations, additional operations may be performed along with some or all of the operations shown in FIG. 22. In yet other implementations, one or more operations may be performed simultaneously. Accordingly, the operations as illustrated (and described in greater detail below) are exemplary in nature and, as such, should not be viewed as limiting.

According to an aspect of the invention, parallel solutions may be utilized by mapping application 130 when it is difficult to make a choice between multiple competing tracking estimates in a particular step in the method. For example, in the sensor and data fusion method used in map building, when a shape that is not aligned to the building grid is processed, the building grid correction method may propagate two solutions, one with the shape corrected to the grid angle, and another without. This may be used especially when two choices are close in rotational, scaling and/or translation corrections required between the two choices.

As illustrated in FIG. 22, the grid corrected segments may be generated by the sensor and data fusion method for each trackee. This may result in multiple grid corrected segments for each trackee.

Next, for each combination of grid corrected paths for some or all trackees, the shape alignment tool may be utilized to find the greatest overlap within the error bounds of each line in the shape of the grid corrected segments. This shape may be obtained by grouping all the segments above a threshold length that lie along the building grids.

Following the alignment of the shapes, each set of lines detected to overlap within their error bounds may be tested for their separation in width. If the width is larger than a maximum estimated width of a hallway, a hallway of average hallway width may be created along the center of these lines, and the lines lying outside the hallway can be corrected to lie within the generated hallway. Hallways bounding the lines may be created for other sets of lines whose separation width is less than the maximum estimate width of a hallway.

If a single hallway has been generated for lines with an undiscovered gap of more than a predetermined threshold, the hallway may be broken into two separate hallways to account for aligned hallways in buildings that are not connected. These hallways may be merged into a single hallway when more area in between them is traversed in successive time steps.

After a hallway detection and generation, areas lying along the hallways may be scanned for overlapping segments that may be bounded in a box with restrictions as discussed with regard to the proximity-based map building method.

The particle constraint solver, and the constraints violated by each solution may be compared to choose the best solution. Alternatively, after each step (or processing operation) in the method, the constraints violated by each solution may be checked if multiple solutions are propagated. Solutions that violate certain constraints by more than a predetermined threshold may be removed from the solution set being propagated to the next step.

F. Determining the Elevation of a Trackee Inside of a Building

Determining the elevation of a trackee inside of a building results in a 3D position estimate. Elevation may be determined as a measure of feet, meters, or other units above a ground level. However, it may be more intuitive to view and report elevation estimates in indoor environments as a floor number when feasible. Though determining a floor number can be more challenging than determining absolute height, it represents a trackee's 3D location in a more interpretable format. Almost all buildings that allow elevation change are comprised of multiple floors, and/or other logical levels joined by landmarks including, for example, stairwells, elevators, and escalators. The motion recognized on stairwells, elevators, and escalators may also be used to help track the floor changes and the elevation. Additionally, for emergency personnel, or in other extreme situations, ladders, free-fall, and/or climbing may account for elevation and/or floor change.

Mapping application 130 may detect elevation changes in parallel to the map matching and map building methods. The change in elevation may be tracked by first detecting events that trigger elevation such as change in the reported number of stairs encountered by the trackee in the tracking data and/or change in the elevation height reported in the tracking data. The elevation change type (stairs, elevators, etc.) may be resolved by the trackee's tracking system and included in the tracking data. Alternatively, various elevation change triggers (number of stairs, elevation height, etc.) may be correlated with the other tracking data such as an (x, y) estimate to resolve the elevation change type. Once the elevation change type is determined, the event may be compared to features for elevation type, matched in case of map matching and map building where a feature exists in correction distance, and created otherwise. A floor number may be resolved using the elevation change if feasible. The following characteristics of elevation change type may be used to help resolve elevation changes.

Stairwell Characteristics.

Almost all buildings have flights of stairwells connecting different floors. In most buildings that are not high-rises, stairwells are the primary means of changing floors. A stairwell may be connected to each floor in the building, or connect only a subset of floors. The number of stairs between two consecutive floors in a building is often similar (e.g., within a couple of stairs), especially for the same stairwell. However, the number of stairs between the $1^{st}$ floor and the $2^{nd}$ floor is often found to be different due to the tendency of $1^{st}$ floors in many buildings to have a higher ceiling than the other floors. In these instances, the number of stairs between the $1^{st}$ floor and $2^{nd}$ floor is greater than the number of stairs between other consecutive floors. Smaller apartment homes often have small landings between floors with, as an example, approximately 7 stairs to get to the first floor, approximately 13-14 stairs to get to the next floor, and so on. Larger buildings have been surveyed to often have 12 stairs (or multiples of 12 stairs) between landings, and often approximately 24 stairs between each floor. Twenty-four stairs, with an average riser height of approximately 6.5-7 inches, corresponds to an average floor height of approximately 12-14 feet.

Stairwells are also often characterized by intermediate landings which divide the stairs between floors into groups. The number of landings between the floors is often the same, with exceptions common between $1^{st}$ and $2^{nd}$ floors, and basements and $1^{st}$ floors. This makes keeping track of landings useful for determining floors. Landings often result in walking straight up a flight of stairs, reaching a landing, and then either continuing straight up the stairs to the next floor, or turning at the landing and going up the flight in a heading different from the heading before the landing. This may be referred to as the WINDING of the stairwell. Most stairwells wind in the same direction from one floor to another. For convention WINDINGs may be defined as seen going upstairs. With this convention, WINDINGS may be categorized, for example, as: (1) none; (2) clockwise-looking up; (3) counter-clockwise-looking up; or (4) both. Other categories may be defined/used.

"None" may represent straight stairwells that do not turn at the landings (e.g., as often found in lobbies).

"Clockwise-looking up" implies that while going upstairs, turns are made either on the stairwell, or at the landings to the right.

"Counter-clockwise-looking up" implies that while going upstairs turns are made either on the stairwell, or at the landings to the left.

"Both" is a less occurring scenario comprising, for example, stairwells that go straight up to a landing connected to two different flights of stairs to go further up—one to the left and one to the right—where traversal up may be achieved by winding clockwise or counter-clockwise. For the two cases of unique WINDING looking up, it is implied that while going downstairs, the trackee must turn in the opposite direction to that needed to go up.

Detecting the Elevation Change Event and its Type

A Stairwell Event may be detected by a trigger associated with stairwell data in the tracking data. If a stair count is included in the tracking data (e.g., a number that increases for every up-stair encountered, and decreases for every down-stair), a change in the count of stairs may trigger the Stairwell Event check. In instances where only elevation height is reported in the tracking data, the change in elevation may be used as the trigger, and may be combined with other tracking data to determine if the change was made on a stairwell.

In one implementation of the invention, it may be assumed that both stair count data, and/or elevation height data may contain inaccuracies. In this case, when the elevation change trigger (e.g., stair count or elevation height) changes, a bounding box may be spawned from each point where elevation height and/or stair count changes by more than respective thresholds.

Tracking points may be bounded in a minimum oriented bounding box until the box reaches a certain threshold size and the elevation change trigger stops changing. This ensures that the event is not resolved when the trackee has stopped on the stairs. When the box is larger than a threshold size and the trigger stops changing, it may be assumed that the trackee has exited the elevation change area (e.g., stairwell or elevator). If the elevation change area is smaller than a threshold size and the change in height is large enough to be a floor change, it may be assumed that the change was in an elevator. Also if the trackee's 2D tracking path is not changing while elevation changes, it may be assumed the change was in an elevator.

Resolving Floor Changes for Elevation Change Event

Trackees may use stairwells or elevators (or escalators) to change elevation by a single floor, by several floors. Trackees may also go up or down a few stairs and then return to the same floor. The method used to track the floor changes may be selected depending on the elevation data type in the tracking data.

According to an aspect of the invention, a floor change may be determined if the elevation change is above a given threshold. Building regulations impose restrictions on the minimum height of a floor. A building type can be useful to know for resolving the floor number when there is a multiple floor change. High-rises, for example, often have 15 stairs in between each floor, whereas some large buildings often have approximately 24 stairs between each floor. Buildings such as hospitals and hotels have very high ceilings on the first floor and the second floor may be much higher than the average floor height. Mapping application 130 may map out the approximate height of each logical level encountered, and use the building type to resolve the floor number. Additionally, if real-time feedback is available (e.g., at an incident command station during an emergency incident or other situation) the floor number of certain trackees may be input into the system, and the floor numbers of other trackees may be set and/or corrected based on the input.

Winding of stairwells may also be used to determine the floor number of the trackee. For example, if a trackee winds 180 degrees and walks out of the stairwell area, it may be assumed that most floor transitions in the building are 180 degrees apart. The total degrees wound between floors with the change in number of stairs may be used to decide the number of floors that have been traversed.

Floor Change Correction

In one implementation, an elevation change may be used to correct the location of the trackee to a landmark. In map matching where location of stairwells and elevators may be known, upon an elevation change, a trackee may be offset to the nearest stairwell or elevator depending on the elevation change type. In map-building, if a trackee is within a correction distance of a previously discovered stairwell or elevator, a correction may be made, otherwise a new stairwell or elevator may be generated. If the transition leads the trackee to a new floor, all undiscovered floors between the start floor and the new floor may be added with stairwells or elevators at the same 2D location.

VI. Outdoor Tracking Methods

According to an aspect of the invention, when tracking personnel and/or assets outdoors, it may be useful to utilize GPS data along with inertial tracking data.

A. Inertial-GPS Fusion Algorithm (IGX Algorithm)

In one implementation, an inertial-GPS fusion algorithm (referred to herein as the "IGX Algorithm") may fuse separate inertial and GPS data for a tracking path into a single path estimate. Since accurate GPS data is, for the most part, generally only available outdoors, the IGX Algorithm primarily functions as an outdoor algorithm, although it can continue tracking outdoors or indoors in the absence of GPS.

Various advantages achieved through the implementation of the IGX Algorithm may include, but are not limited to, for example: generating a single location estimate obtained by the fusion of inertial and GPS tracking estimates; enabling functioning without a compass; the detection of erroneous GPS measurements whose quality indicators may indicate that they are "good" or acceptable; eliminating GPS data that looks correct but is not (e.g., a straight sequence of GPS data in a wrong location when a trackee is heading straight); recovering from inertial drift when GPS data becomes available after a long outage; keeping a trackee's position out of a displayed building outline when the trackee is outdoors; following (correcting to) sporadic but good GPS data; and continuing tracking a trackee indoors without any mapping, and detecting that a trackee's path has transitioned indoors. GPS location estimate errors may range up to tens of meters in some cases. The term "good," as used above, may therefore be used to refer to GPS location estimates within a predetermined distance accuracy (e.g., within 3 meters).

Examples of IGX Algorithm tools enabled by mapping application 130 may include, but are not limited to, one or more of inertial track segmentation using polygons (e.g., rectangles), shape matching, corrections to polygons (rectangles), and a particle system-based constraint solver.

Figure 23:
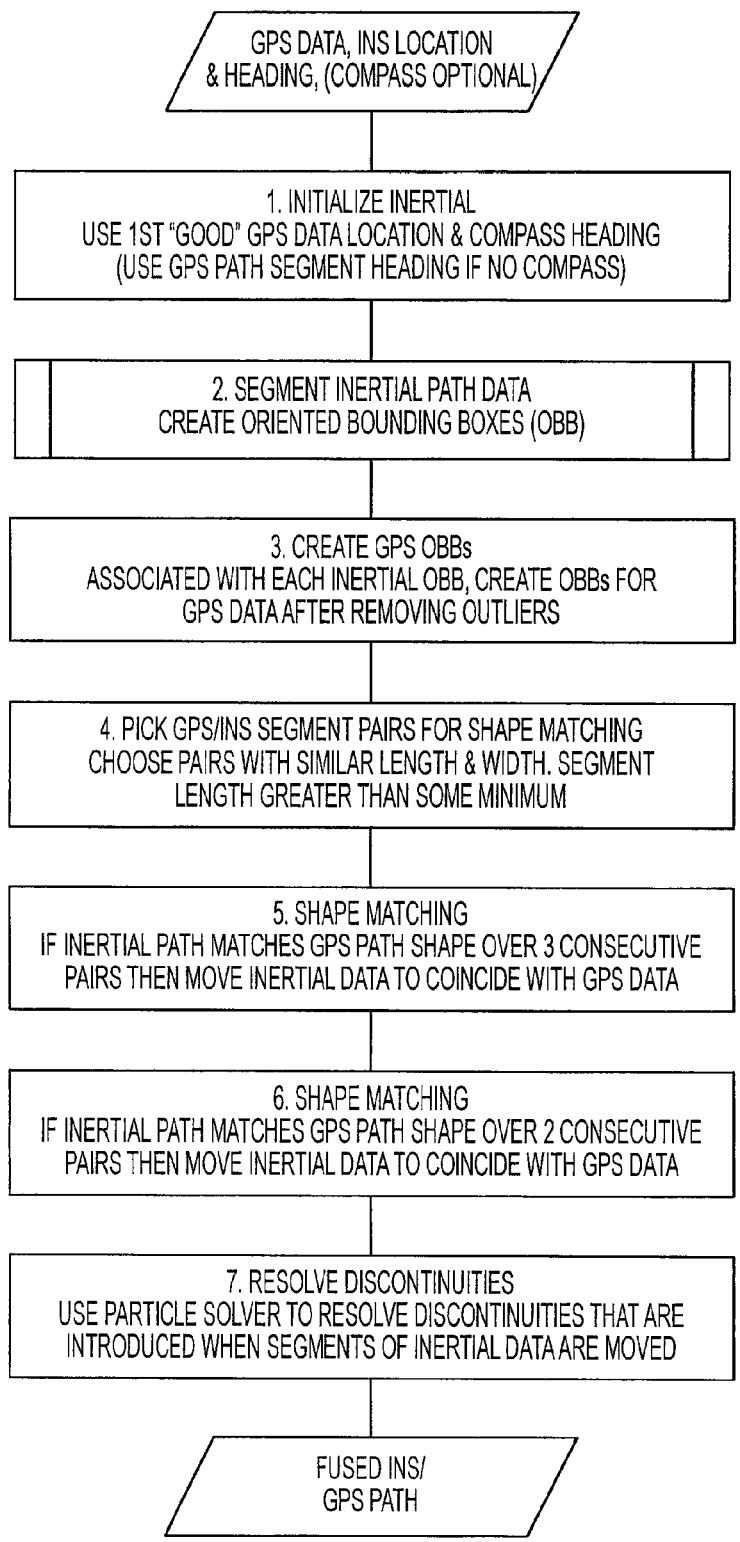
FIG. 23 is an exemplary illustration of various processing operations of an algorithm that fuses inertial and GPS data for a tracking path into a single path estimate, according to an aspect of the invention.

FIG. 23 is an exemplary illustration of processing operations of the IGX Algorithm, according to one implementation of the invention. The various processing operations depicted in FIG. 23 may be accomplished using some or all of the system components described in detail above and, in some implementations, various operations may be performed in different sequences. In other implementations, additional operations may be performed along with some or all of the operations shown in FIG. 23. In yet other implementations, one or more operations may be performed simultaneously. Accordingly, the operations as illustrated (and described in greater detail below) are exemplary in nature and, as such, should not be viewed as limiting.

Inputs to the IGX Algorithm

According to an aspect of the invention, the IGX Algorithm utilizes as input, for example, an inertial 2D location estimate in meters (or other units) along with simultaneously collected and time-synchronized GPS data. Optionally, GPS indicators (e.g., Satellite Geometry (HDOP, PDOP, etc., number of Satellites, Satellite signal strength, and azimut), compass angle from an inertial tracking unit, and gyro angle, and building outlines (such as from GIS layers) may be utilized.

In one implementation, the IGX Algorithm takes as input an inertial tracking path (e.g., series of INU data points) and GPS data sampled at a lower rate. This may imply that only some of these INU data points have an associated GPS location which is reported at the same time. The GPS locations may be represented as meter offsets from a fixed point.

Figure 24:
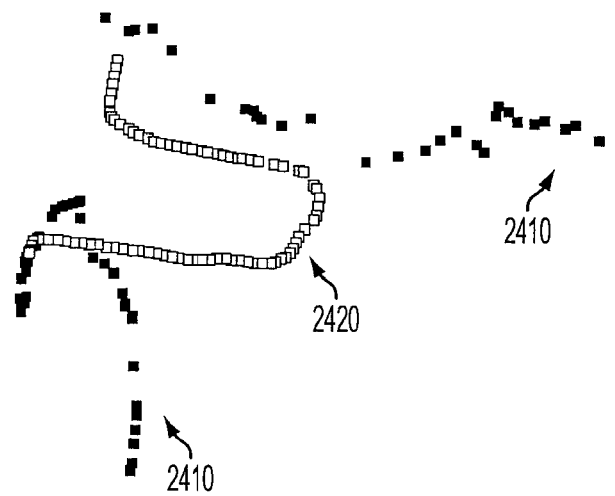
FIG. 24 is an illustration of an example of bad GPS input with good inertial path input, according to an aspect of the invention.

FIG. 24 is an illustration of an example of bad GPS input 2410 with good inertial path input 2420.

Figure 25:
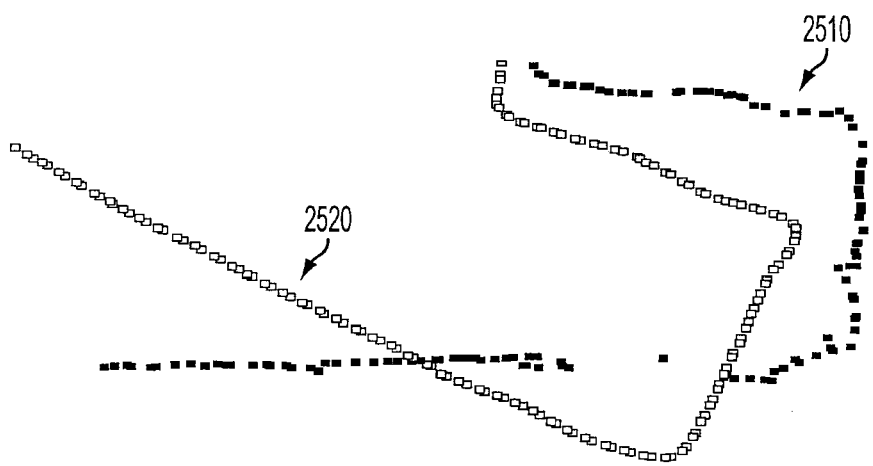
FIG. 25 is an exemplary illustration of "good" GPS data in the same path while inertial path data has drifted away, according to an aspect of the invention.

FIG. 25 is an exemplary illustration of "good" GPS data 2510 in the same path while inertial path data 2520 has drifted away. It may be observed that the inertial and GPS paths match in shape. Stretches of GPS data in cases similar to 2510 can be termed "good" when the accuracy of GPS location estimates stabilize to within an average distance accuracy (e.g., within 3 meters). GPS may be deemed "good" in certain instances even if there are outliers since the mapping technology is capable of matching the general shape of paths rather than being dependant on each individual point.

Initialization

In one implementation, when the first INU data with GPS is reported, the inertial path may be offset to the first GPS point (which is assumed to be good if GPS quality indicators are good). Alternatively, the inertial path may be initialized to a manual start point or other point such as, for example, a location of an emergency vehicle (e.g., truck) at an emergency scene for emergency personnel (e.g., firefighters). If compass and gyro data are available, the inertial path may be rotated by an initial rotation equal to the angle difference between a first good compass value and a first gyro value. In the absence of compass and gyro data, the paths cannot be fused before a segment of at least a few meters in length is available with good GPS, and the fused estimate is the GPS reported.

Inertial Path Segmentation

Figure 26:
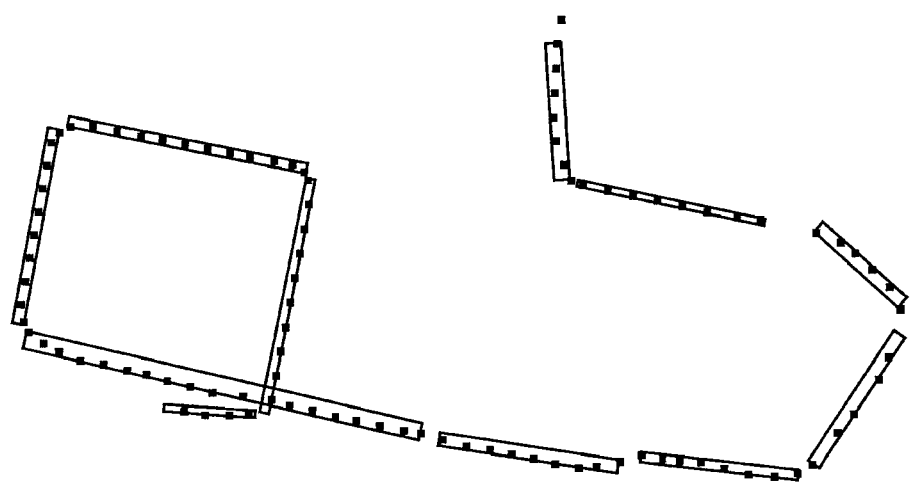
FIG. 26 depicts an exemplary segmentation of an inertial path, according to an aspect of the invention.

Next, the inertial path may be broken into segments using Polygonal Path Segmentation (which has been described in detail above). FIG. 26 depicts an exemplary segmentation of an inertial path.

GPS for Inertial Segments

For each inertial segment, a corresponding GPS segment may be created by including the GPS data that was collected during the same time interval as the inertial data for that segment.

In addition, outliers may be removed. For example, if the distance between two consecutive GPS points is greater than a threshold times (e.g., 3×) the inertial distance, both of the outliers may be removed. Indicators such as HDOP, number of satellites, and satellites strengths may be used to determine if a GPS point may be ignored.

Following outlier removal, a minimum oriented bounding box (minOBB) (which as been described in detail above) may be calculated for the remaining GPS points. This may result in a sequence of inertial segments and a sequence of corresponding GPS segments. These segments may comprise polygonal path segments in that they include a group of points, and the minOBB of the points.

Figure 27:
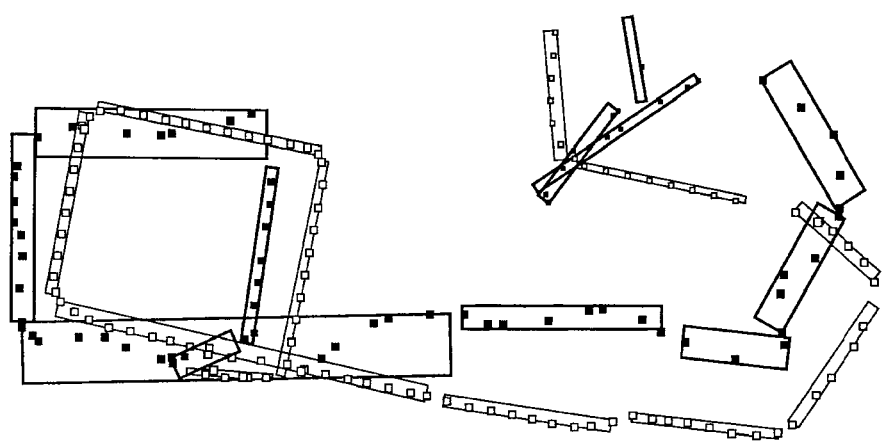
FIG. 27 is an exemplary depiction of GPS segments associated with each inertial segment from FIG. 26, according to an aspect of the invention.

FIG. 27 is an exemplary depiction of GPS Segments associated with each Inertial Segment from FIG. 26.

Choosing Matching GPS/Inertial Segments Pairs

In one implementation, a list may be generated of the longer GPS/INS segment pairs where GPS and INS match in length, and the GPS heading is close to the compass heading.

As an initial step, in one implementation, only GPS/INS pairs may be selected where the INS segment matches (in length) the corresponding GPS segments. The INS segments must be greater than a LENGTH_THRESH, and within a WIDTH_THRESH which is half the maximum width the inertial segments are confined to. The WIDTH_THRESH may be relaxed for longer segments to a percent of the length of the segment (e.g., 20%). Considering only this level of matching, however, may be insufficient.

Next, a confirmation may be made that the GPS segment heading is close to the compass heading. If not, the GPS/INS segment pair may be removed from the list. On each segment, good compass data may also be considered. If there is no good compass data, GPS heading and location may be accepted as correct. The compass data may be confirmed to be good/reliable, for example, by considering the variance of the compass heading versus the gyro heading over the segment, the magnitude and inclination of the compass data, etc.

Figure 28:
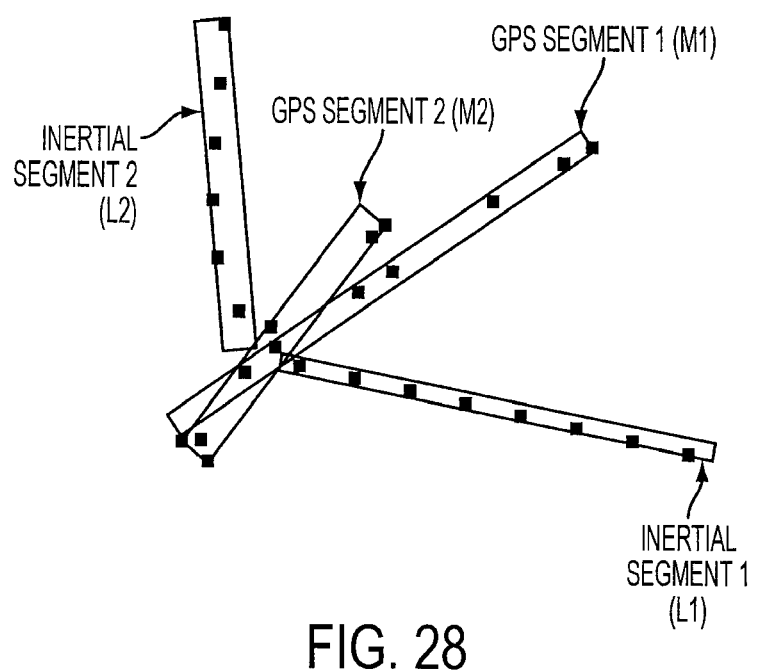
FIG. 28 is an exemplary depiction of GPS segments matching up with corresponding inertial segments in length and width, but with no match in shape, according to an aspect of the invention.

GPS data can sometimes be misleading in the shadow of buildings, with GPS location estimates being offset from the true location depending on the satellites chosen for the fix as shown in FIG. 28. Particularly, as depicted, two GPS segments match up extremely well with their corresponding inertial segments in length and width, but do not match in shape.

Shape Matching

According to an aspect of the invention, shape matching may be used to determine which GPS segments are really accurate.

Thus far, a list of GPS/INS segment pair have been created. These are the longer segments that match up individually in size and/or compass heading. Each segment may then be checked for a two-segment shape match by comparing the previous and current inertial segments to the previous and current GPS segments, and similarly a two segment shape match is checked with the current and following segment. If either of the previous or following segments match in the two-segment shape matching check, the current segment may be chosen for correction. The inertial shape may be translated and rotated as the shape match is checked.

Two-segment shape matching may be performed by first performing individual segment comparisons. Herein, the term "shape" may be used to refer to a group of segments (e.g., the two segments chosen in the inertial path). As shown in FIG. 28, the two segments in the first shape (inertial shape) are referred to as L1, L2, and the two segments in the second shape are referred to as M1, M2 (GPS). The shape matching method may use the rectangle line of each segment for its operations. The rectangle line, as discussed previously, may be defined as the line segment connecting the midpoints of the shorter edges of a rectangle. The lines of L1, L2, M1, M2 are referred to herein as lineL1, lineL2, lineM1, and lineM2 respectively. lineL1 may be first corrected (e.g., rotated and translated) to the center of lineM1. lineL2 may be adjusted by the same transformation. The acute angle to align lineL2 to lineM2 may be computed, and the transformation is made to lineL2. After transformation, the distance of the end points of lineL2 to the corresponding end points of lineM2 may be calculated. The decision of whether the shapes match may be computed by determining whether the individual lengths (lengths of lineL1, and lineL2) are within a PERCENT_THRESH of the length of the base shape lines (lineM1, and lineM2), the second rotation within an ANGLE_THRESH, and the distances of the end points for the second segment are again within PERCENT_THRESH of the length of lineM2. PERCENT_THRESH of 30% and ANGLE_THRESH of 20 degrees are used in one implementation of the invention, although other thresholds may be utilized. As seen in FIG. 28, L1 and L2 can match M1 and M2 respectively, in single length checks. However when compared using the above two segment shape match, the second rotation needed is approximately 70 degrees, resulting in no shape match.

Correction to Chosen GPS Segments

Figure 29:
FIG. 29 is an exemplary illustration of a fused path, according to an aspect of the invention.

In one implementation, the chosen segment pairs (inertial segment and GPS segment) may then be used to perform corrections. The inertial segment of a chosen segment pair may be translated, rotated, and scaled to fit in the GPS segment. This does not fix points to one another, but ensures that the inertial segment goes through the region (fits) of good GPS points. FIG. 29 is an exemplary illustration of a fused path after corrections (depicted by the lighter-colored squares), GPS (depicted by the darker colored squares), and discontinuity 2910.

Restoring Inertial Shape Using Particle Solver.

The corrections made may introduce discontinuities in the fused tracking path. These discontinuities may be removed by using a particle system based constraint solver (such as that described in detail above). The particle solver is provided with the fused tracking path, with fixed segments wherever corrections to GPS have been made, and constraints from the inertial segments (relative distance, relative angles) which may have been violated by the corrections. The constraints are made between consecutive segments using the two points that are closer to one another, providing a distance constraint, and an angle constraint. The particle solver in each iteration attempts to satisfy constraints that are violated resulting in a path that resembles the input shape without the discontinuities.

The output of the IGX Algorithm may comprise a fused GPS/INS path.

B. Using Building Data to Navigate Outdoors

In instances wherein an outdoor to indoor transition has not been detected (a trackee is known to be outdoors), the IGX Algorithm may use building data, when available, to further improve the outdoor tracking estimate. Outdoors, for example, a tracking estimate may be assumed to not cross a building outline and into a building polygon. When building outlines from sources such as GIS databases for the area are available, the list of all polygons in the area may be queried to obtain the set of polygons in the tracking area. In addition to restoring the inertial shape, the particle solver (or other method) may be provided with the constraint to push segments out of the building polygons. Solving this constraint last may enhance the tracking estimate by ensuring that outdoor paths do not appear to be indoors, and can override corrections that have been made due to GPS data close to buildings being erroneous (e.g., passing through buildings). Additionally, the method may associate GPS quality with locations of the outdoor map. Areas close to buildings where GPS data is found to be erroneous may be marked so as not to be used in the fusion method.

C. Using Detailed Signal Strength Data from Satellites

Analyzing Satellite Signal Strengths

In addition to analyzing the GPS and INU paths using mapping techniques, signal strengths from individual satellites may be analyzed and mapped to determine whether or not a GPS prediction is accurate. The analysis may also be used to interpret on which side of a building a trackee may be located, especially in areas close to building edges that obstruct satellite view.

Figure 30A:
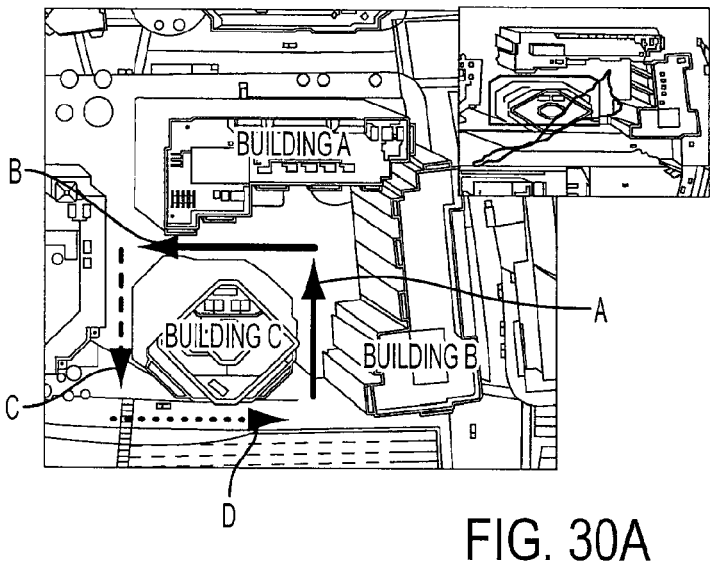
FIG. 30A is an exemplary illustration of a trackee's path through an urban canyon.

FIG. 30A depicts a trackee's path broken out by sections (indicated by arrows A, B, C, D) through an urban canyon (e.g., spaces defined by one or more of Building A, Building B, and Building C).

Figure 30B:
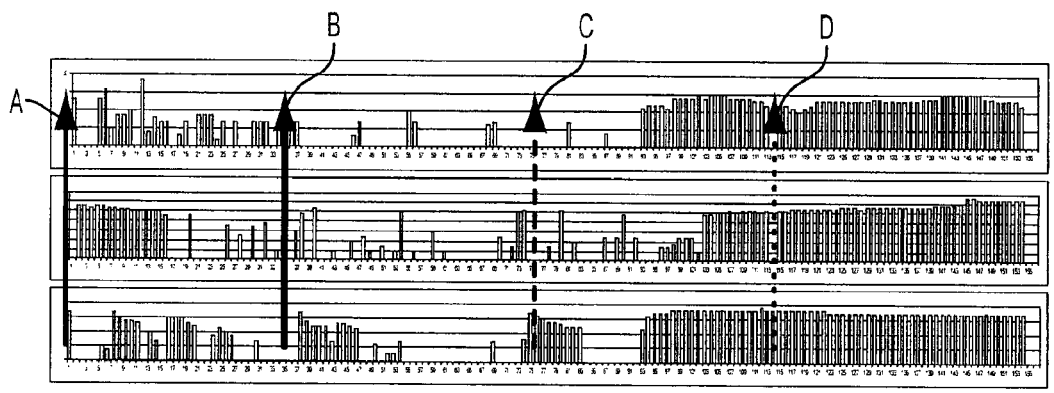
FIG. 30B depicts satellite strengths measured for various segments of the trackee's path through the urban canyon shown in FIG. 30A, according to an aspect of the invention.

FIG. 30B depicts satellite strengths measured for the sections (A, B, C, and D) of the trackee's path from satellites with east-west azimuth. FIG. 30B shows that the trajectory in section B and section C have very low signal strength from satellites with east-west azimuths since they are blocked by the building(s). These indicate that the GPS locations can be unreliable and may even be ignored even if the satellites geometry (HDOP) is good. Once the trackee comes into the open in section D, the signal strengths improve and GPS may be used for location estimation.

In another implementation of the IGX algorithm, the locations predicted by the INU may be further improved by feeding back accurate GPS locations when available. However, since GPS may often be completely inaccurate, continuous feedback may potentially degrade the tracking Instead, each GPS location may be validated for its accuracy before being fed back to the Inertial Navigation location.

D. Illustrative Example of Outdoor Algorithm Implementation

According to aspect of the invention, an outdoor location estimate may be obtained by processing tracking data by comparing points instead of segments. The starting point of tracking may be determined either by the first GPS location available in the system for a particular mobile unit, or by a manual click (or other input selection) on a Geographic Information Systems (GIS) map of a target area.

Subsequent reports that contain inertial navigation information may be used to apply the increments predicted by inertial navigation to the previously known location. The increment distances are as predicted by the (x, y) location provided by the INU in meters (or other units) using the path based on the yaw gyro. The heading direction is rotated to the compass direction predicted by the INU if the compass reliability is better than a threshold value (e.g., there is little or no magnetic interference which is generally the case outdoors). If the compass angle is inaccurate, the path may be updated using the current gyro angle rotated to the rotation of the previous point.

If the report contains both INU and GPS data, the previous location estimate may be updated with the new inertial increments. Next, the GPS sensor data quality over a previous time period of a predetermined length (e.g., the last 5-10 seconds, or other time period) may be tested for its Horizontal Dilution of Precision (HDOP) and Number of Satellites against acceptable thresholds. The HDOP reveals the satellite geometry of the satellites chosen for a position estimate, and low HDOP can indicate that the satellites are well spread out in the sky, whereas high HDOP can indicate that satellites are not separated well enough to result in accurate triangulation. A GPS location estimate using less than four satellites may be highly inaccurate, and a higher number of satellites may usually indicate more reliable GPS. Therefore, if the GPS data over the predetermined time period (e.g., 5-10 seconds) has a HDOP less than a given threshold and the Number of Satellites is greater than 3, the GPS may be deemed acceptable for consideration in the position estimate.

Since the INU path may be very accurate in the short term, the GPS path over the short period is next compared to the INU path to validate that accuracy of the GPS location. This enables corrections to the INU track which can be correct in the short-term but may be offset from the correct global position by feeding back accurate GPS data.

Figure 31:
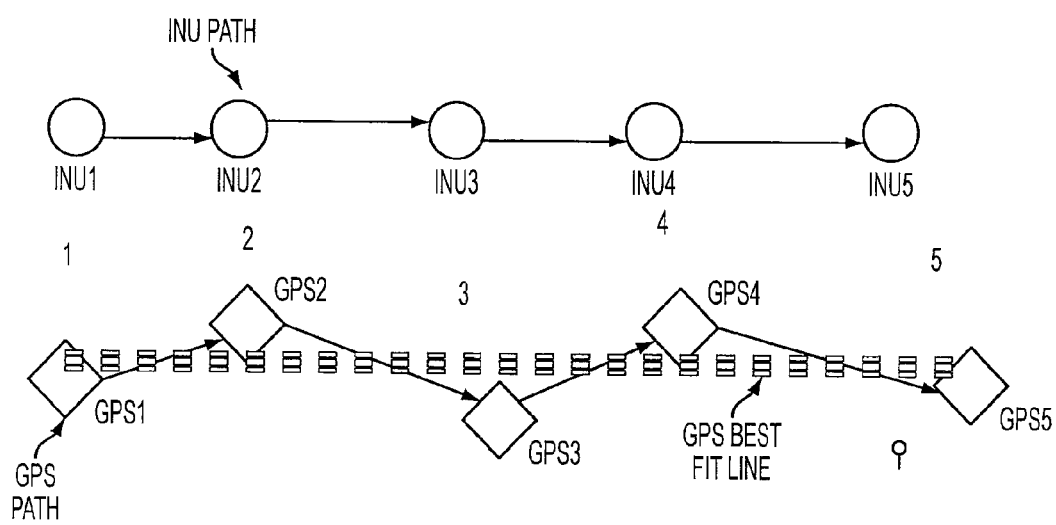
FIG. 31 is an exemplary illustration of an INU path, a GPS path, and a best-fit line generated for a trackee's path, according to an aspect of the invention.

FIG. 31 is an exemplary illustration of an INU path (illustrated as circles), a GPS path (illustrated as squares), and a GPS best fit line (depicted by the dashed line). To compare the INU path and the GPS path, the individual increments in the short-term (e.g., INU1-2 and GPS1-2, and INU2-3 and GPS2-3, and so) may be compared with one another to ensure that each is within a threshold deviation. If the GPS path passes these tests, a proportional feedback of the difference between the GPS and INU locations may be used to correct the position estimate toward the GPS position.

Alternatively, within an inertial tracking path history where the error bounds are small, a rigid body may be created for the points in the inertial path (e.g., the distances between each pair of points can be computed and stored). The GPS distances corresponding to the same points can also be created and scanned for numbers similar to the inertial rigid body distances. This method may allow for good sporadic GPS points to be located when they compare well to the inertial path in the short-term, and then fed back to improve the tracking estimate.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of reducing errors in inertial tracking data, the method being implemented by a computer that includes a physical processor, the method comprising:
   obtaining, as input, tracking data for a trackee, wherein the tracking data includes a collection of position estimates generated based on data obtained from inertial sensors, and Received Signal Strength Indication (RSSI) data;
   determining whether RSSI data associated with at least one position estimate matches one or more stored RSSI location signatures; and
   correcting the at least one position estimate by correlating the at least one position estimate to a given location associated with a given RSSI location signature responsive to a determination that the RSSI data associated with the at least one position estimate matches the given RSSI location signature.

2. The method of claim 1, further comprising:
   causing the at least one corrected position estimate to be displayed via a graphical user interface associated with the computer.

3. The method of claim 1, wherein the obtained tracking data comprises previously-acquired, stored data.

4. The method of claim 1, further comprising:
   averaging and filtering the obtained RSSI data to smoothen the RSSI data prior to determining whether the RSSI data associated with the at least one position estimate matches one or more stored RSSI location signatures.

5. The method of claim 1, wherein the one or more stored RSSI location signatures include one or more RSSI location signatures corresponding to one or more locations previously visited by the trackee.

6. The method of claim 1, wherein the one or more stored RSSI location signatures include one or more RSSI location signatures corresponding to one or more locations previously visited by other trackees.

7. The method of claim 1, further comprising:
   storing the RSSI data associated with the at least one position estimate as a new RSSI location signature responsive to a determination that the RSSI data associated with the at least one position estimate does not match any stored RSSI location signatures.

8. The method of claim 1, wherein the trackee is being tracked in a building, and wherein the RSSI data is based on transmissions received, at a tracking unit associated with the trackee, from radios located at a predetermined number of reference points.

9. The method of claim 8, wherein the predetermined number of reference points are located outside the building.

10. The method of claim 1, wherein the trackee is being tracked in a building, and wherein the given location corresponds to a building feature.

11. The method of claim 10, wherein the building feature comprises at least one of a hallway, room, stairwell, or elevator.

12. The method of claim 1, wherein the trackee is being tracked in a building, and wherein the given location corresponds to a region of an established grid of regions for the building, the established grid of regions established by radios located at a predetermined number of reference points.

13. The method of claim 12, wherein the predetermined number of reference points are located outside the building.

14. The method of claim 12, further comprising:
   determining a heading of the trackee based on variances in the RSSI data at known reference points.

15. The method of claim 12, wherein the tracking data includes short-range RSSI data relating to the trackee's proximity to other trackees, the method further comprising:
   determining a distance range between the trackee and at least one other trackee based on the received RSSI data.

16. A system for reducing errors in inertial tracking data, the system comprising:
   a computer processor configured to:
      obtain, as input, tracking data for a trackee, wherein the tracking data includes a collection of position estimates generated based on data obtained from inertial sensors, and Received Signal Strength Indication (RSSI) data;
      determine whether RSSI data associated with at least one position estimate matches one or more stored RSSI location signatures; and
      correct the at least one position estimate by correlating the at least one position estimate to a given location associated with a given RSSI location signature responsive to a determination that the RSSI data associated with the at least one position estimate matches the given RSSI location signature.

17. The system of claim 16, wherein the computer processor is further configured to:
   cause the at least one corrected position estimate to be displayed via a graphical user interface associated with the computer.

18. The system of claim 16, wherein the obtained tracking data comprises previously-acquired, stored data.

19. The system of claim 16, wherein the computer processor is further configured to:
   average and filter the obtained RSSI data to smoothen the RSSI data prior to determining whether the RSSI data associated with the at least one position estimate matches one or more stored RSSI location signatures.

20. The system of claim 16, wherein the one or more stored RSSI location signatures include one or more RSSI location signatures corresponding to one or more locations previously visited by the trackee.

21. The system of claim 16, wherein the one or more stored RSSI location signatures include one or more RSSI location signatures corresponding to one or more locations previously visited by other trackees.

22. The system of claim 16, wherein the computer processor is further configured to:
   store the RSSI data associated with the at least one position estimate as a new RSSI location signature responsive to a determination that the RSSI data associated with the at least one position estimate does not match any stored RSSI location signatures.

23. The system of claim 16, wherein the trackee is being tracked in a building, and wherein the RSSI data is based on transmissions received, at a tracking unit associated with the trackee, from radios located at a predetermined number of reference points.

24. The system of claim 23, wherein the predetermined number of reference points are located outside the building.

25. The system of claim 16, wherein the trackee is being tracked in a building, and wherein the given location corresponds to a building feature.

26. The system of claim 25, wherein the building feature comprises at least one of a hallway, room, stairwell, or elevator.

27. The system of claim 16, wherein the trackee is being tracked in a building, and wherein the given location corresponds to a region of an established grid of regions for the building, the established grid of regions established by radios located at a predetermined number of reference points.

28. The system of claim 27, wherein the predetermined number of reference points are located outside the building.

29. The system of claim 27, wherein the computer processor is further configured to:
    determine a heading of the trackee based on variances in the RSSI data at known reference points.

30. The system of claim 27, wherein the tracking data includes short-range RSSI data relating to the trackee's proximity to other trackees, and wherein the computer processor is further configured to:
    determine a distance range between the trackee and at least one other trackee based on the received RSSI data.

31. A non-transitory computer readable storage medium comprising executable code for reducing errors in inertial tracking data, the computer executable code, when executed by a processor, causing the processor to:
    obtain, as input, tracking data for a trackee, wherein the tracking data includes a collection of position estimates generated based on data obtained from inertial sensors, and Received Signal Strength Indication (RSSI) data;
    determine whether RSSI data associated with at least one position estimate matches one or more stored RSSI location signatures; and
    correct the at least one position estimate by correlating the at least one position estimate to a given location associated with a given RSSI location signature responsive to a determination that the RSSI data associated with the at least one position estimate matches the given RSSI location signature.

* * * * *